United States Patent [19]
Nishii et al.

[11] Patent Number: 5,725,834
[45] Date of Patent: Mar. 10, 1998

[54] CHEMICAL OXYGEN GENERATOR

[75] Inventors: Shigeki Nishii, Hyogo; Satoshi Sakamoto, Osaka; Shigeru Kinoi, Hyogo; Satoshi Kubozuka, Hyogo; Tadahiro Taruma, Hyogo; Shigeto Miyazaki, Hyogo, all of Japan

[73] Assignee: Daicel Chemical Industries, Ltd., Osaka, Japan

[21] Appl. No.: 628,585

[22] Filed: Apr. 4, 1996

[30] Foreign Application Priority Data

| Apr. 7, 1995 | [JP] | Japan | 6-108066 |
| Mar. 14, 1996 | [JP] | Japan | 5-85757 |
| Mar. 14, 1996 | [JP] | Japan | 5-85758 |

[51] Int. Cl.$^6$ ............................................. A62B 7/08
[52] U.S. Cl. ................................. 422/126; 422/165
[58] Field of Search ........................... 422/120, 125, 422/126, 165; 252/181.4, 181.7

[56] References Cited

U.S. PATENT DOCUMENTS

| 2,558,756 | 7/1951 | Jackson et al. | 422/165 |
| 3,861,880 | 1/1975 | Thompson | 422/120 |
| 3,955,931 | 5/1976 | Thompson | 422/120 |
| 3,986,838 | 10/1976 | Reichert | 422/165 |
| 4,197,213 | 4/1980 | Pietz et al. | 252/372 |
| 4,822,572 | 4/1989 | Van Der Smissen et al. | 422/126 |
| 5,338,516 | 8/1994 | Zhang et al. | 422/126 |
| 5,345,875 | 9/1994 | Anderson | 102/530 |

OTHER PUBLICATIONS

International Publication No. WO-92/18423, WIPO PCT Published 29 Oct. 1992, Applicant Puritan Bennett Corporation (US).
International Publication No. WO-93/17961 WIPO PCT Published 16 Sep. 1993, Applicant Puritan Bennett Corporation (US).

*Primary Examiner*—Nina Bhat
*Attorney, Agent, or Firm*—Carothers & Carothers

[57] ABSTRACT

A candle type chemical oxygen generator which insures complete thermal decomposition of the candle with a predetermined flow rate of oxygen while maintaining the generator housing at a low temperature. Oxygen generated as a result of the thermal decomposition of the oxygen generating candle (32) by triggering the ignition device (F), passes through cylindrical thermal insulation (36) and an annular gap between the cylindrical thermal insulation (36) and the cylindrical member (37) which houses the candle to thereby cool the cylindrical member, and is supplied to the exterior through the oxygen supply device (S').

24 Claims, 31 Drawing Sheets

CHEMICAL OXYGEN GENERATOR

BACKGROUND OF THE INVENTION

1. Field of the Invention

This invention relates to a chemical oxygen generator.

2. Description of the Prior Art

FIG. 1 shows a chemical oxygen generator of the prior art which is generally denoted by a reference numeral 1. The chemical oxygen generator 1 is nearly cylindrical in shape, and its axial length is about 30 centimeters and its diameter is about 8 centimeters. In FIG. 1, an oxygen source called an oxygen generating candle 2 is formed generally in the shape of a cylinder in. The candle 2 consists of an ignition pellet portion 3, an initiation portion 4, a first main portion 5a and a second main portion 5b, viewing from the right side in FIG. 1. These are mainly composed of sodium chlorate, $NaClO_3$ and iron Fe, which are compressed moldings of powder, respectively. Ratios of these constituents are changed so that a flow of generating oxygen after igniting accords with a predetermined flow pattern. FIG. 5 shows the relationship between time after ignition and generating oxygen flow. At first, the oxygen is generated in larger quantity as shown, and the oxygen flow is reduced according as thermal decomposition of the candle 2 develops. The flow pattern is determined so as to correspond to that required in the case of an air accident, for example. That is, if the air accident happens at high altitude where the air is rare, a larger quantity of oxygen will be necessitated. An ignition device F at the side of the candle 2 is fitted to a central opening of a bottom of a cup-shaped candle holder 6 made of metal, and at the side of an oxygen supply device S, the candle is supported by a candle support 7 made of metal. A thermal insulation 8 made of silica, for example, is attached to the bottom of the candle holder 6. Similarly, a filter 9 made of "Popcalite" which is generally used as oxidation catalyst in the chemical plant and which is mainly made of copper oxide CuO, manganese oxide $Mn_2O_3$, is filled between the candle support 7 and the oxygen supply device S. Further, a cylindrical thermal insulation 10 made of silica is attached to the outer circumference of the candle 2, and the circumference of the candle holder 6 is buried in the thermal insulation 10 as shown in FIG. 1 and FIG. 2. In some cases, the candle holder 6 is buried between the double constructional thermal insulations instead of the thermal insulation 10.

As shown in FIG. 1, an assembly composed of the candle 2, the candle holder 6, the candle support 7, the thermal insulations 8, 10 and the filter 9 is in the shape of cylinder as a whole. The assembly is covered with a housing 11 made of metal, for example, stainless steel. A cap 12 made of metal is tightly fitted to the right side opening of the housing 11 in FIG. 1. Further, the ignition device F is fixed at the center of the cap 12.

Next, the ignition device F will be described. An opening is formed at the center of the bottom of the candle holder 6, and a cylindrical holder 14 holding a primer 18 is fixed by welding at this opening. The holder 14 is screwed to the inner circumference of a cylindrical member 15 which is holding the thermal insulation 8 and which is fixed by welding at a center hole of the cap 12. A projecting portion of the holder 14 from the cap 12 is screwed to a cylindrical member 16 holding a hammer piston 17. A firing pin 20 is inserted in a hole formed at the right end portion of the hammer piston 17. Accordingly, while the hammer piston 17 is urged towards the primer 18 by a spring 19 and stopped by the firing pin 20, it remains positioned as shown in FIG. 1.

The ignition device F of the prior art is composed of the hammer piston 17, the spring 19, the firing pin 20, the holder 14, the cylindrical members 15, 16 and the primer 18.

A relief valve 22 and the oxygen supply device S are fixed to a cap 21 made of metal. The cap 21 is attached to the filter 9 by fitting its circumference tightly to the end of the inner wall of the housing 11. The relief valve 22 consists of a valve body 26 arranged in the casing, and a valve spring 25 urging the valve body 26 rightwards in FIG. 1. The oxygen supply device S consists of a metal fixture 23 fixed to an opening of the cap 21, and oxygen outlet pipes 24a, 24b. A valve body 27 urged rightwards in FIG. 1 by a valve spring 28 is arranged in the metal fixture 23. A check valve is provided by the combination of metal fixture 23, the valve body 27 and the valve spring 28. And the generated oxygen in the chemical oxygen generator 1 is supplied to the outside through the oxygen outlet pipes 24a, 24b.

The chemical oxygen generator 1 of this prior art device has been described. Next, the operation will be described.

When the firing pin 20 is pulled out from the hammer piston 17 with a holding portion 20a, the hammer piston 17 moves leftwards forcefully by the spring force of the spring 19 in FIG. 1. A projecting portion 17a formed at the left end portion of the hammer piston 17 collides with the primer 18. Therefore, the primer 18 sparks, and it ignites the ignition pellet portion 3 of the candle 2. When iron Fe is oxidized to $Fe_2O_3$, heat is generated. Therefore, $NaClO_3$ is resolved into salt NaCl and oxygen by the heat. The generated oxygen flows towards the radial direction from the bottom surface of the candle holder 6, and it passes through the thermal insulation 10 in the axial direction denoted by reference symbol G in FIG. 4. Further, the generated oxygen passes through the openings 7a formed at the outer circumferential portion of the candle support 7. Then, the filter 9 eliminates dust and odor from the generated oxygen and makes the oxygen odorless and clean. Finally, the generated oxygen is supplied to the outside through the outlet pipes 24a, 24b from the oxygen supply device S. Then, the valve system (check value) of the oxygen supply device S is opened by pressure of the generated oxygen as shown in FIG. 4. On the other hand, the thermal decomposition in the candle 2 develops, and the initiation portion 4 decomposes rapidly after the ignition pellet portion 3 is ignited. At this time, the oxygen flows out at the highest rate in FIG. 5. Further, the first and second main portion 5a and 5b decompose, and oxygen continues to be generated in accordance with the flow pattern as shown in FIG. 5. The generated oxygen is supplied to the outside through the thermal insulation 10, the openings 7a (See FIG.3) of the candle support 7, the filter 9 and the oxygen supply device S.

If the candle 2 finishes decomposing on the whole, only salt NaCl will remain in the chemical oxygen generator 1. However, there are some cases in which the whole of the candle 2 does not decompose throughout. That is, there is a case wherein the thermal decomposition stops part of the way as denoted by reference symbol m in FIG. 4, and therefore, oxygen is not generated after that. This is very dangerous in some circumstances. That is, for example, it is very dangerous for passengers of an airplane when the supply of oxygen from the chemical oxygen generator 1 stops, although they need the oxygen. When the pressure of the generated oxygen in the chemical oxygen generator 1 becomes extraordinarily high, the valve body 26 of the relief valve 22 is opened by the pressure, and the pressurized oxygen is discharged into the outside through a hole h. Accordingly, and accident can be prevented.

Further, although the oxygen generated from the candle 2 is hot, it is cooled when it passes the thermal insulation 10 and the filter 9. Accordingly, since the generated oxygen supplied from the outlet pipes 24a, 24b has been cooled, it has no influence on the health of passenger or crew. Further, the housing 11 contacts with the thermal insulation 10, so that the heat of the hot oxygen passing through the thermal insulation 10 is transmitted to the housing 11, and the temperature of the surface of the housing 11 becomes high. However, the thickness of the thermal insulation 10 is so designed as not to have harmful influences on the outside. Of course, it is desirable for the housing 11 to be at low temperature. That is, the thermal insulation 10 functions to prevent the heat generated in the thermal decomposition from being transmitted to the housing 11, and to maintain the high temperature of the candle 2.

An international application published under the patent cooperation treaty (PCT) No. WO93/17961 discloses a chemical oxygen generator in which both ends of a cylindrical thermal insulator filled with an oxygen generating source are supported by support members made of metal. An ignition device is provided at the side of the one support member and an oxygen supply device is provided at the side of the other support member, and a cylindrical or tubular housing contains the thermal insulator and the support members. One supporting member at the ignition means side is called a "spatter shield", and the other supporting member at the oxygen supply means is called an "interior core locator partition" in the chemical oxygen generator. Operation of the chemical oxygen generator is similar to the prior art as above described. The outer circumference of the oxygen source, namely, a candle is covered with the thermal insulation, and the side of the ignition means is held by the spatter shield. Although a space is shown between the housing and the thermal insulation a figure of the above publishment, there is no suggestion and description that the thermal insulation perfectly fills the space, or is contained in the manner as shown in the figure, in the space, in this publication. However, it is apparent that the hot oxygen generated from the candle is supplied to the outside through the space between the spatter shield and the thermal insulation, the space between the thermal insulation and the housing, and the hole formed to the interior core locator partition. Accordingly, the hot oxygen passes through the space between the housing and the thermal insulation, so that it is apparent that the temperature of the housing becomes high just as the above described prior art does.

Further, while the hot oxygen passes through the gap between the supporting member of the ignition means side and the thermal insulation, it is considerably cooled. The oxygen passes near the oxygen source of the oxygen supply means side, and it is cooled very well. Therefore, the temperature of the oxygen source of the oxygen supply means side is lower than that of the ignition means side. Accordingly, in some cases, there is the disadvantage that the thermal decomposition ceases to develop up to the end portion of the oxygen source of the ignition means side.

As for the chemical oxygen generator 1, which is described as the first prior art, the oxygen supply device S side of the candle 2 is supported by the candle support 7 fitted to the inner surface of the housing 11. However, the other side is held by the candle holder 6 which is held in the housing 11 through the ignition device F and the cap 12. That is, the ignition device F side of the candle 2 is only supported by the ignition device F arranged between the candle holder 6 and the cap 12 which fits at its outer circumferential portion to the inner surface of the housing 11. Accordingly, on this side of the candle 2, there is the case that the ignition device F dislodges around the junction with the cap 12 on the presence of any vibration or shock. Therefore, the right side of the candle 2 in FIG. 1 dislodges from the housing 11 by the vibration or shock during its transportation or the vibration or shock after its installation or assembling, for example, on the take-off, flight landing or during flight, in the case wherein aircraft are provided with the chemical oxygen generator 1. Accordingly, there are some disadvantages in that the candle 2 can fall from the candle holder 6, and in that the candle 2 can brake off by the stress applied from the candle holder 6. Therefore, although the candle 2 is constructed so as to make the oxygen flow desirable as shown in FIG. 5, there are some problems in that it cannot thermally decompose uniformly or perfectly, for example, by reason of its falling from the candle holder 6, and does not generate the demanded oxygen.

Further, although the end portion of the cap 12 is supported with the housing 11, the ignition device F displaced in accordance with the removal of the candle 2 in the housing 11 by any vibration or shocking. Therefore, the cap 12 inserting the ignition device F is twisted, and the durability of the chemical oxygen generator 1 gets worse. Further, a space is made at the part of the junction between the housing 11 and the cap 12. Accordingly, there is the disadvantage that the generated oxygen leaks from the space.

Further, when the filter 9 is vibrated or shocked, the sizes of particles constituting the filter 9 are reduced by the mutual frictions of the particles. Then, cavities or voids are formed in the filter 9. Accordingly, there is the disadvantage that the filter 9 having the cavities or voids cannot sufficiently eliminate dust and odor from the oxygen when the generated oxygen passes it. Thus, the efficiency or effect of the filter 9 is lowered by the vibration or shock.

SUMMARY OF THE INVENTION

It is an object of this invention to provide a chemical oxygen generator in which the candle can be absolutely thermally decomposed throughout.

Another object of this invention is to provide a chemical oxygen generator in which the candle can be prevented from falling and breaking off by any vibration or any rough handling.

A further object of this invention is to provide a chemical oxygen generator in which a predetermined quantity or flow rate pattern of oxygen can be surely obtained.

A still further object of this invention is to provide a chemical oxygen generator in which the temperature of the housing can be lowered throughout the length.

A still further object of this invention is to provide a chemical oxygen generator in which the filter can be prevented from deteriorating in its efficiency by vibration.

In accordance with an aspect of this invention, a chemical oxygen generator (31, 131') includes:

(A) an oxygen generating candle (32) having an oxygen source;

(B) a cylindrical thermal insulation (36) filled with said oxygen generating candle (32);

(C) first support means (38, 138') for supporting one side portion of said cylindrical thermal insulation (36) and said oxygen generating candle (32)

(D) second support means (52, 52") for supporting another side portion of said cylindrical thermal insulation (36) and said oxygen generating candle (32);

(E) ignition means (F, F") arranged at the side of said first support means (38, 138');

(F) oxygen supply means (S', S") arranged at the side of said second support means (52, 52"); and (G) a tubular housing (40) containing said cylindrical thermal insulation (36), said first support means (38, 138') and said second support means (52, 52");

the improvements including a cylindrical member (37, 137) made of material being corrosion resistant, reaction inert and heat resistant to said oxygen generating candle (32), covers an outer surface of said cylindrical thermal insulation (36), and an annular space (39, 139') is formed between said cylindrical member (37, 137) and said tubular housing (40).

Oxygen is thereby generated as the result of thermally decomposing of said oxygen generating candle (32) by triggering of said ignition means (F', F"), and passes through said cylindrical thermal insulation (36) and an annular gap between said cylindrical thermal insulation (36) and said cylindrical member (37, 137), and is supplied to the outside through said oxygen supply means (S', S").

In accordance with another aspect of this invention, a chemical oxygen generator (31', 31", 131) includes:

(A) an oxygen generating candle (32) having an oxygen source;

(B) a cylindrical thermal insulation (36) filled with said oxygen generating candle (32);

(C) first support means (38', 38", 138) for supporting one side portion of said cylindrical thermal insulation (36) and said oxygen generating candle (32);

(D) second support means (52', 152) for supporting another side portion of said cylindrical thermal insulation (36) and said oxygen generating candle (32);

(E) ignition means (F', F") arranged at the side of said first support means (38', 38", 8);

(F) oxygen supply means (S', S") arranged at the side of said second support means (52', 152); and (G) a tubular housing (40) containing said cylindrical thermal insulation (36), said first support means (38', 38", 138) and said second support means (52', 152);

the improvements including said first support means (38', 38", 138) made of material being corrosion resistant, reaction inert and heat resistant to said oxygen generating candle (32), is cup-shaped, its bottom being on the side of said ignition means (F', F") and covers all of said oxygen generating candle through said cylindrical thermal insulation (36), and an annular air-tight space (39', 39", 139) for said oxygen generating candle (32), is formed between said first support means (38', 38", 138) and said tubular housing (40).

Oxygen is thereby generated as the result of thermally decomposing said oxygen generating candle (32) by triggering of said ignition means (F', F"), and passes through said cylindrical thermal insulation (36) and an annular gap between said cylindrical thermal insulation (36) and said first support means (38', 38", 138), and is supplied to the outside through said oxygen supply means (S', S").

In accordance with a further aspect of this invention, a chemical oxygen generator (90) includes:

(A) an oxygen generating candle (32) having an oxygen source;

(B) a cylindrical thermal insulation (36) filled with said oxygen generating candle (32);

(C) first support means (98) for supporting one side portion of said cylindrical thermal insulation (36) and said oxygen generating candle (32);

(D) second support means (52) for supporting another side portion of said cylindrical thermal insulation (36) and said oxygen generating candle (32);

(E) ignition means (F') arranged at the side of said first support means (98);

(F) oxygen supply means (S') arranged at the side of said second support means (52); and (G) a tubular housing (40) containing said cylindrical thermal insulation (36), said first support means (98) and said second support means (52);

the improvements including a cylindrical member (37') made of material being corrosion resistant, reaction inert and heat resistant to said oxygen generating candle (32), covers an outer surface of said cylindrical thermal insulation (36), and plural radiately extending fins (37b') jutting out toward an annular space (93) between said cylindrical member (37') and said tubular housing (40), is formed on said cylindrical member (37') in the manner that said cylindrical member (37') is cut or slit at plural positions and the slit portions are bent slantly, Oxygen is thereby oxygen generated as the result of thermally decomposing said oxygen generating candle (32) by triggering of said ignition means (F'), and passes through said cylindrical thermal insulation (36) and an annular gap between said cylindrical thermal insulation (36) and said cylindrical member (37') and is supplied to the outside through said oxygen supply means (S').

In accordance with still a further aspect of this invention, a chemical oxygen generator (71, 71', 71", 75, 75', 80, 80', 80") includes:

(A) an oxygen generating candle (32) having an oxygen source;

(B) a cylindrical thermal insulation (36) filled with said oxygen generating candle (32);

(C) first support means (68, 68', 78, 78', 78", 88, 88') for supporting one side portion of said cylindrical thermal insulation (36) and said oxygen generating candle (32);

(D) second support means (52") for supporting another side portion of said cylindrical thermal insulation (36) and said oxygen generating candle (32);

(E) ignition means (F") arranged at the side of said first support means (68, 68', 78, 78', 78", 88, 88');

(F) oxygen supply means (S") arranged at the side of said second support means (52"); and (G) a tubular housing (40) containing said cylindrical thermal insulation (36), said first support means (68, 68', 78, 78', 78", 88, 88') and said second support means (52");

the improvements in which a cap member (42') closes an opening of said tubular housing (40) at the side of said first support means (68, 68', 78, 78', 78", 88, 88'), said first support means (68, 68', 78, 78', 78", 88, 88') made of material being corrosion resistant, reaction inert and heat resistant to said oxygen generating candle (32), is cup-shaped, its bottom being on the side of said ignition means (F") and covers said oxygen generating candle (32) through said cylindrical thermal insulation (36), and path-forming means (69, 69', 69") is arranged axially for forming axial annular passages (72, 72', 72", 73, 73') between said first support means (68, 68', 78, 78', 78", 88, 88') and said tubular housing (40) for guiding the generated oxygen flow in the axial direction.

Oxygen generated as the result of thermally decomposing said oxygen generating candle (32) by triggering of said ignition means (F"), lastly passes through the outer-most passage portion (73, 73') which is the nearest to said tubular housing (40) among said passages (72, 72', 72", 73, 73') after passing through said cylindrical thermal insulation (36) and an annular gap between said cylindrical thermal insulation

(36) and said first support means (68, 68', 78, 78', 78", 88, 88'), and is supplied to the outside through said oxygen supply means (S").

In accordance with still further aspect of this invention, a chemical oxygen generator (31, 31', 31", 90) includes:

(A) an oxygen generating candle (32) having an oxygen source made of alkali metal chlorates or alkali metal perchlorates as main component;

(B) a cylindrical thermal insulation (36) filled with said oxygen generating candle (32);

(C) first support means (38, 38', 38", 98) for supporting one side portion of said cylindrical thermal insulation (36) and said oxygen generating candle (32)

(D) second support means (52, 52') for supporting another side portion of said cylindrical thermal insulation (36) and said oxygen generating candle (32);

(E) ignition means (F') arranged at the side of said first support means (38, 38', 38", 98);

(F) oxygen supply means (S') arranged at the side of said second support means (52, 52'); and (G) a tubular housing (40) containing said cylindrical thermal insulation (36), said first support means (38, 38', 38", 98) and said second support means (52, 52');

the improvements including plural small pieces, made of material of thermal conductivity being more than 30 W/(m.K) is added to said oxygen source of said oxygen generating candle (32).

In accordance with still a further aspect of this invention, a chemical oxygen generator (71, 71', 71", 75, 80, 80", 131, 131') includes:

(A) an oxygen generating candle (32) having an oxygen source;

(B) a cylindrical thermal insulation (36) filled with said oxygen generating candle (32);

(C) first support means (68, 68', 78, 78', 78", 88, 88', 138, 138') for supporting one side portion of said cylindrical thermal insulation (36) and said oxygen generating candle (32);

(D) second support means (52", 152) for for supporting another side portion of said cylindrical thermal insulation (36) and said oxygen generating candle (32);

(E) a tubular housing (40) containing said cylindrical thermal insulation (36), said first support means (68, 68', 78, 78', 88, 88', 138, 138') and said second support means (52", 152);

(F) a first cap member (42') made of plate closing an opening of said tubular housing (40) on the side of said first support means (68, 68', 78, 78', 88, 88', 138, 138')

(G) ignition means (F") arranged on the center of the bottom of said first support means (68, 68', 78, 78', 78", 88, 88', 138, 138') through the center of said first cap member (42');

(H) a second cap member (60', 60") made of plate closing an opening of said tubular housing (40) on the side of said second support means (52",152); and (I) oxygen supply means (S") arranged at the side of said second support means (52", 152);

the improvements in which a vibration-preventing member (70, 70', 70") is arranged at the center on said ignition means (F") between said first support means (68, 68', 78, 78', 88, 88', 138, 138') and said first cap member (42'), the edge of said vibration-preventing member (70, 70', 70") and the edge of said first cap member (42') are engaged with said housing, and directly with each other or through said tubular housing (40).

wherein oxygen generated as the result of thermally decomposing said oxygen generating candle (32) by triggering of said ignition means (F"), passes through said cylindrical thermal insulation (36), and is supplied to the outside through said oxygen supply means (S").

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Next, a chemical oxygen generator according to embodiments of this invention will be described with reference to drawings.

Figure 6:
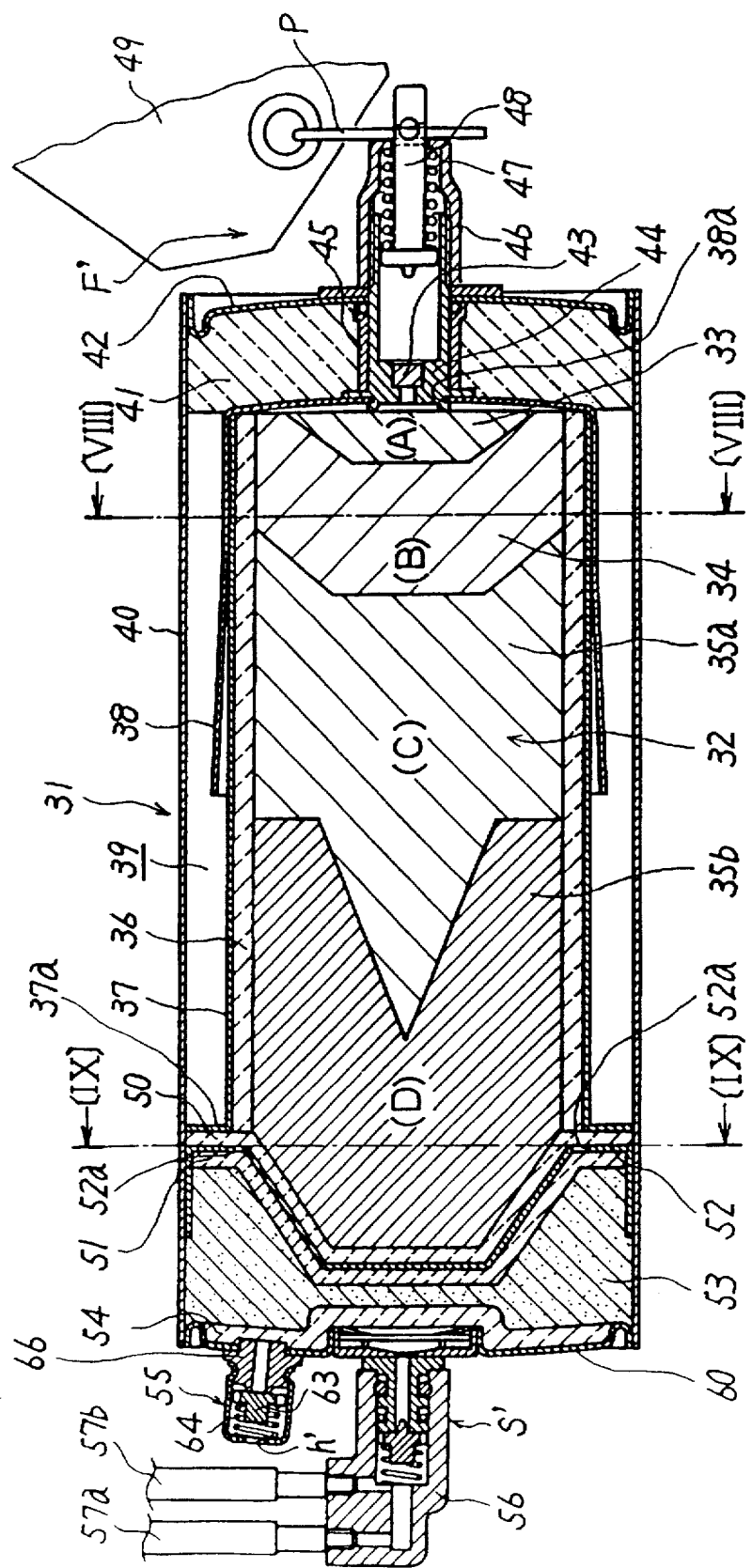
FIG. 6 is a cross-sectional view of a chemical oxygen generator according to a first embodiment of this invention.
Figure 7:
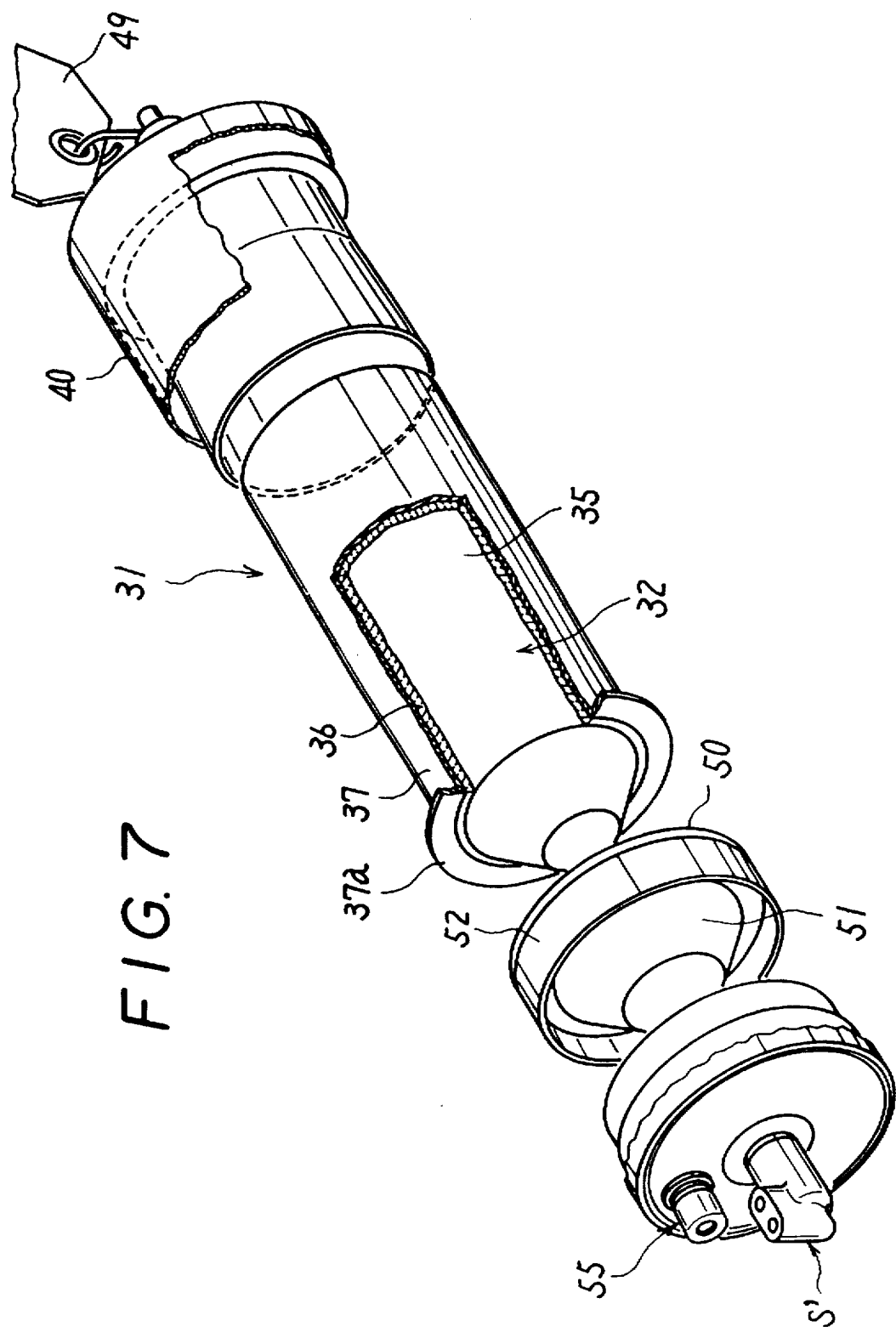
FIG. 7 is a partially broken away exploded perspective view of a main part of the chemical oxygen generator of FIG. 6.
Figure 8:
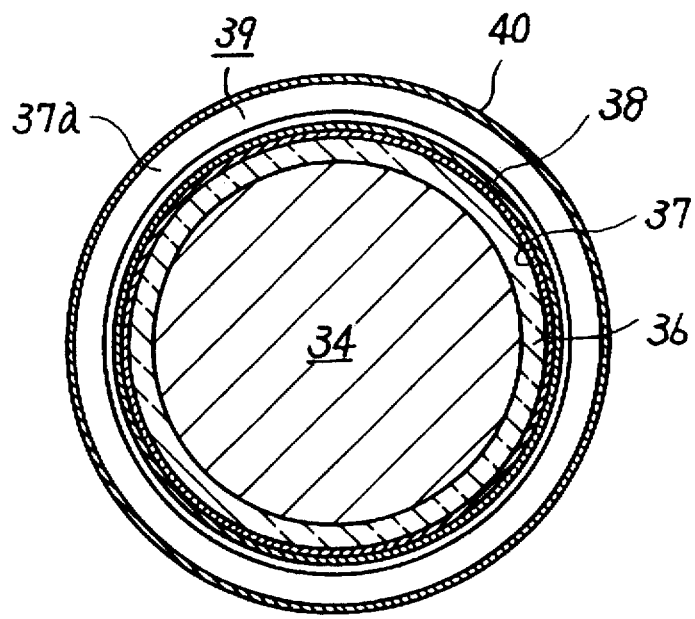
FIG. 8 is a cross-sectional view of the chemical oxygen generator of FIG. 6, taken along the line [VIII]—[VIII].

In FIG. 6 and FIG. 7, a chemical oxygen generator according to a first embodiment of this invention is generally represented by a reference numeral 31. A candle 32 as a chemical oxygen source consists of an ignition pellet portion 33, an initiation portion 34, and main portions 35a, 35b in the same manner as the prior art. It is nearly cylindrical as in the prior art. A cylindrical thermal insulation (heat insulating) 36, the trade name of the material of which is called "Durablanket" (chemical component ; $Al_2O_3$ 48%, $SiO_2$ 52% ; generally composed of ceramic fiber) is tightly fitted to the candle 32. A cylindrical member 37 made of copper, according to this invention, is attached to an outer surface of the thermal insulation 36. The thickness of the cylindrical member 37 according to this embodiment is small, such as 0.1 mm. The outer surface of the thermal insulation 36 is somewhat rough. It can be easily and tightly fitted to the cylindrical member 37. A nearly cup-shaped candle holder 38 made of metal, is fitted to the candle 32 at the side of the ignition device F'. A central hole 38a is formed at the bottom of the candle holder 38. A primer holding member 44 is welded to the candle holder 38. The outer surface of the primer holding member 44 is screwed to an outer cylindrical member 45. It is welded to the central portion of a cap 42 made of metal. The cylindrical member 46 for holding a hammer piston 48 is screwed to the primer holding member 44. A primer 43 held by the primer holding member 44 is facing toward the hammer piston 48. The hammer piston 48 is urged leftwards by spring 47 in FIG.6. The reference numeral 41 represents a thermal insulation.

In this embodiment, a tag with written attention for handling is attached to the pin P. The pin P is attached to a not-shown firing pin. The firing pin and the pin P are radially inserted through the hammer piston 48. When using the chemical oxygen generator, the firing pin will be pulled out from the hammer piston 48, after the pin P is taken away as in the prior art.

On the oxygen-supply device S' side, a bowl-like thermal insulation 50 contacts with one end portion of the candle 32. The thermal insulation 50 is trapezoidal and harder than the thermal insulation 36. It is fitted to the inner surface of a housing 40 made of metal (for example, stainless). A flange portion 37a of the cylindrical member 37 is formed by bending its left end portion in the outer radial direction in FIG. 6. The flange portion 37a contacts with the outer circumferential portion of the thermal insulation 50.

Figure 9:
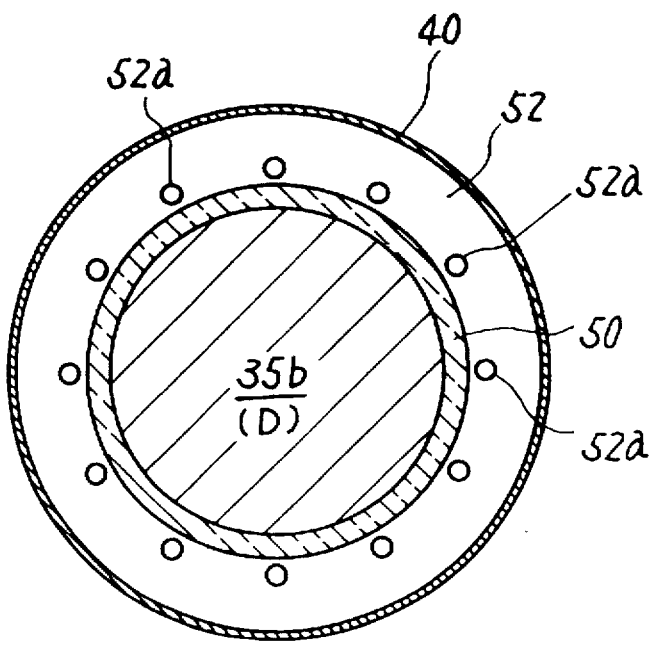
FIG. 9 is a cross-sectional view of the chemical oxygen generator of FIG. 6, taken along the line [IX]—[IX].

An annular air tight space 39 is formed between the housing 40 and the cylindrical member 37. Further, on the oxygen-supply device S' side, a candle support 52 made of metal is tightly attached to the housing 40 at its outer circumferential portion. A bowl-like thermal insulation 51 which has the same hardness as the thermal insulation 50, is fitted to the candle support 52. The candle support 52 is shown in FIG. 7 and FIG. 9 which show the shape. Plural circular openings 52a are formed at the outer circumferential portion of the candle support 52. A dish-like thermal insulation 54 has the same hardness as the thermal insulation 50. The thermal insulation 54 is arranged at the left end portion of the housing 40 in FIG. 6. The space between the thermal insulation 51 and the thermal insulation 54 is filled with filter 53. The filter 53 consists of "Popcalite", for example, as in the prior art. A cap 60 made of metal is attached to the housing 40 on the left side of the thermal insulation 54 in FIG. 6.

A relief valve 5 and the oxygen-supply device S' are attached to the cap 60 as in the prior art. In the relief valve 55, a valve body 63 is urged rightwards in FIG. 6 by a valve spring 64, and it seats on a valve seat forming member 66. When the inner pressure of the chemical oxygen generator 31 becomes extraordinary high, the generated oxygen is evolved through the hole h' of the relief valve 55. The inner hole of a metal fixture 56 of the oxygen-supply device S' is communicated with the inside of the chemical oxygen generator 31. Oxygen outlet pipes 57a, 57b are fixed to the metal fixture 56. Thus, the generated oxygen is supplied to the outside through the outlet pipes 57a, 57b. Because the right end portion of the cylindrical member 37 made of copper is tightly fitted to the inside of the right end portion of the candle holder 38, the gap between the candle holder 38 and the cylindrical member 37 is sealed. Further, the copper is soft, so it is easy to seal.

The structure of the chemical oxygen generator 31 has been described above. Next, the operation of the chemical oxygen generator 31 will be described.

When using the chemical oxygen generator 31, the firing pin is pulled out from the hammer piston 48, after the pin P is taken away as in the prior art. Thus, the hammer piston 48 is moved leftwards in FIG. 6 by the spring force of the spring 47 and collides with the primer 43. The primer 43 sparks, and the ignition pellet portion 33 is ignited. Since the ignition pellet portion 33 is thermally decomposed, the oxygen is generated. When the ignition pellet portion 33 is thermally decomposed, the flow of the generated oxygen is in many directions. And when the initiation portion 34 begins to thermally decompose, the oxygen continues to generate at lower flow rate. The generated oxygen has a high temperature. The generated oxygen flows along the bottom of the candle holder 38, and passes through the thermal insulation 36 and the gap between the thermal insulation 36 and the cylindrical member 37 leftwards in FIG. 6. The generated oxygen passes through the plural circular opening 52a, and the thermal insulation 51 and the filter 53. Then, the generated oxygen is evolved to the outside through the outlet pipes 57a, 57b of the oxygen-supply device S'. The generated oxygen is cooled enough to have no influence on health upon reaching the oxygen-supply device S'.

In this embodiment, the thermal insulation 36 is surrounded by the cylindrical member 37 made of copper. Thus, the cylindrical member 37 functions as heat shield. Because the oxygen generated from the ignition pellet portion 33 and the initiation portion 34, flows through the thermal insulation 36 and the gap between the thermal insulation 36 and the cylindrical member 37, the heat of the generated oxygen is transmitted to the whole of the cylindrical member 37. Namely, the cylindrical member 37 is directly heated by the hot oxygen passing through the gap between the bottom of the candle holder 38 and the right end portion of the candle 32 and the gap between the cylindrical member 37 and the thermal insulation 36. Then, the candle 32 arranged in the chemical oxygen generator 31 is heated by the generated oxygen through the thermal insulation 36. Therefore, the heat transmits little to the outside from the cylindrical member 37. The space 39 formed between the cylindrical member 37 and the housing 40 functions as thermal insulation or is heat insulating. Therefore, the housing 40 is kept at a lower temperature than that of the prior art.

On the other hand, the whole of the cylindrical member 37 is uniformly heated. Then, the housing 40 is considerably insulated from the heat. The heat of the cylindrical member 37 and the heat of the generated oxygen transmits to the candle 32 through the thermal insulation 36. Therefore, the candle 32 is kept at a higher temperature than that of the prior art. Since the candle 32 is thermally decomposed towards the left side from the right side, the heat of the candle 32 is transmitted leftwards in FIG. 6. The candle 32 which is beforehand heated at high temperature is thermally decomposed, and then the oxygen generates. The generated oxygen is led to the oxygen-supply device S', passing through the thermal insulation 36 and the gap between the thermal insulation 36 and the cylindrical member 37, the thermal insulation 50, the plural circular opening 52a formed in the candle support 52, the thermal insulation 51 and the filter 53. Then, the oxygen cooled so as to have no effect on health, is supplied to the outside.

Figure 10:
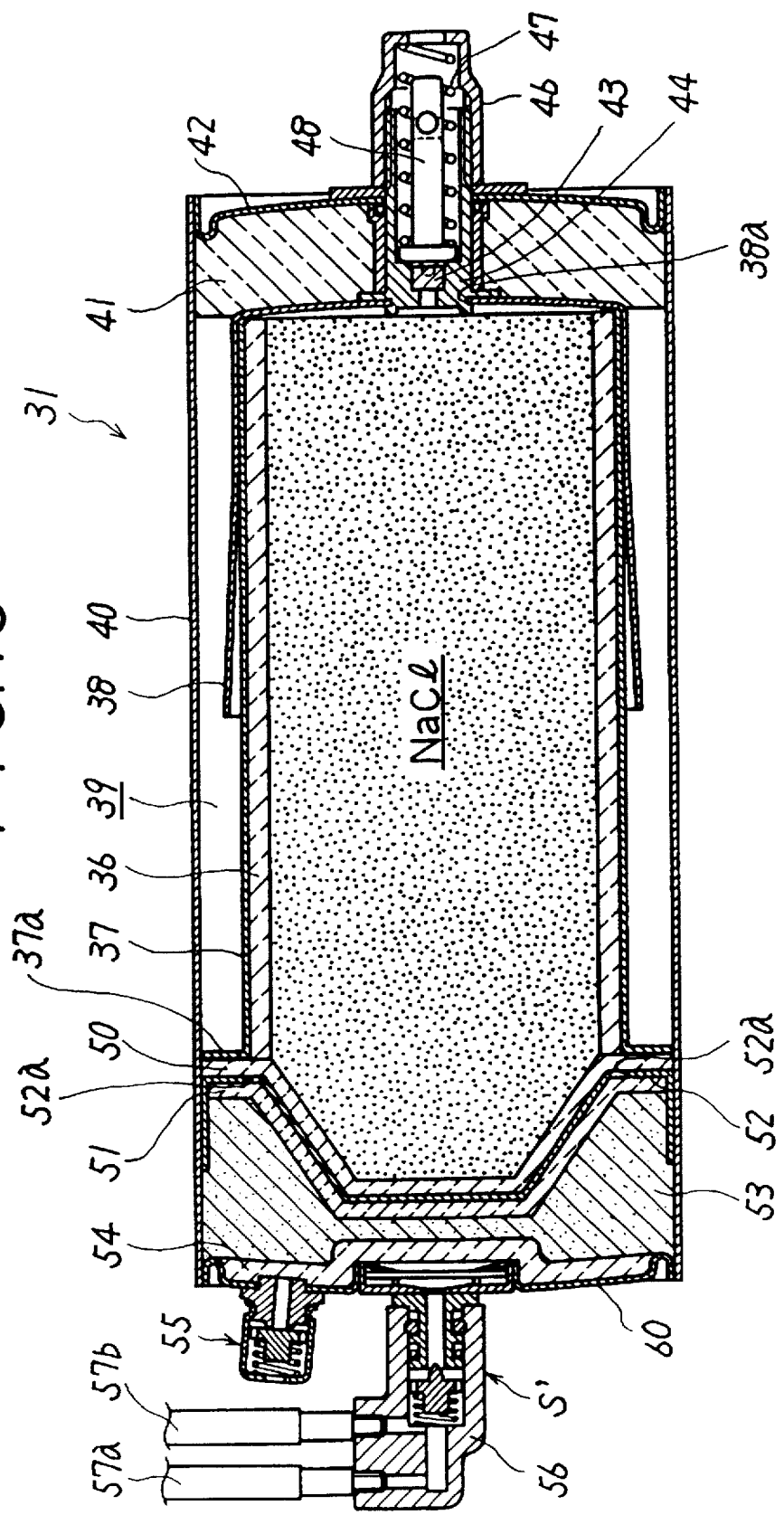
FIG. 10 is a cross-sectional view showing a condition of the perfectly decomposed candle in the chemical oxygen generator of FIG. 6.

According to the chemical oxygen generator 30 of the first embodiment of this invention as above mentioned, the annular air-tight space 39 is formed between the cylindrical member 37 and the housing 40. The cylindrical member 37 made of copper functions as heat shield. Therefore, the quantity of heat transmitting to the housing 40, is very small. So, the temperature of the housing 40 is much lower than that of the prior art. Further, the candle 32 is covered with the cylindrical member 37. The heat of oxygen generated by the exothermic (or thermal) decomposition of the candle 32, is prevented from being transmitted to the space 39 as much as possible. Because the heat is efficiently supplied to the whole of the candle 32 arranged in the center of the chemical oxygen generator 31, the whole of the candle 32 is uniformly heated. Therefore, when the oxygen generates by the exothermic decomposition of the candle 32 from the right side, the thermal decomposition of the candle 32 will not stop somewhere along the way. Then, all of the NaClO_3 being the main component of the candle 32, is finally changed to NaCl as shown in FIG. 10. Therefore, the generated oxygen can be supplied to the outside in the predetermined flow and the predetermined patterns.

Next, a chemical oxygen generator according to a second embodiment of this invention will be described with reference to drawings of FIG. 11 to FIG. 15. The same Parts as those of the first embodiment, are not described in detail.

Figure 11:
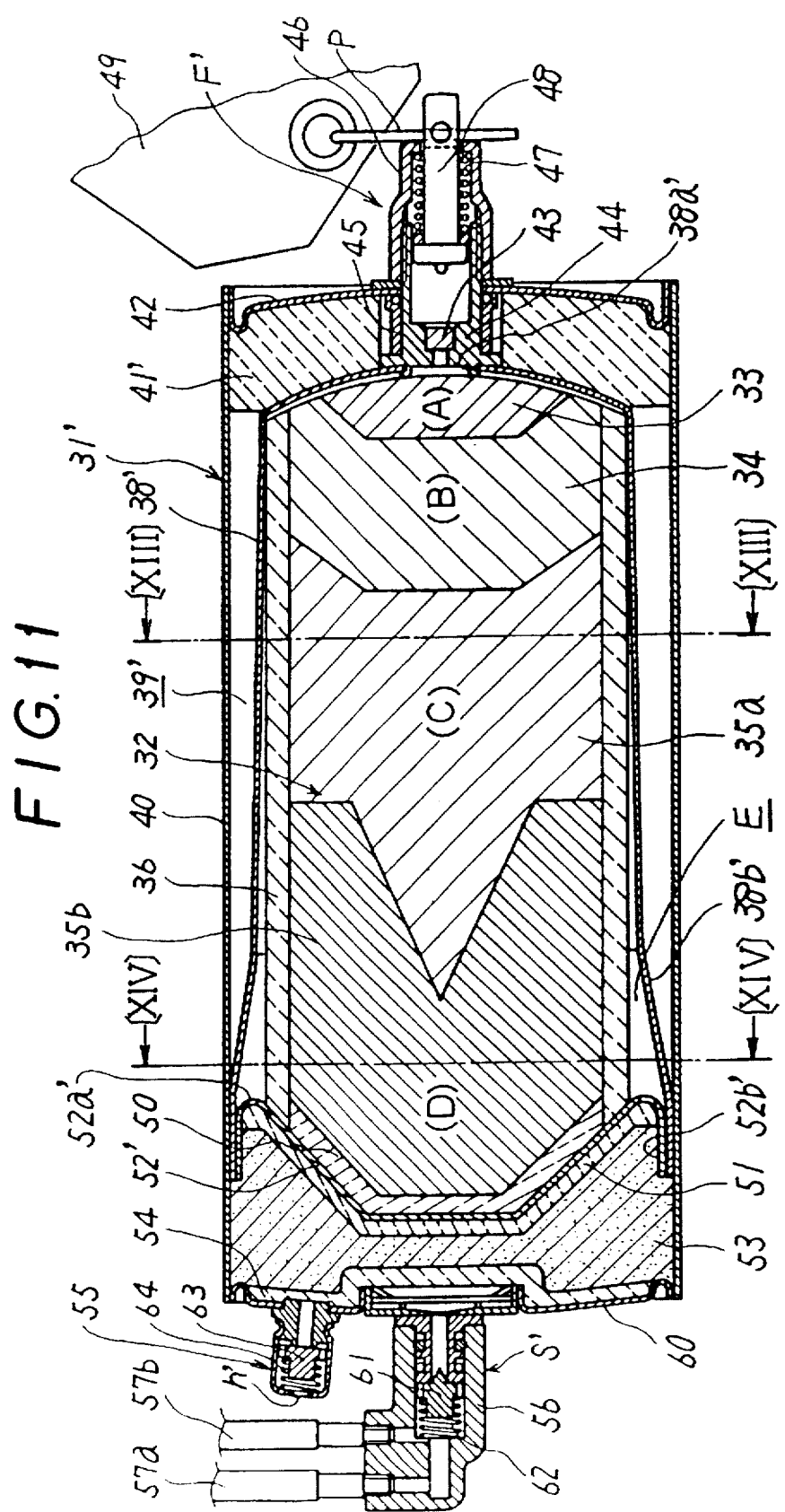
FIG. 11 is a cross-sectional view of a chemical oxygen generator according to a second embodiment of this invention.
Figure 12:
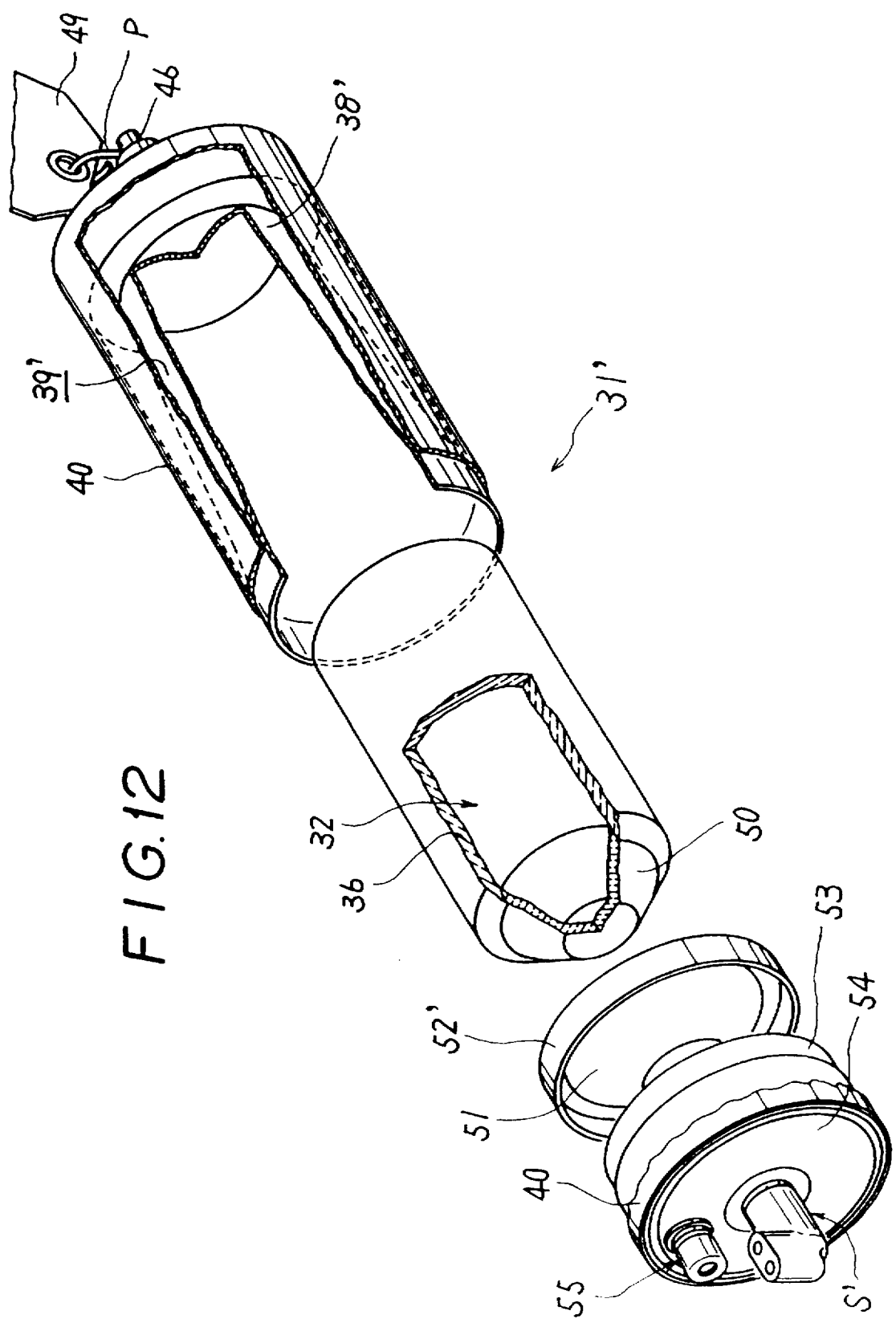
FIG. 12 is an exploded perspective view of a main part of the chemical oxygen generator of FIG. 11.
Figure 13:
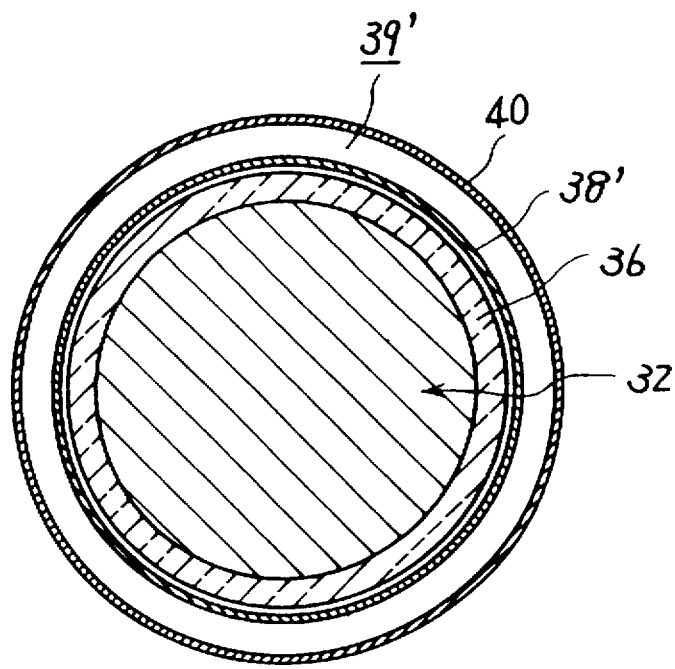
FIG. 13 is a cross-sectional view of the chemical oxygen generator of FIG. 11, taken along the line [XIII]—[XIII].
Figure 14:
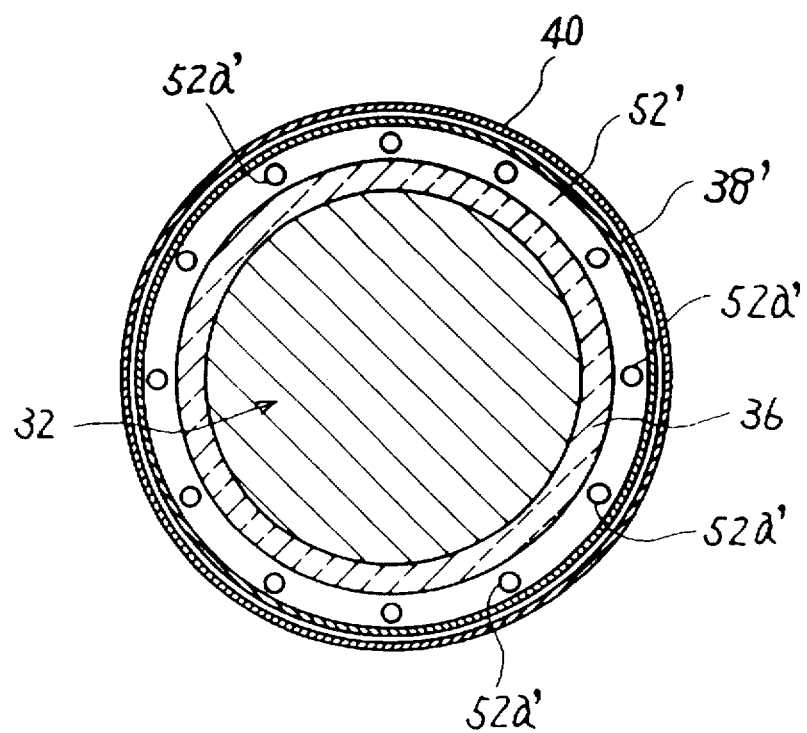
FIG. 14 is a cross sectional view of the chemical oxygen generator of FIG. 11, taken along the line [XIV]—[XIV].

A chemical oxygen generator of the second embodiment of this invention is generally represented by a reference numeral 31'. A candle holder 38' as the first support means is made of a material when is corrosion resistant, reaction inert and heat resistant to the candle 32, such as stainless steel. The candle holder 38' is in the cylindrical shape, having the bottom at the one end portion as shown in FIG. 11 and FIG. 12. The ignition pellet portion 33 and initiation portion 34 of the candle 32 are fitted to the bottom portion of the candle holder 38'. Therefore, the candle holder 38' can certainly and securely support the candle 32. An end portion 38b' of the candle holder 38' is gradually enlarged in diameter. The end of the end portion 38b' is firmly held between the housing 40 and an outer circumferential portion 52b' of the candle support 52' as the second support means. An annular air-tight space 39' is formed between the candle holder 38' and the housing 40. In addition, another space E formed inside of the end portion 38b' of the candle holder 38', is communicated to the plural circular openings 52a'. The reference numeral 41' represents a thermal insulation.

The structure of the chemical oxygen generator 31' of the second embodiment has been described above. Next, operation of the chemical oxygen generator 31' will be described.

On using the chemical oxygen generator 31', the firing pin is pulled out from the hammer piston 48, after the pin P is taken away as in the prior art. Thus, the hammer piston 48 is moved leftwards in FIG. 11 by the spring force of the spring 47 and collides with the primer 43. The primer 43 sparks, and the ignition pellet portion 33 is ignited. Since the ignition pellet portion 33 is thermally decomposed, the oxygen is generated. When the ignition pellet portion 33 is thermally decomposed, the flow of the generated oxygen is in many directions. When the initiation portion 34 begins to thermally decompose, the oxygen continues to generate at the lower flow rate. The generated oxygen is at a high temperature. The generated oxygen flows along the bottom of the candle holder 38', and passes through the thermal insulation 36 and the gap between the thermal insulation 36 and the candle holder 38' leftwards in FIG. 6. The generated oxygen then passes through the plural circular opening 52a', the thermal insulation 51 and the filter 53. Then, the generated oxygen is evolved to the outside through the outlet pipes 57a, 57b of the oxygen-supply device S'. The generated oxygen is cooled enough to have no influence on health on reaching the oxygen-supply device S'.

In this embodiment, the hot oxygen generated from the candle 32, passes through the (porous) thermal insulation 36 or the gap between the inner circumferential portion of the candle holder 38' and the thermal insulation 36, plural circular openings 52a' of the candle support 52' and the filter 53 as above described. In the filter 53, a bad smell or fume from the generated oxygen is removed, and a chlorine gas flowing with the generated oxygen is caught (that holds true also in the first embodiment). Then, the generated oxygen becomes odorless and clean. The air-tight space 39' is formed between the housing 40 and the candle holder 38'. The air in the air-tight space 39' functions as a thermal insulation or is heat insulating. The heat from the candle holder 38' is transmitted to the housing 40 only by radiating. Therefore, the quantity of the heat to transmit to the housing 40, is much smaller than that of the prior art in which the heat is directly transmitted to the housing 11 through the insulation 10. Thus, in the second embodiment of the invention, the thickness of the thermal insulation can be smaller than that of the prior art shown in FIG. 1. Further, the size and the cost of the chemical oxygen generator can be smaller than those of the prior art because of the space 39' functioning as the thermal insulation or heat insulation.

Figure 15:
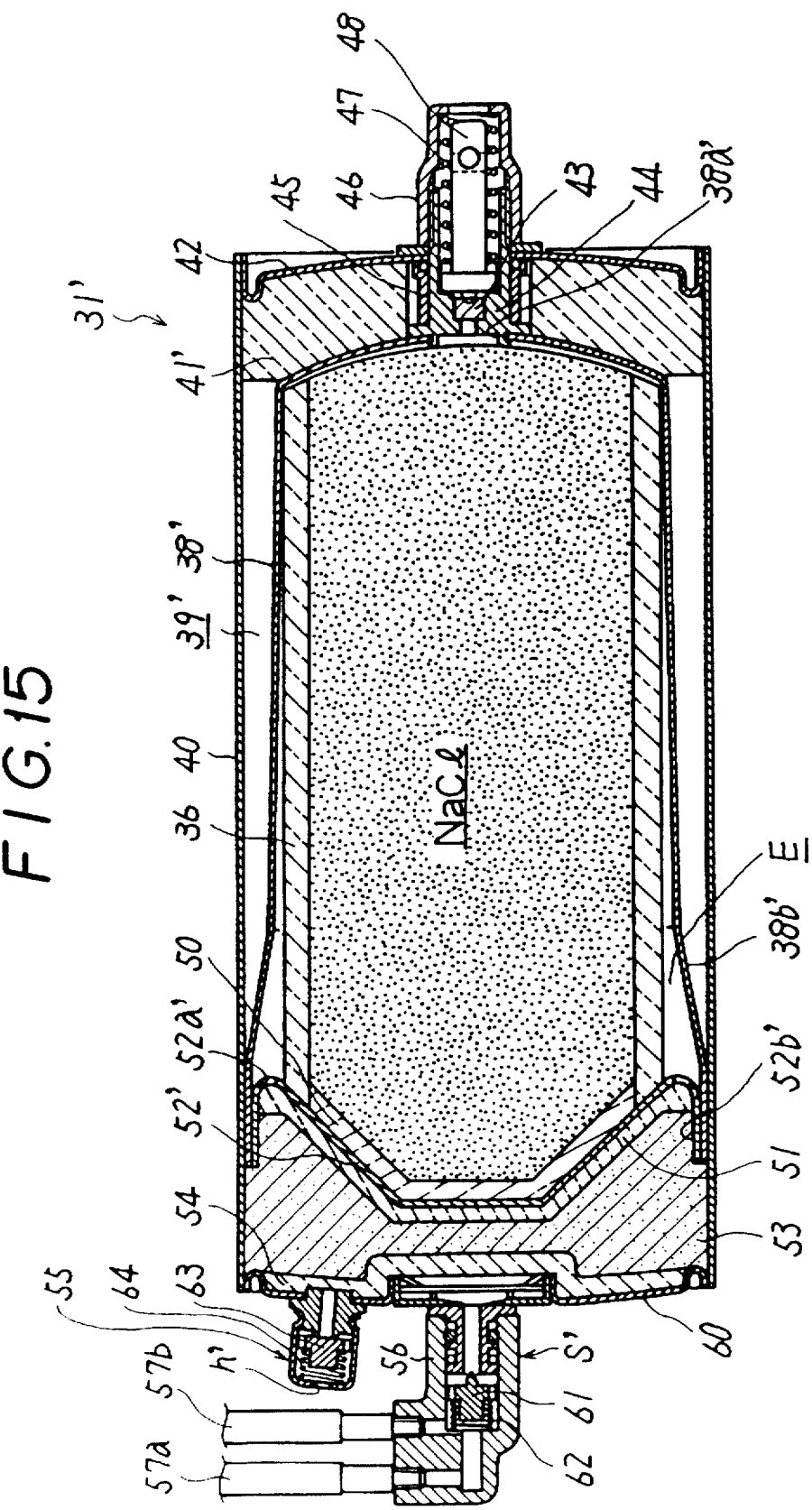
FIG. 15 is a cross-sectional view showing a condition of the perfectly decomposed candle in the chemical oxygen generator of FIG. 11.

In this embodiment, the hot oxygen passes through the inside of the candle holder 38' made of stainless steel, that is, the thermal insulation 36 or the gap between the candle holder 38' and the thermal insulation 36. Then, the oxygen transmits rapidly the heat generated from an A layer of the ignition pellet portion 33 and a B layer of the initiation portion 34 etc. to the left portion of the candle holder 38'. Therefore, the whole of the candle 32 is efficiently heated, and the temperature of the whole of the candle 32 rises. So, the candle 32 will not stop decomposing somewhere along the way. Then, all of the candle 32 is finally changed to NaCl (salt) as shown in FIG. 15.

In the oxygen-supply device S', after the candle 32 begins to thermally decompose, the valve body 61 separates from the valve seat by the pressure of the generated oxygen. After that, the generated oxygen can be supplied to the outside in the flow patterns as shown FIG. 5.

Figure 16:
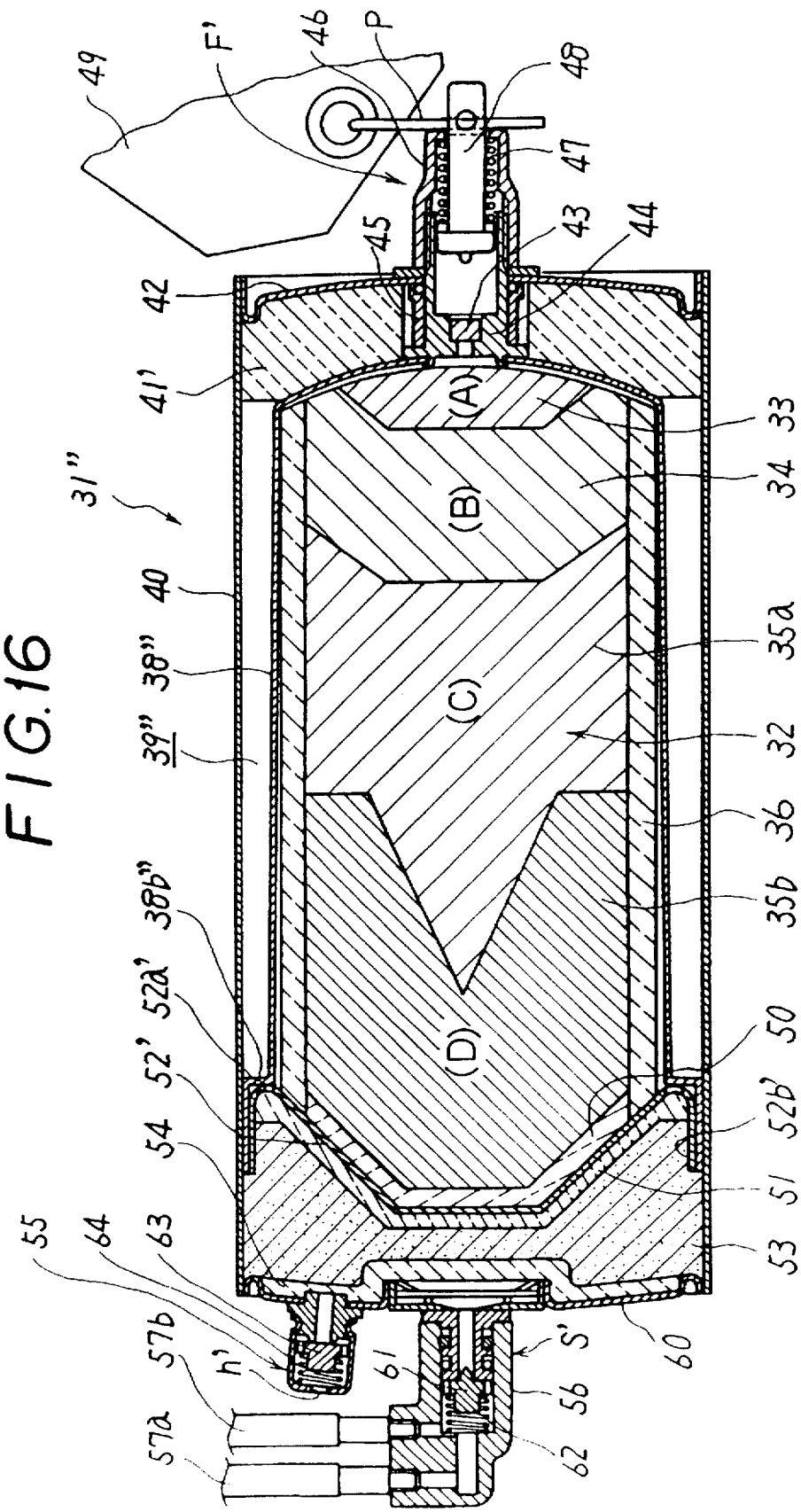
FIG. 16 is a cross-sectional view of a chemical oxygen generator according to a third embodiment of this invention.

FIG. 16 shows a chemical oxygen generator 31" of a third embodiment of this invention. The same parts as those of the above embodiment of this invention are not described in detail.

In this embodiment, a candle holder 38" is disclosed instead of the candle holder 38' of the second embodiment. The candle holder 38" made of metal is generally in the cylindrical shape, having a bottom. The diameter of the circumferential portion of the candle holder 38" is nearly constant except for an end part 38b". The end part 38b" is stepped. The end part 38b" is pinched between the housing 40 and the outer circumferential portion 52b' of the candle support 52'. In the other direction, the end portion of the end part 38b" is held to the housing 40 also by its spring force. The effect of this embodiment is the same as the effect of the above described second embodiment. Further, because an air-tight space 39" formed between the housing 40 and the candle holder 38", is bigger than that of the second embodiment, the effect of the thermal insulation by the space 39" is larger. So, the temperature of the housing 40 is lower than that of the second embodiment, although the other components of this embodiment are just the same as the components of the second embodiment. The temperature of the candle 32 of this embodiment is higher than that of the second embodiment so the candle will not stop decomposing somewhere along the way.

When the oxygen is sufficiently cooled so enough, it is preferable that plural radiating fins are formed on the outer circumferential surface of the cylindrical member 37 (of the first embodiment) or the outer circumferential portion of the candle holders 38', 38". The plural radiating fins are projected into the space 39, 39', 39" Therefore, the heat of the cylindrical member 37 or the candle holders 38', 38" is radiated into the space 39, 39', 39". Accordingly the oxygen passing through the gap between the thermal insulation and the cylindrical member 37 or the candle holders 38', 38", is sufficiently cooled enough.

Further, plural radiating fins are formed at smaller pitches on the part at higher temperature, and plural radiating fins are formed at larger pitches on the part at lower temperature, for cooling the oxygen more. For example, the pitches of the plural radiating fins may be changed according to the surface temperature of the candle holders 38', 38" or the cylindrical member 37. Then, the oxygen can be efficiently cooled enough without increasing the weight.

Also, the space 39, 39', 39" may be filled with wool made of metal, for example, steel wool. Then, because the cylindrical member 37 or the candle holders 38', 38" function as a heat shield, the temperature of the housing 40 is lower than that of the prior art. Further, the density of the wool on the high temperature part of the candle holders 38', 38" or the cylindrical member 37 is higher, and that of the wool on the part of the low temperature part thereof is lower. Then, the oxygen can be efficiently cooled enough in the same manner as the case of forming radiating fins.

Plural partitions may be arranged between the wool of one density and the wool of another density, in the space 39, 39', 39". Therefore, the wool of the one density is prevented from moving towards the wool of the other density, even when the chemical oxygen generator is vibrated. Instead, a wire net may be arranged without the partition. The wool at the higher temperature is tied up with the wire net by metallic strings in order to hold the wool on the higher temperature part and the wool at the lower density on the lower temperature part, respectively. The cylindrical wire net is inserted into the space 39, 39', 39".

Figure 1:
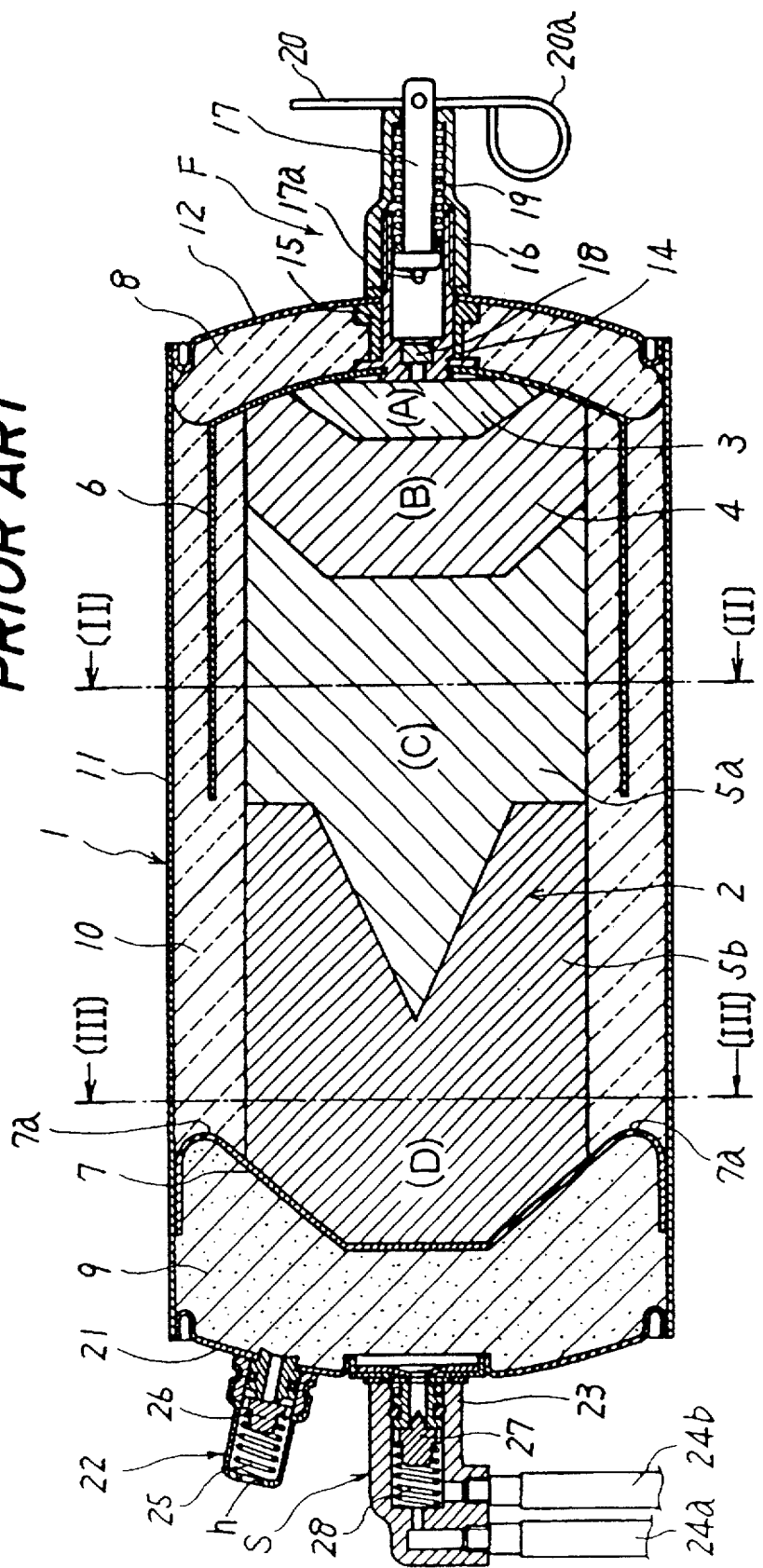
FIG. 1 is a cross-sectional view of a chemical oxygen generator of the Prior Art.
Figure 2:
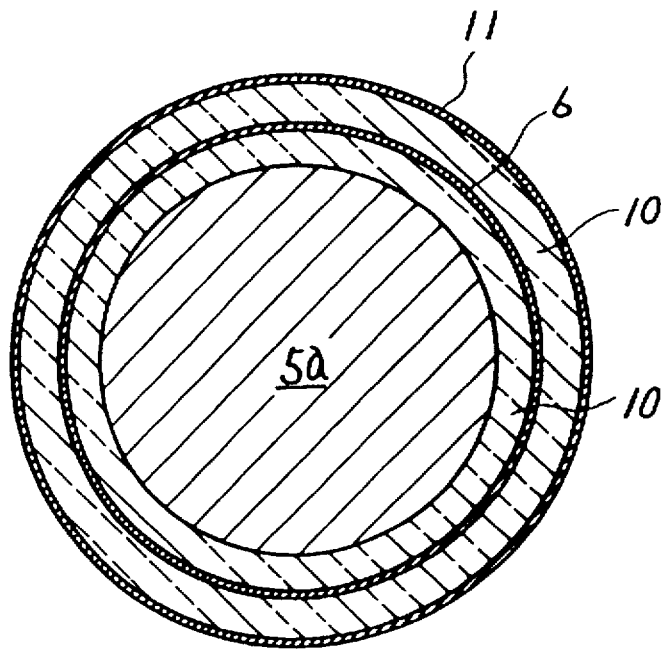
FIG. 2 is a cross-sectional view of the chemical oxygen generator of FIG. 1, taken along the line [II]—[II].
Figure 3:
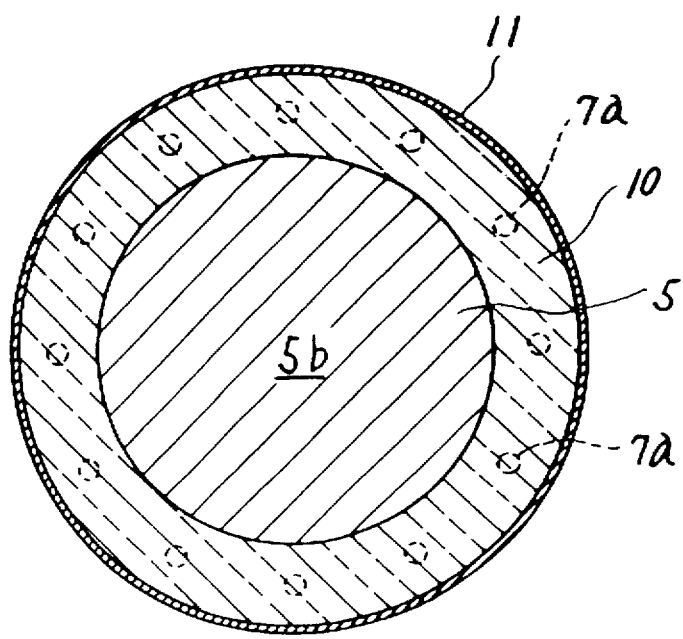
FIG. 3 is a cross-sectional view of the chemical oxygen generator of FIG. 1, taken along the line [III]—[III].

Next, the candle having the oxygen source in the chemical oxygen generators according to the above described embodiments of this invention, will be described. The effect of the candle of this invention will be obtained also in the construction of the oxygen generator 1 of the prior art as shown in FIG. 1.

The oxygen source of the candle 32 in the above described embodiments, is composed of materials as shown in Table 1. The candle 32 consists of an A layer, a B layer, a C layer and a D layer which correspond with the ignition pellet portion 33, the initiation portion 34, and the main portions 35a, 35b, respectively. Each of the layers contains ingredients by weight percentage as shown in Table 1. The main components of each the layer are sodium chlorate ($NaClO_3$) and reduced-iron powder. Sodium chlorate is contained in the A layer, the B layer, the C layer and the D layer, by 50 weight percentages, 70 weight percentages, 85 weight percentages and 87.5 weight percentages, respectively. Reduced iron powder is contained in the A layer, the B layer, the C layer and the D layer by 27 weight percentages, 18 weight percentages, 6 weight percentages and 2.5 weight percentages, respectively. Thus, the candle 32 is so composed as to obtain a speed of thermal decomposition which is increased towards left side of the candle 32. Iron oxide ($Fe_2O_3$) as a catalyst is contained in the A layer, the B layer and the C layer by 9 weight percentages, 10 weight percentages and 7 weight percentages, respectively. Cobalt oxide which is considered as a kind of catalyst, like iron oxide, is contained in the A layer and the D layer by 9 weight percentages and 1 weight percentage. Barium perchlorate ($BaO_2$) is contained in the A layer, the B layer, the C layer and the D layer by 3 weight percentages, 2 weight percentages, 2 weight percentages and 2 weight percentages. Potassium perchlorate which functions to lower the speed of the thermal decomposition, is contained in the D layer by 3 weight percentages. Silicon dioxide ($SiO_2$) which improves formability, is contained in the A layer by 2 weight percentages. Small pieces made of stainless steel is contained in the D layer by 4 weight percentages.

TABLE 1

|  | A layer, (33) | B layer, (34) | C layer, (35a) | D layer, (35b) |
| --- | --- | --- | --- | --- |
| sodium chlorate | 50 | 70 | 85 | 87.5 |
| reduced iron powder | 27 | 18 | 6 | 2.5 |
| iron oxide | 9 | 10 | 7 | — |
| Cobalt oxide | 9 | — | — | 1 |
| Barium peroxide | 3 | 2 | 2 | 2 |
| potassium perchlorate | — | — | — | 3 |
| silicon dioxide | 2 | — | — | — |
| small piece of stainless steel | — | — | — | 4 |

Figure 17:
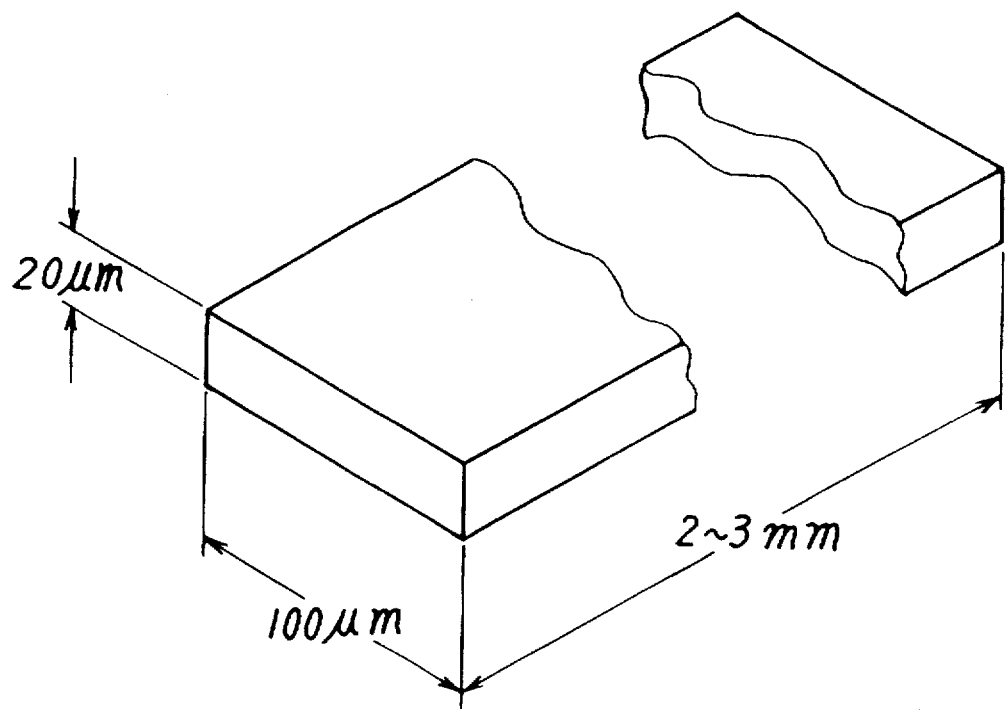
FIG. 17 is an enlarged perspective view of a small stainless piece added in the oxygen source of the first, the second and the third embodiments.

The small pieces made of stainless are in a rectangular shape, as shown in FIG. 17. The thickness of the small pieces is 20 μm, its width is 100 μm, and its length is 2–3 mm. The small pieces are made by cutting a strip of 20 μm in thickness and 100 μm in width, by predetermined pitch. One piece of the small pieces is like a small grain with the naked eyes. An aggregate of the small pieces is good in dispersion. Thus, in the above embodiments of this invention, the small pieces can be uniformly contained in the layer of the candle 32. Further, it is easy to treat and handle the small pieces because of granularity. The size of the small piece is perfectly 10–30 μm in thickness, 80–120 μm in width and 1–5 mm in length. When using the smaller pieces than this size, the effect of the small pieces, that is, the heat transmitting effect by the small pieces is reduced. Also, when using the bigger pieces than this size, it is difficult to uniformly mix with the other components or ingredients.

Figure 4:
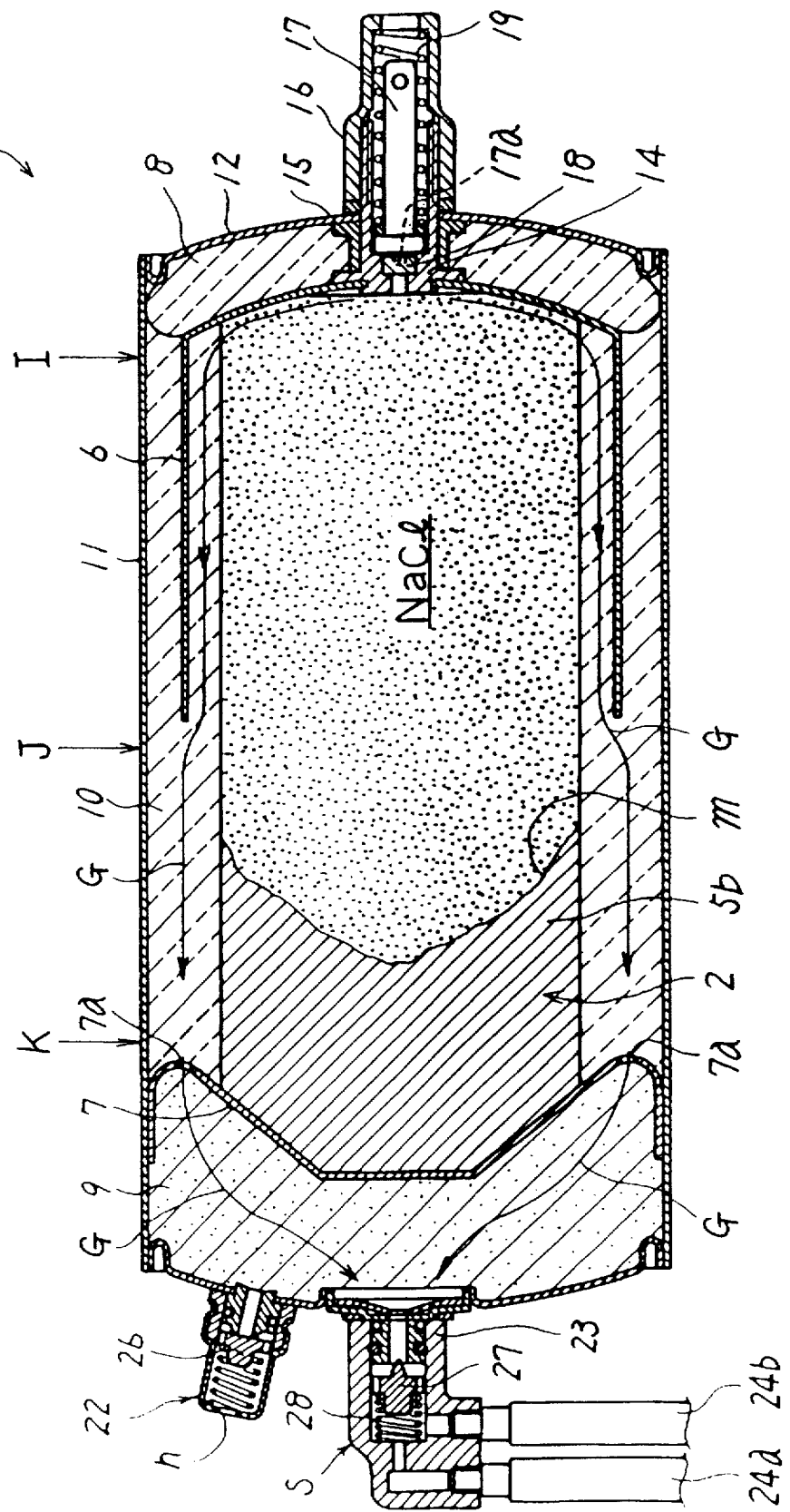
FIG. 4 is a cross-sectional view showing a condition on the way of thermal decomposition of the candle in the chemical oxygen generator of FIG. 1.

Triggering the ignition device of the chemical oxygen generator having the above mentioned candle 32, the oxygen is supplied from the chemical oxygen generator. In the prior art, the candle 32 often ceases to decompose in the portion which consists of slowly decomposing ingredients, as shown in FIG. 4. But, in this embodiment of the invention, the candle 32 does not cease to thermally-decompose. Further, the small pieces made of metal function as a binder among the components. If the chemical oxygen generator 1 of the prior art as shown in FIG. 1 has the candle 32, the candle 32 is thermally decomposed at higher temperature owing to the small pieces, and decomposing never stops on the way m. Therefore, the candle 32 of the chemical oxygen generator is completely reacted to the end of the candle 32 at the side of the oxygen-supply device S'.

The oxygen generates by thermal decomposition of NaClO₃ which is contained in the candle 32. At the same time, chlorine gas generates, too. That is poisonous. Therefore, in the above described embodiments, BaO₂ is added to the oxygen source of the candle 32 so as to catch the generated chlorine gas.

Figure 18:
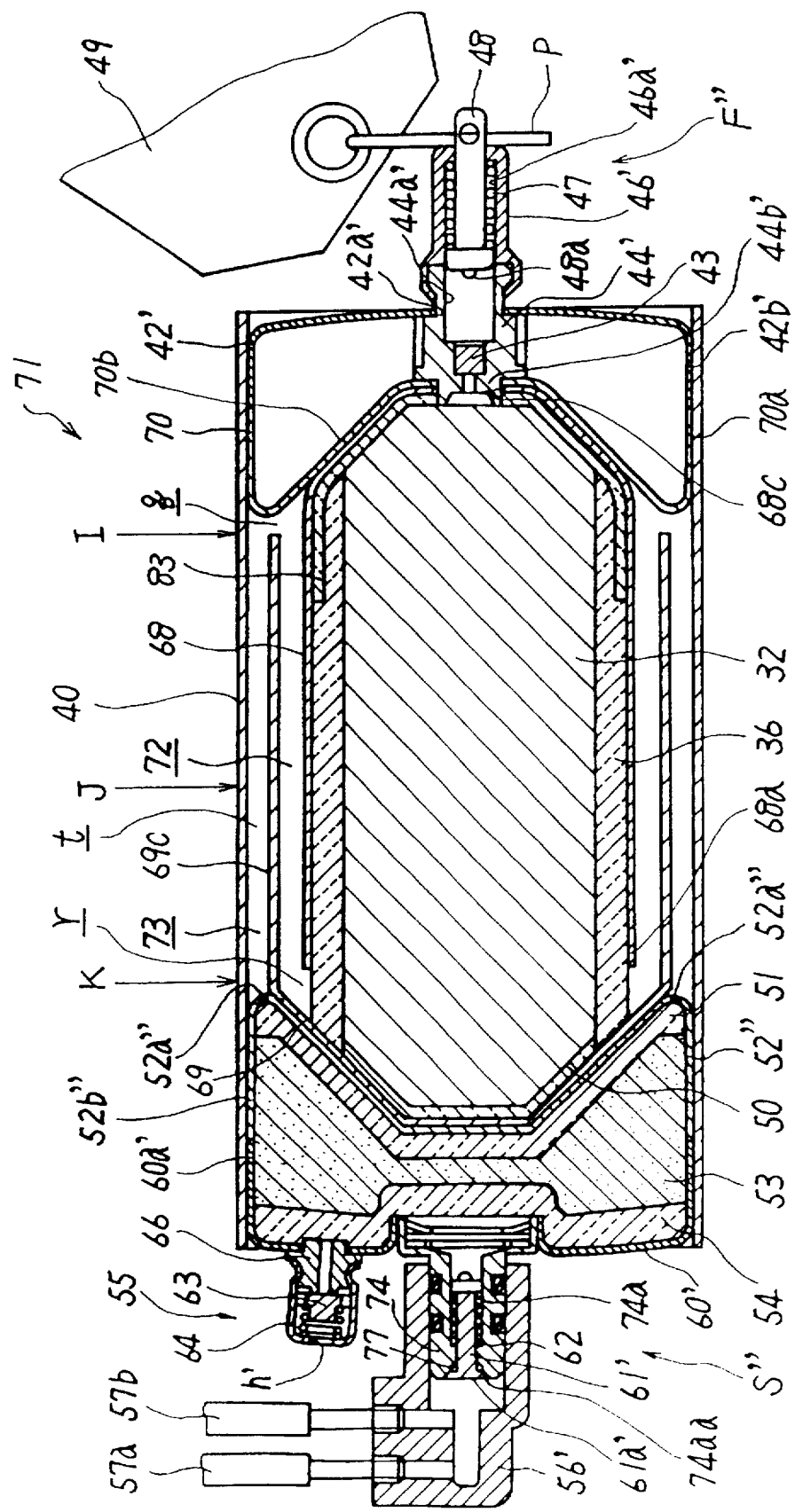
FIG. 18 is a cross-sectional view of a chemical oxygen generator according to a fourth embodiment of this invention.

FIG. 18 shows a chemical oxygen generator 71 according to a fourth embodiment of this invention. Parts which correspond to those in the above embodiments, are denoted by the same reference numerals, the detail of which will be omitted.

In this embodiment, a nearly cylindrical candle 32 is uniformly hatched. However, it consists of an ignition portion, an initiation portion and two main portions in the same manner as the above embodiments. They are not shown there. A candle holder 68 is nearly cup-shaped. A thermal insulation 36 covering the candle 32 is supported by the bottom of the candle holder 68 at its bottom. The candle holder 68 is made of corrosion resistant material, reaction inert and heat resistant to the candle 32, such as stainless. An annular space t is formed between the housing 40 and the candle holder 68.

The candle 32 and the thermal insulation 36 are supported by a candle support 52" at the side of the oxygen-supply device S". A thermal insulation 50 is arranged between the candle 32 and the candle support 52" in the same manner as the above embodiments. Further, in this embodiment, a nearly cup-shaped path-forming member 69 extending in the axial direction is interpolated between the thermal insulation 50 and the candle support 52", and a circumferential part 69c of the path-forming member 69 is arranged between the housing 40 and the candle holder 68. The annular space t is divided into an axial passage 72 and another axial passage 73 by the circumferential part 69c of the path-forming member 69. The passage 73 is the nearest passage to the housing 40 among the passages 72, 73. With the path-forming member 69, the generated oxygen is flowed rightwards through the passage 72, and is flowed leftwards through the passage 73. An annular gap r is formed between the path-forming member 69 and the left end of the candle holder 68. The generated oxygen is led to the passage 72 through the gap r, after it passes through the thermal insulation 36 and the gap between the thermal insulation 36 and the candle holder 68.

Further, in this embodiment, a vibration-preventing member 70 made of metal such as stainless is arranged at the right side of the candle holder 68. It is attached to the primer holding member 44' of the ignition device F" at the central portion. The bottom portion 70b of the vibration-preventing member 70 is fitting to the shape of the right end portion of the candle holder 68. A circumferential portion 70a of the vibration-preventing member 70 is bent rightwards and engaged with the housing 40. A cap 42' as the first cap member closes a right end opening of the tubular housing 40. The circumferential portion 42b' of the cap 42' is bent leftwards and engaged with the housing 40. It is fixed to the circumferential portion 70a of the vibration preventing member 70 by the butt-welding. Further, an annular gap q formed between the right end of the path-forming member 69 and the vibration-preventing member 70. The generated oxygen is flowed through the annular gap q from the passage 72 into the passage 73.

Accordingly, the generated oxygen is flowed through the thermal insulation 36, the annular gap r, the passage 72, the annular gap q, the passage 73 and the plural circular opening 52a" of the candle support 52". Then it is supplied to the outside through the oxygen-supply device S". Therefore, the generated oxygen lastly passes the passage 73, being the nearest to the housing 40, among the passages 72, 73.

Further, in this embodiment, a cap 60', as the second cap member made of plate-like metal such as stainless, is fitted to a left end opening of the tubular housing 40. The end portion 60a' of the cap 60' is bent rightwards as shown in FIG. 18. The outer circumferential portion 52b" of the candle support 52" is fixed to the cap 60' and the housing 40 by the butt welding. A filter 53 is packed between the cap 60' and the candle support 52", through the thermal insulation 54, and the thermal insulation 51, respectively. The relief valve 55 having the similar construction as the prior art. And the valve-seat forming member 74 of the oxygen-supply device S" are arranged on the cap 60'. The through hole 74a is formed in the valve-seat forming member 74. A conical valve seat 74aa is formed at the left end of the through hole 74a as shown in FIG. 18. In the through hole 74a, a valve body 61' is arranged and urged rightwards by the valve spring 62. The valve body 61' has a valve seating portion 61a' at the left end. An annular groove is formed in the valve seating portion 61a'. An O-ring 77 as a sealing member is fitted to the annular groove. When the valve seating portion 61a' of the valve body 61' seats on the valve seat 74aa, the sealing can be obtained. It is superior in sealing effect to the prior art. Thus, a check valve is constituted. The valve-seat forming member 74 is inserted into an L-shaped metal fixture 56', and they are separable from each other. The outlet pipes 57a, 57b are fixed to the metal fixture 56' as the above described metal fixture 56.

Further, in this embodiment, a cylindrical member 46' is engaged to the right end portion of a primer holding member 44' in the ignition device F" by the caulk method. Thus, the number of the parts constituting the ignition device F" becomes smaller. The primer 43 is arranged at the left portion of an inner hole 44a' of the primer holding member 44'. The right portion of the inner hole 44a' is arranged in alignment with the inner hole 46a' of the cylindrical member 46'. The hammer piston 48 is extended through the inner hole 44a' and the inner hole 46a'. Piston 48 is urged leftward by the spring 47 arranged in the cylindrical member 46'. As above described, a projection 48a is formed on the left end portion of the hammer piston 48. The right end portion of the hammer piston 48 is projected out from the cylindrical member 46'. A not-shown firing pin passes through an opening of the right end portion of the hammer piston 48. A pin P is attached to the hammer piston 48. Thus, in this embodiment, the ignition device F" is composed of the primer holding member 44', the cylindrical member 46' and the primer 43, the spring 47, and the hammer piston 48. It is inserted through an opening 42a' of the central portion of the cap 42'. The cap 42' and the primer holding member 44' are fixed to each other by laser beam welding.

Further, the thermal insulation 83 is arranged between the bottom portion of the candle holder 68 and the right end portion of the candle 32, and it is integrally formed with the above described thermal insulation 36. The thermal insulation 83 is harder than the above described thermal insulation 36. At the beginning of the thermal decomposition of the candle 32, the generated oxygen flows through the thermal insulation 83 to the thermal insulation 36. Also, it functions as a cushion between the hard candle 32 made by compression molding and the hard candle holder 68 made of metal.

What has been described is the construction of the chemical oxygen generator 71 according to this embodiment. Next, its operation will be described.

On use, the firing pin and pin P are drawn out from the hammer piston 48. In the same manner as the above embodiments, the hammer piston 48 is rapidly moved leftwards by the spring action of the spring 47. The projection 48a of the hammer piston 48 collides with the primer 43, and it is ignited. The spark from the primer 43 fires the candle 32. The candle 32 is gradually thermally decomposed from the side of the ignition device F". The oxygen is generated. At the beginning of the thermal decomposition, the generated oxygen flows through the thermal insulation 83. Then, the oxygen is flowed leftwards to the thermal insulation 36 and the gap between the thermal insulation 36 and the candle holder 68. After it reaches the left end of the thermal insulation 36, it flows into the passage 72 through the annular gap r. It is flowed through the passage 72 rightwards, and reaches to the right end portion of the passage 72. Then, it flow through the annular gap q into the passage 73 nearest to the housing 40 leftwards. Further, it flows through the plural circular openings 52a" of the candle support 52" and the thermal insulation 51 into the filter 53. Dusts and fume are removed from the generated oxygen by the filter 53, and it becomes clean and odorless. It is then supplied through the outlet pipes 57a, 57b of the oxygen-supply device S". The valve body 61' is moved leftwards against the valve spring 62 by the pressure of the generated oxygen in the oxygen-supply device S". Accordingly, the valve seating portion 61a' of the valve body 61' is separated from the valve seat 74aa.

In this embodiment, the passage 72 is formed between the path-forming member 69 and the candle holder 68. Further the passage 73 nearest to the housing 40 is formed between the path-forming member 69 and the housing 40. The hot oxygen is gradually cooled while passing through the passage 72. When it flows through the passage 73 nearest to the housing 40, it has been considerably cooled. Accordingly, the housing 40 does not become so hot, and the surface of the chemical oxygen generator 71 is not so hot.

Figure 19:
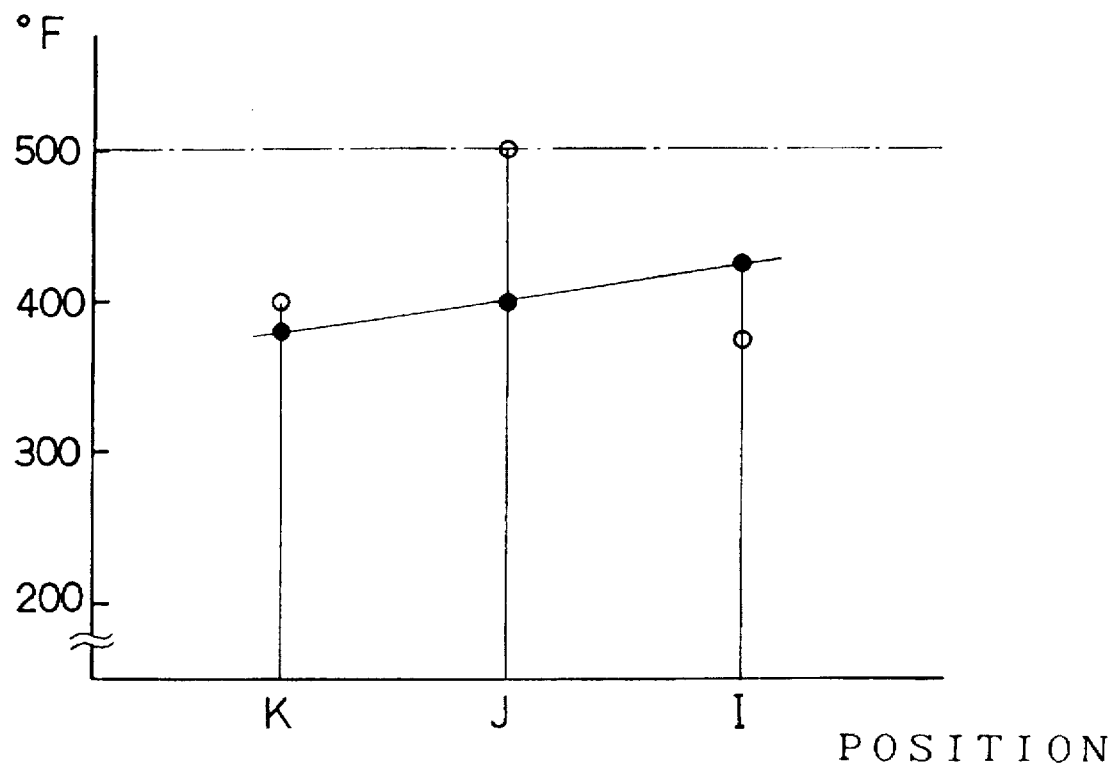
FIG. 19 is a chart showing the surface temperatures of the chemical oxygen generator of FIG. 1 and that of FIG. 18.

The measurement results of the surface temperatures of the chemical oxygen generator 71 in this embodiment are shown in FIG. 19. Black circles show the surface temperatures of the chemical oxygen generator 71 according to this embodiment, and white circles show the surface temperatures of the chemical oxygen generator 1 according to the prior art, for comparing this invention with the prior art. The marks K, J and I in FIG. 19 represent the respective positions of the housing 11, 40 with respect to the surface of the chemical oxygen generators 1, 71. As is clear from FIG. 4 and FIG. 18, the position of the mark I corresponds to the position of the right end position of the thermal insulations 10, 36 covering the candle 2, 32. The position of the mark J corresponds to the central portion of the candle 32. Besides, it corresponds to the position from which the oxygen flows out on the circumferential portion of the candle holder 6 in the prior art. The position of the mark K corresponds to the position which is directly before the plural circle openings 7a, 52a" of the candle support 7, 52" with respect to the generated oxygen flow direction. As is clear from FIG. 19, the temperature of the position of the mark J on the housing 11 of the chemical oxygen generator 1 in the prior art is equal to about 500° F. and it is considerably high. It is higher by about 100° F. than those of the other positions of the marks I and K in the prior art, and it is a little lower than the specific value 500° F. The hot oxygen is flowed out from the circumferential portion of the candle holder 6, and the heat of the hot oxygen is transmitted through the thermal insulation 10 to the housing 11. That is the reason why the central portion J of the housing 11 is very hot in the prior art. However, in the chemical oxygen generator 71 of this embodiment, the surface temperature of the position of the mark J of the housing 40 is equal to about 400° F. It is lower by about 100° F. than that of the chemical oxygen generator 1 of the prior art. Thus, the surface temperatures of housing 40 of the chemical oxygen generator 71 are equalized around 400° F. in this embodiment. Even when the specific value is under 500° F., its value can be sufficiently lower.

Further, in this embodiment, after the hot oxygen flows through the inner passage 72, it flows through the outer passage 73. Since the hot oxygen flows through the inner passage 72 which is nearer to the candle 32, the heat from the hot oxygen is effectively transmitted to the candle 32, and so thermal decomposition does not end before or in the last layer portion in which the reaction speed is lower. The oxygen can be supplied sufficiently and securely to the outside.

Further, in this embodiment, the vibration-preventing member 70 is engaged with the housing 40 near the candle holder 68 at the circumferential portion 70a. Accordingly, the candle 32 is engaged with housing 40 through the two members which are the cap 42' through the ignition device F" and the vibration-preventing member 70. Because it is arranged nearer to the candle 32 than the cap 42', the candle 32 can be more securely supported than that of the prior art. Even when the chemical oxygen generator 71 is roughly handled and is vibrated, the candle 32 can be prevented from falling out or breaking. Further, the vibration-preventing member 70 and the cap 42' are connected with each other directly or through the housing 40, and those two members interfere with each other against axial vibration. Accordingly, even when the total weight is not so large, the chemical oxygen generator is superior in the vibration prevention characteristic to the prior art. Further, the vibration-preventing member 70 is fitted to the shape of the bottom portion of the candle holder 68. It therefore supports the candle holder 68 supporting the right end portion of the candle 32 and the thermal insulation 36. Accordingly, even when the chemical oxygen generator 71 of this invention is roughly handled and it is vibrated, it can be prevented from being deteriorated, in contrast to the prior art. The candle 32 can be prevented from falling out and coming off from the candle holder 68 and the candle support 52". Further, the candle 32 can be prevented from becoming damaged. Accordingly, the oxygen flow patterns can be obtained in the desired manner.

The cylindrical member 46' is fixed to the primer holding member 44' by caulk in the ignition device F" of this embodiment. Accordingly, the number of the parts can be decreased and the construction of the ignition device F" can be simple. Also, the O-ring 77 is fitted to the valve seating portion 61a' of the valve body 61 in the oxygen-supply device S". Thus, high or tight sealing can be obtained. Further, the valve seat forming member 74 is inserted into the metal fixture 56', and so it can be easily assembled at the maintenance stage.

Further, in this embodiment, since the cap 60' and the candle support 52" are engaged with each other. They interfere with each other in the axial direction. Accordingly, the frictional movements of the pellets of the filter 53 can be reduced to the minimum. The grain sizes of the pellets of the filter 53 can be prevented from being small-sized, and the empty cavities and voids can be prevented from being made in the filter 53. Accordingly, the dusts and fumes can be assuredly removed from the generated oxygen. Further, the proper performance of the filter 53 can be maintained even when the chemical oxygen generator is vibrated.

Thus, in this embodiment, the housing 40 can be prevented from heating to the high temperature. Also the heat from the hot oxygen is preferentially transmitted to the candle 32, so the candle 32 does not cease to thermally decompose. The desired oxygen flows can be obtained in the same manner as the above described embodiments. Further, the vibration proof or prevention can be improved. The candle 32 can be prevented from being fallen out and coming dislodged. The path-forming member 69 forming the passage 72, 73 can be prevented from moving and deforming. Accordingly, the flow cross-section of the generated oxygen in the passage 72, 73 can be always constant, and so the oxygen passing through the passage 72, 73 can be surely cooled.

Figure 20:
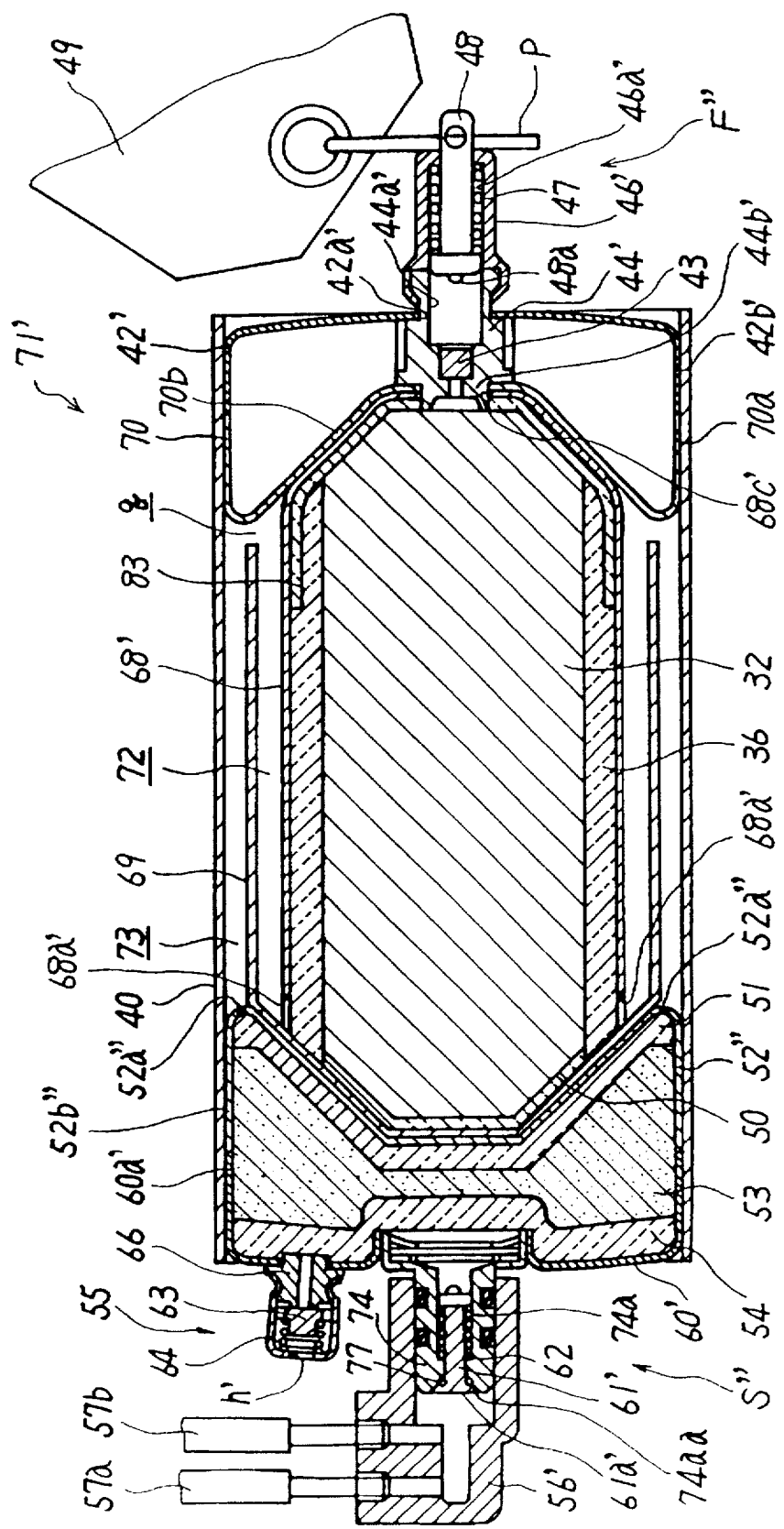
FIG. 20 is a cross-sectional view of a chemical oxygen generator according to a fifth embodiment of this invention.
Figure 21:
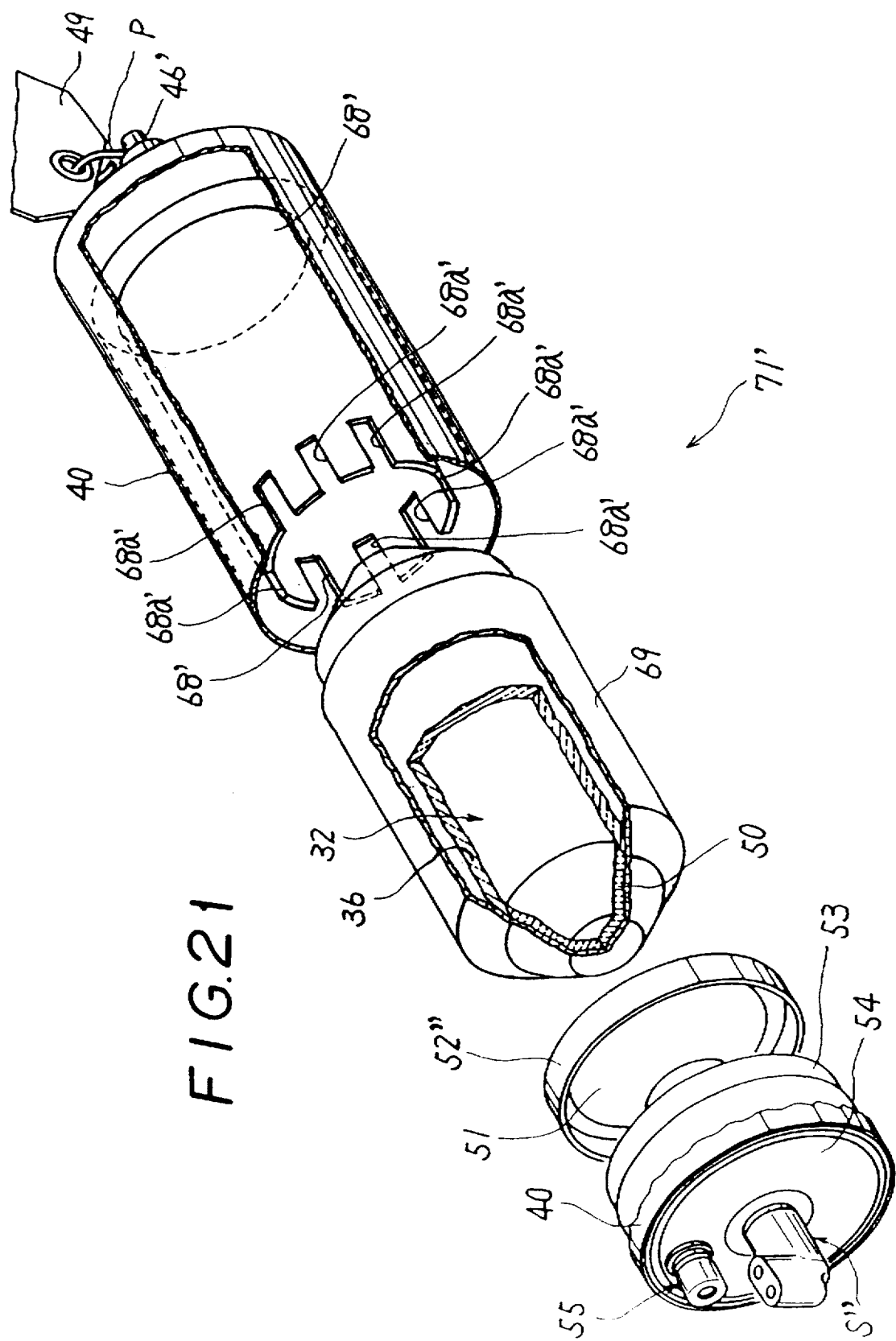
FIG. 21 is an exploded perspective view of a main part of the chemical oxygen generator of FIG. 20.
Figure 22:
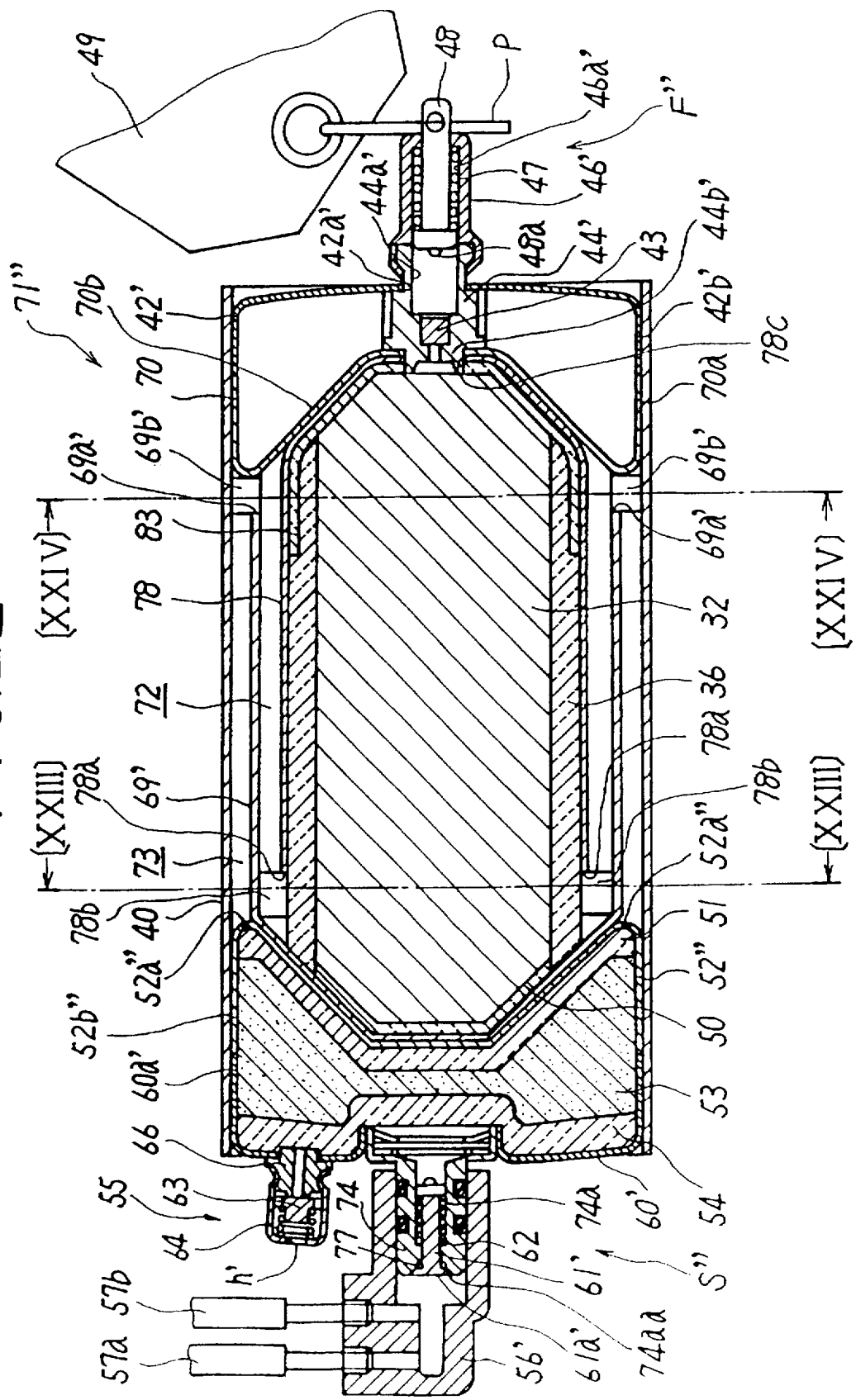
FIG. 22 is a cross-sectional view of a chemical oxygen generator according to a sixth embodiment of this invention.

Next, a chemical oxygen generator according to a fifth embodiment of this invention will be described with reference to FIG. 20 and FIG. 21. The parts which correspond to those in the above embodiments are denoted by the same reference numerals, the detail of which will be omitted.

An chemical oxygen generator of this embodiment is denoted generally by a reference numeral 71'. It has almost the same construction as the above described chemical oxygen generator 71 according to the fourth embodiment. Also in this embodiment, the candle holder 68' also has almost the same construction as the above described candle holder 68. The left portion 44b' of the primer holding member 44' of the ignition device F" is inserted through the opening 68c' formed at the bottom portion of the candle holder 68'. In this embodiment, the left end portion of the candle holder 68' contacts with the path-forming member 69. Plural notches or cut-outs 68a' as shown in FIG. 21 are formed in the left end portion of the candle holder 68'. The oxygen generated from the candle 32 flows through the notches or cut-outs 68a' from the left end portion of the thermal insulation 36 into the passage 72, after it passes the thermal insulation 36 and the gap between the thermal insulation 36 and the candle holder 68'.

This embodiment has the following effects in addition to the same effect as the fourth embodiment. As above described, the end portion of the candle holder 68' supporting the right side portion of the candle 32 is contacted with the path-forming member 69 in this embodiment. Accordingly, the candle holder 68' for supporting the right side portion of the candle 32 is supported at the bottom portion and at the other end portion. Thus, it is more superior in the vibration prevention characteristics. The end portion of the candle holder 68' is only contacted with the path-forming member 69 without any fixing method such as welding. Accordingly, the number of steps for manufacturing and assembling processes is not increased, but the vibration proof can be more improved.

In this embodiment, the plural notches or cut-outs 68a' are formed at the end portion of the candle holder 68' contacting with the path-forming member 69. The oxygen after passing through the thermal insulation 36 covering the candle 32, is flowed through the notches 68a' into the passage 72. Instead of the plural notches or cut-outs 68a', the plural openings may be formed in the end portion of the candle holder which contacts with the path-forming member 69. Also, in this case, the same effect can be obtained as in this embodiment.

Next, a chemical oxygen generator according to a sixth embodiment of this invention will be described with reference to FIG. 22 to FIG. 28. The parts which correspond to those in the above embodiments, are denoted by the same reference numerals, the detail of which will be omitted.

Figure 23:
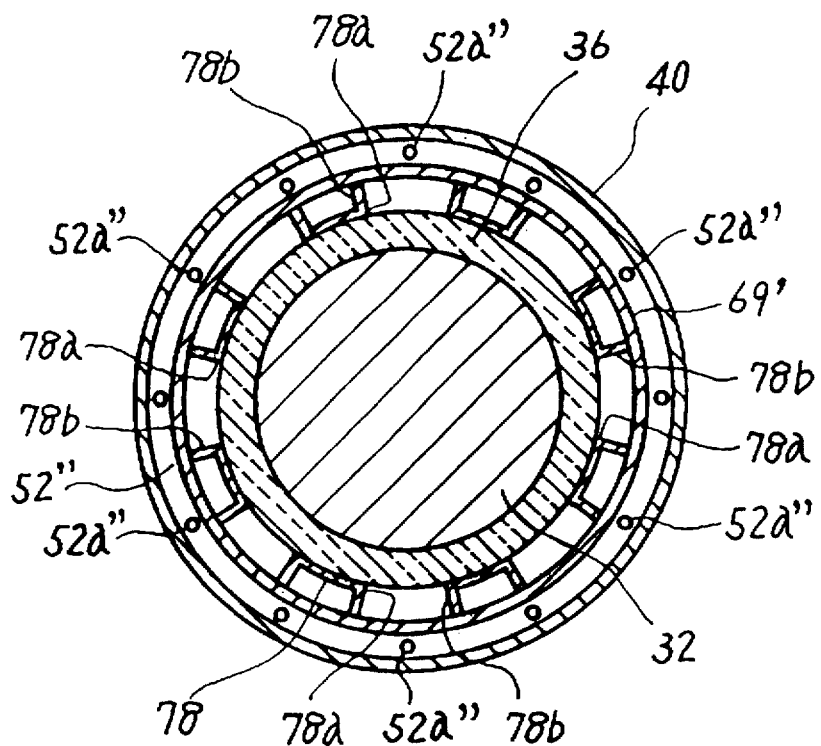
FIG. 23 is a cross-sectional view of the chemical oxygen generator of FIG. 22, taken along the line |XXIII|—[XXIII].

The chemical oxygen generator of this embodiment is generally denoted by the reference numeral 71". It has a construction similar to the above described chemical oxygen generators 71, 71'. The candle 32 is supported by a candle holder 78 at the right portion. The candle holder 78 is made of material being corrosion resistant, reaction inert and heat resistant as is the case with the above candle holder 68, 68'. The material is, for example, stainless steel. It is cylindrical, cylindrical in shape and has a bottom. An opening 78c is formed at the center of the bottom of the candle holder 78. The primer holding member 44' of the ignition device F" is fitted to the round opening 78c. As shown in FIG. 23, plural slit notches or cut-outs 78a are formed in the left end portion of the candle holder 78. Plural juts or tabs 78b are radially formed by bending portions of the slit notches 8a. Accordingly, the width of the slit notch 78a is equal to the double of the height of the jut 78b. The juts 78b are pressed to the inner circumferential surface of the path-forming member 69'. The path-forming member 69' is extended rightwards so as to contact with the vibration-preventing member 70. Plural slit notches or cut-outs 69a' are formed in the right end portion of the path-forming member 69'. They are formed at the predetermined angular interval, as the slit notches 78a of the candle holder 78. Paired juts or tabs 69b' are extended radially, formed at both sides of the slit notches 69a'. Accordingly, the width of the slit notch 69a' is equal to the double of the height of the jut 69b'. Similarly, the juts 69b' are pressed to the inner circumferential surface of the housing 40.

The operations of this embodiment are similar to those of the fourth embodiment. Accordingly, the description of this operation will be omitted. In this embodiment, the juts 78b formed at the end portion of the candle holder 78 are pressed to the inner circumferential surface of the path-forming member 69', and the juts 69b' formed at the end portion of the path-forming member 69' are pressed to the inner circumferential surface of the housing 40. Therefore, the end portion of the path-forming member 69, which is apt to move, is supported by the housing 40 through the juts 69b, while the end portion of the candle holder 78, which is apt to move, is supported by the path-forming member 69' through the juts 78b. Thus, the candle holder 78 is prevented from vibrating radially, which supports the right end portion of the candle 32. Also, the candle 32 is supported by the vibration-preventing member 70 and the cap 42' at the right side, and is supported by the candle support 52" at the left side. Thus, it is prevented form vibrating axially. Namely, the candle 32 is prevented from vibrating or moving axially and radially. Accordingly, the chemical oxygen generator 71" of this embodiment is superior in vibration prevention characteristics to the above described embodiments. Even when the chemical oxygen generator 71" of this embodiment is roughly handled and is vibrated, the candle 32 is prevented from falling out and coming out from the candle holder 78 and the candle support 52". Also, it does not become damaged. As a result, in the predetermined pattern and predetermined flow, the oxygen can be generated securely. In this embodiment, the end portion of the path-forming member 69' which is disposed between thermal insulation 50 and candle support 52 is pressed to the vibration-preventing member 70. In other words, the path-forming member 69' is supported at both of the sides. Further, the candle holder 78 engaged with the path-forming member 69' is supported at both of the sides. Accordingly, the candle holder 78 supporting the candle 32 can be prevented from vibrating. Also, in this embodiment, the housing 40 does not become so hot. In this embodiment, the candle 32 can be perfectly thermal decomposed. Even when the chemical oxygen generator 71" of this embodiment is shaken or vibrated, the passages 72, 73 through which the generated oxygen passes, are not deformed. The hot oxygen can be securely cooled, and guided in the predetermined manner.

In this embodiment, the juts 78b and the slit notches 78a are formed on the candle holder 78 by the sequential manufacturing steps, and the juts 69b' and the slit notches 69a' are formed on the candle holder 69' by the sequential steps. Thus, the juts 78b, 69b' and the slit notches 78a, 69a' are not formed by separate parts. Therefore, the cost is low, and the number of the forming process steps for the candle holder 78 having the juts 78b and the path-forming member 69' having the juts 69b' are small.

In this embodiment, the slit notches 78a are formed at the end portion of the candle holder 78 so that the generated oxygen is flowed from the thermal insulation 36 into the passage 72. Instead of the silt notches 78a, plural openings may be formed at the end portion of the candle holder 78. Further, the end of the candle holder 78 may be contacted with the path-forming member 69'. Further, in this embodiment, the slit notches 69a' are formed at the end portion of the path-forming member 69' so as to flow the generated oxygen from the passage 72 to the passage 73. Instead of the slit notches 69a', plural openings may be formed at the end portion of the path-forming member 69'. It is contacted with the vibration-preventing member 70 at all of the end surface. In this case, in contrast with the case wherein the slit notches 69a' are formed and the juts are contacted with path-forming member 69', the vibration prevention characteristics can be increased. Further, in this embodiment, the juts 78b and the juts 69b' are pressed to the path-forming member 69' and the housing 40, respectively. Accordingly, the number of steps of the forming process of the chemical oxygen generator is small, improving the vibration proof characteristics.

Figure 24:
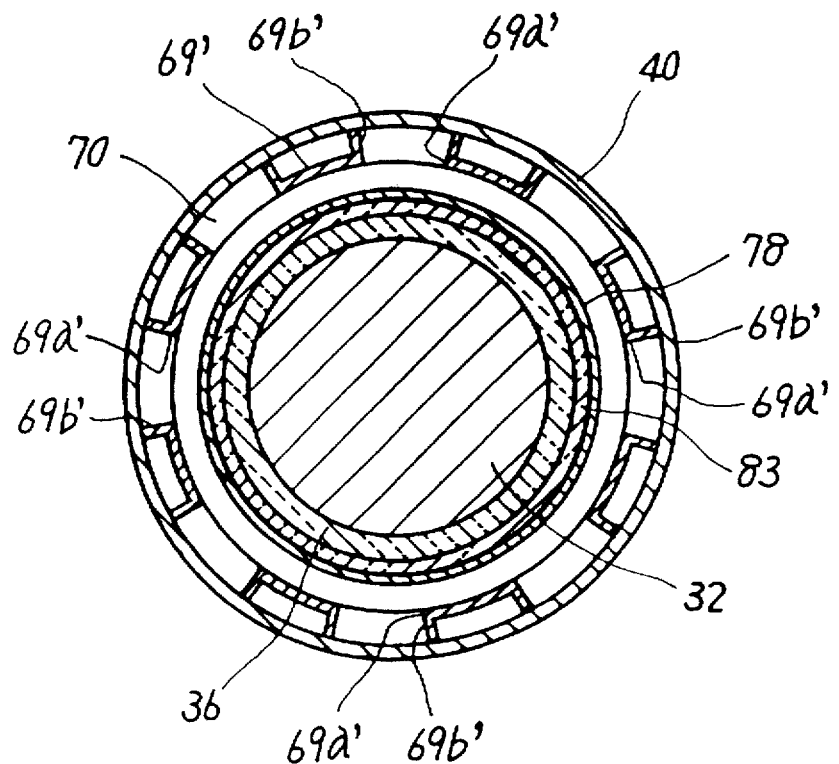
FIG. 24 is a cross-sectional view of the chemical oxygen generator of FIG. 22, taken along the line [XXIV]—[XXIV].

As shown in FIG. 24, all of the juts 69b' formed at the end portion of the path-forming member 69' are pressed to the inner circumferential surface of the housing 40. Instead, some of the juts 69b' may be bent inwards in the radial direction and pressed to the outer circumferential surface of the candle holder 78. In this case, the path-forming member 69' contacts not only with the housing 40, but also with the candle holder 78 at its end portion. Accordingly, the vibration proof characteristics in the radial direction can be more improved.

Figure 25:
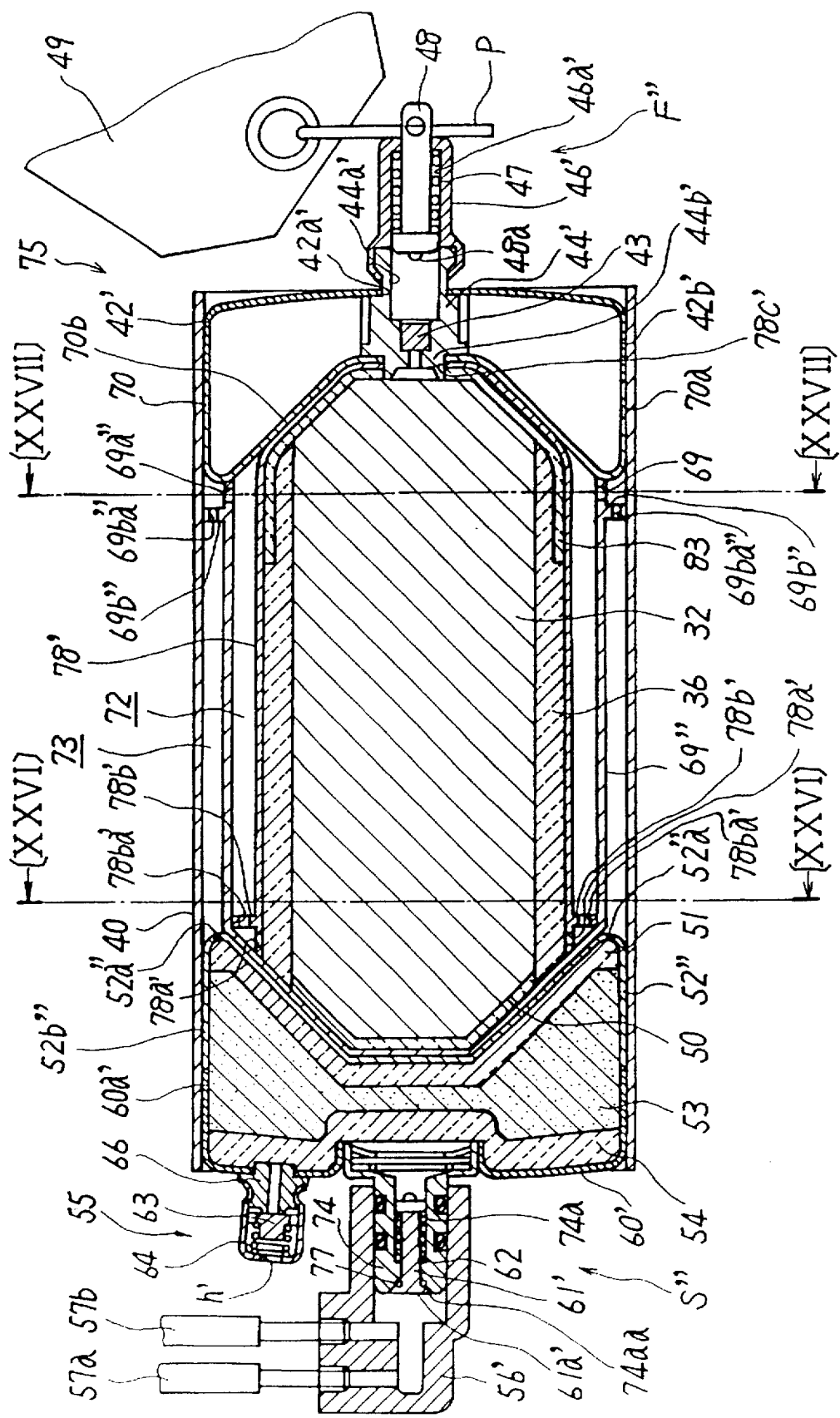
FIG. 25 is a cross-sectional view of the chemical oxygen generator of a first modification of the sixth embodiment of FIG. 22.
Figure 26:
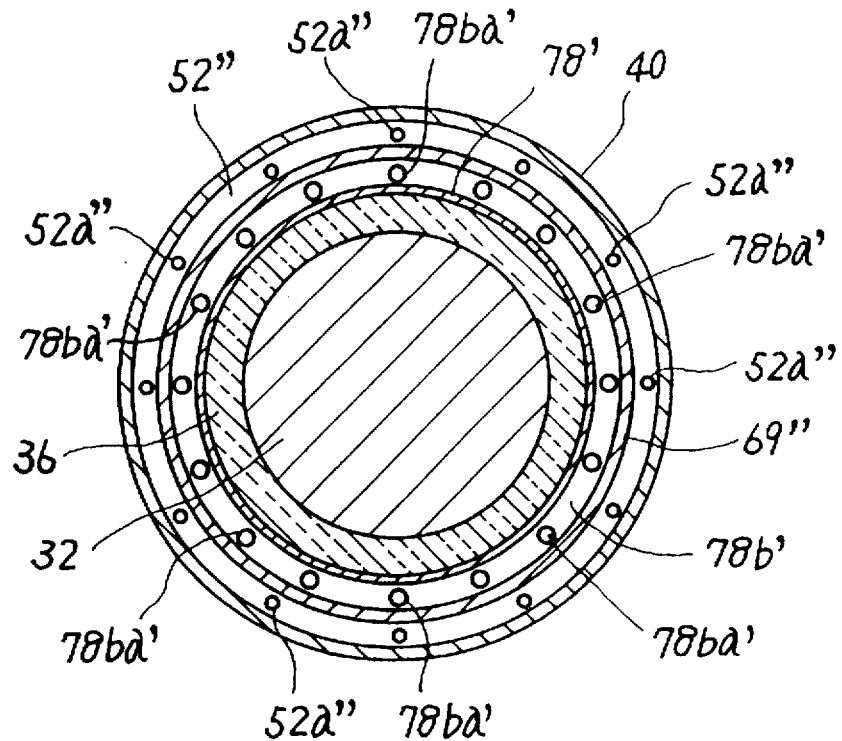
FIG. 26 is a cross-sectional view of the chemical oxygen generator of FIG. 25, taken along the line [XXVI]—[XXVI].
Figure 27:
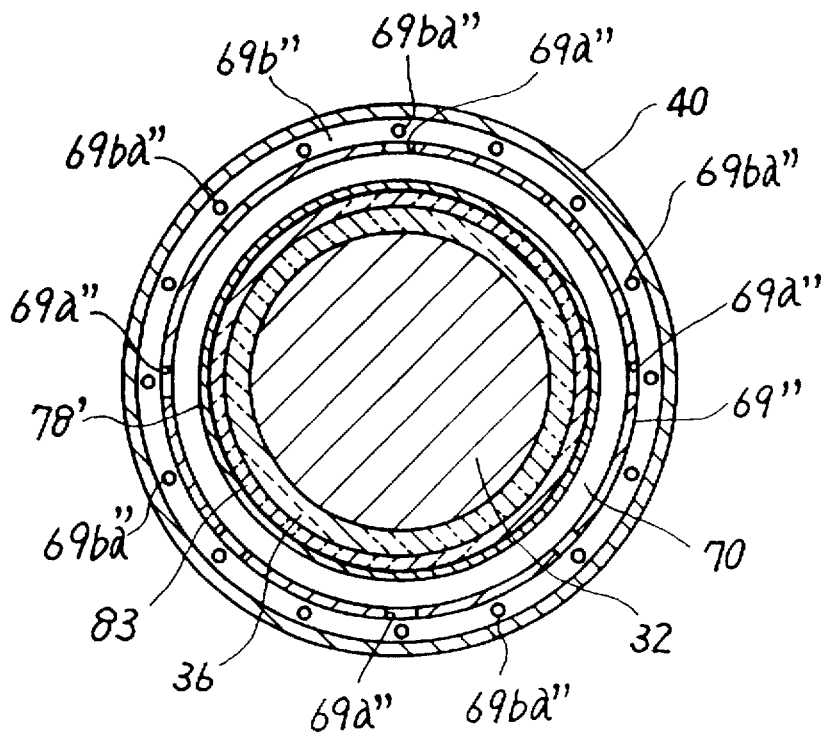
FIG. 27 is a cross-sectional view of the chemical oxygen generator of FIG. 25, taken along the line [XXVII]—[XXVII].

In the above sixth embodiment, the juts 78b, 69b' are so formed as to extend in the axial direction of the chemical oxygen generator 71". Instead, an annular jut or projection may be formed at the end portion of the candle holder and is pressed to the inner circumferential surface of the path-forming member. Also, an annular jut or projection may be formed at the end portion of the path-forming member, and is pressed to the inner circumferential surface of the housing. That is, the chemical oxygen generator 75 of one modification of this embodiment, is shown in FIG. 25 to FIG.27. In these drawings, the candle holder 78' has similar shape and is made of similar material to the above described candle holder 78. Plural openings 78a' are formed at the end portion of the candle holder 78' contacted with the path-forming member 69". An annular jut or projection 78b' formed at the end portion of the candle holder 78', is pressed to the inner circumferential surface of the path-forming member 69. Plural openings 78ba' are formed on the annular jut 78b' in FIG 26. Further, openings 69a" may be formed at the end portion of the path-forming member 69", and the end of the path-forming member 69" may be pressed to the vibration preventing member 70. Further, an annular jut 69b" may be formed so as to press to the inner circumferential surface of the housing 40, and plural openings 69ba" are formed in the annular jut 69b". In this case, the path-forming member 69" is engaged with the housing 40 through all of the outer surface of the annular jut 69b", and the candle holder 78' is engaged with the path-forming member 69" through all of the outer surface with the annular jut 78b'. Accordingly, it can be more securely supported than the above sixth embodiment with the juts 78b, 69b'. Accordingly, in this case, the above described effects can be obtained. That is, the candle 32 can be prevented from falling out, coming off and breaking. The candle 32 can be perfectly thermally decomposed. The oxygen can be obtained in the predetermined pattern and predetermined flow. Thus, the chemical oxygen generator 75 in this case is superior in the vibration prevention characteristics. The passages 72, 73 can be prevented from deforming. Accordingly, the generated oxygen can be cooled enough, before it flows into the passage 73 which is the outer most passage portion. Therefore, the housing 40 does not becomes so hot.

Figure 28:
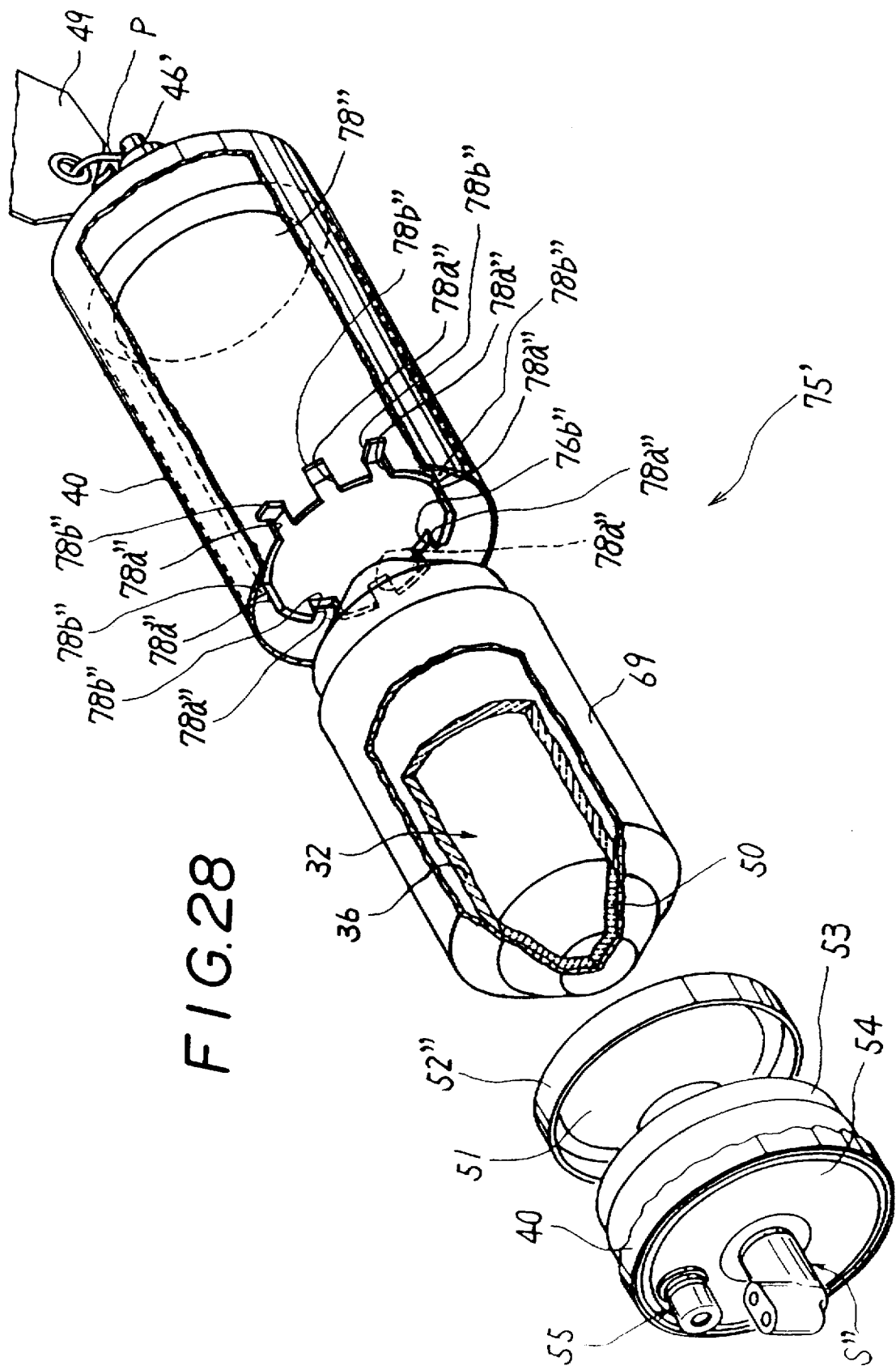
FIG. 28 is a partially-broken exploded perspective view of the chemical oxygen generator of a second modification of the sixth embodiment of FIG. 22.

The chemical oxygen generator 75' of another modification of the sixth embodiment is shown in FIG. 28. Plural juts or projections 78b" and notches or cut-outs 78a" are formed at the end portion of a candle holder 78" which has similar shape to the above candle holder 78. The end portion of the candle holder 78" is cut at the regular intervals. The cut-out portions are bent outwardly so as to be pressed to the inner circumferential surface of the path-forming member 69. Thereby, the notches or cut-outs 78a" are made. In this case, the generated oxygen flows from the thermal insulation 36 and the gap between the thermal insulation 36 and the candle holder 78" into the passage 72 through the opening 78a" and the gaps between the juts 78b". That is the reason why the end portions are alternately bent as shown in FIG. 28. In this modification, the end portion of the candle holder 78" is cut at the regular intervals, and in parallel with each other. Therefore, the shape of the juts 78b" is rectangular. But, instead of the rectangular juts 78b", the juts may be formed by cutting obliquely or on a slant and bending them so the shape of the juts may be triangular or trapezoidal. Further, plural through holes may be formed in the central portion of each of the juts 78b', so that the cross-section of the flow of the oxygen which flows from the thermal insulation 36 to the passage 72, may be enlarged. Further, the end portion of the candle holder 78" may be cut in the oblique or on a slant direction and bent with respect to the axial direction of the candle holder 78". In this case, triangular juts are formed.

Figure 29:
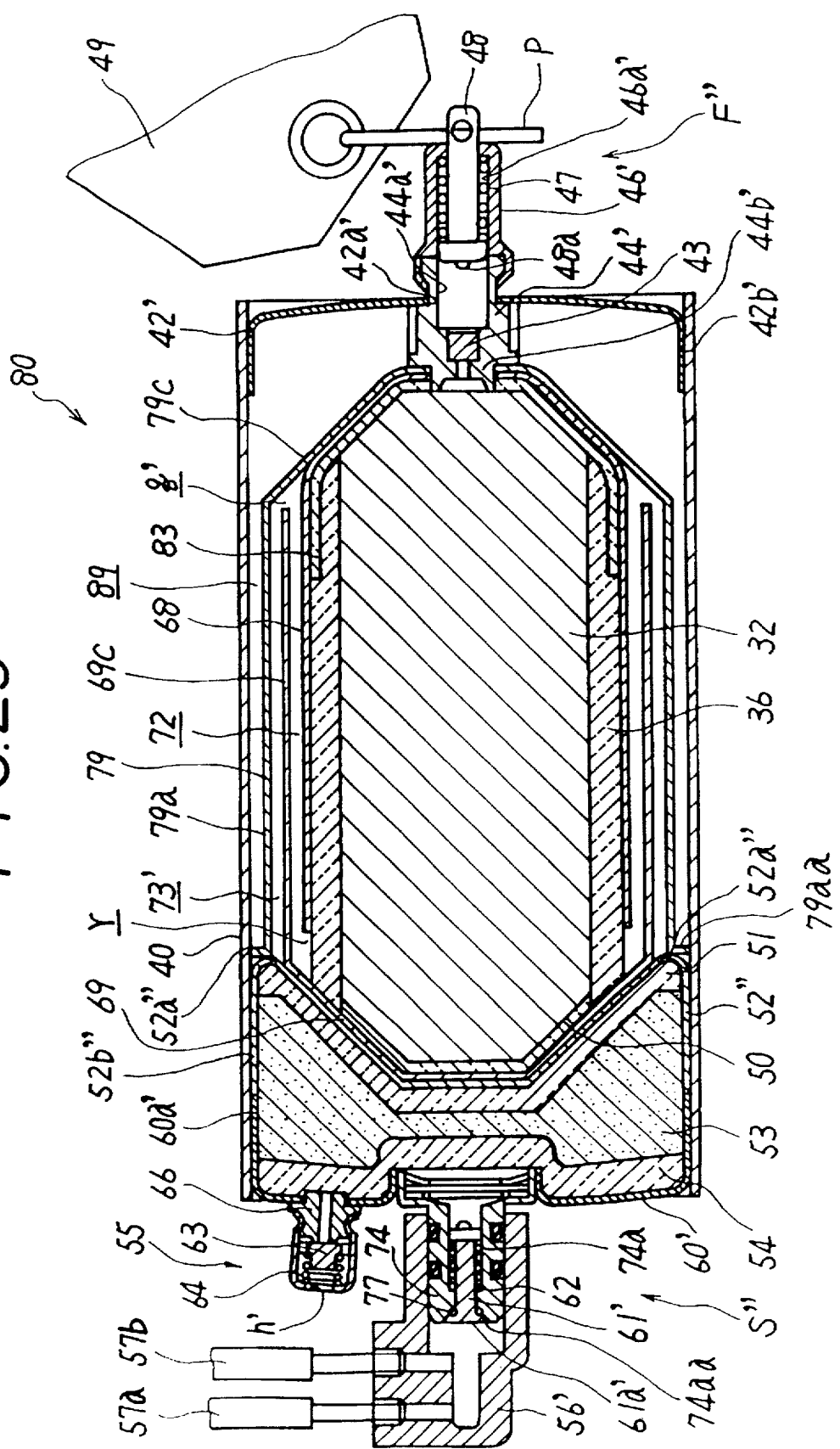
FIG. 29 is a cross-sectional view of a chemical oxygen generator according to a seventh embodiment of this invention.

Next, a chemical oxygen generator 80 according to a seventh embodiment of this invention, will be described with reference to FIG. 29. Parts which correspond to those in the above embodiments, are denoted by the same reference numerals, the detail of which will be omitted.

In this embodiment, an enclosure member 79 is concentrically arranged outside of the path-forming member 69. It is engaged with the left end portion 44b' of the primer holding member 44' at its bottom portion 79c. A circumferential portion 79a of the enclosure member 79 axially extends leftwards, so as to cover a circumferential part 69c of the path-forming member 69. The flange portion 79aa is radially formed in the end portion of the enclosure member 79. The flange portion 79aa contacts air-tightly with the inner surface of the housing 40. Accordingly, an air-tight space 89 is formed between the enclosure member 79 and the housing 40. The passage 73' being the outer-most passage portion, is formed between the enclosure member 79 and the path-forming member 69. The passage 73' is communicated to the passage 72 through an annular gap q' which is formed between the enclosure member 79 and the right end of the path-forming member 69.

When the ignition device F" is triggered in he chemical oxygen generator 80 having the above described construction, the candle 32 starts to be thermally decomposed so as to generate the oxygen. The generated oxygen flows through the thermal insulation 36 leftwards and the gap between the thermal insulation 36 and the candle holder 68, the annular gap r outwardly, the passage 72 rightwards, the annular gap q outwardly, and the passage 73' leftwards in FIG. 29. Then, the generated oxygen is supplied to the outside through the plural circular openings 52a" of the candle support 52", the filter 53 and the oxygen-supply device S".

In this embodiment, the hot oxygen lastly flows through the passage 73' among the passages 72, 73' formed by the enclosure member 79 and the path-forming member 69. The air-tight space 89 is formed between the housing 40 and the enclosure member 79. Accordingly, the heat transmitted to the housing 40 is little. Therefore, the surface temperature of the chemical oxygen generator 80 is lower than that of the chemical oxygen generator 71 of the fourth embodiment as shown in FIG. 19. Further, the temperature of the housing 40 can be more equalized. Accordingly, the outer circumference of the chemical oxygen generator 80 of this embodiment is maintained at the low temperature.

Also, in this embodiment, since the hot oxygen before being cooled, flows through the passage 72 nearer to the candle 32, the heat from the oxygen is effectively transmitted through the candle holder 68 and the thermal insulation 36 into the candle 32. Accordingly, the candle 32 can be uniformly heated even on the portion in which the thermal decomposition speed is lower and which is not apt to be thermally decomposed, and it be surely thermally decomposed. Thus, the desired flow rate of the oxygen can be supplied to the outside in the desired pattern.

Figure 30:
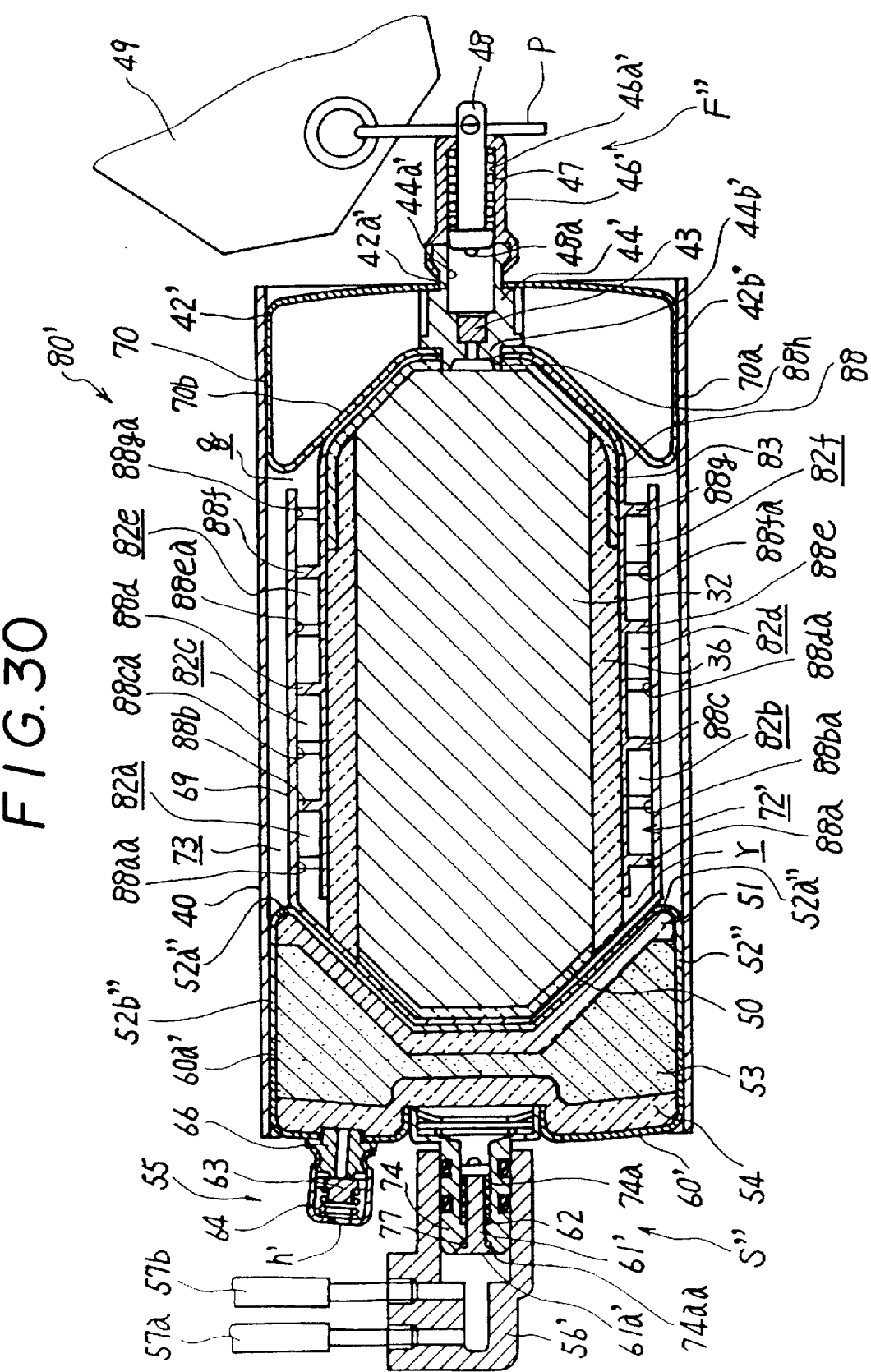
FIG. 30 is a cross-sectional view of a chemical oxygen generator according to an eighth embodiment of this invention.

Next, a chemical oxygen generator according to an eighth embodiment of this invention will be described with reference to FIG. 30 and FIG. 31. Parts which correspond to those in the above embodiments, are denoted by the same reference numerals, the detail of which will be omitted.

In the oxygen generator 80' of this embodiment, a cup-shaped candle holder 88 made of metal such as stainless steel, supports the right portion of the candle 32. It is engaged with the left end portion 44b' of the primer holding member 44' at its central opening 88h. Plural annular projections 88a, 88b, 88c, 88d, 88e, 88f, 88g are formed at regular intervals on the outer circumferential portion of the candle holder 88. An axial passage 72' formed between the path-forming member 69 and the candle holder 88, are divided into annular passages 82a, 82b, 82c, 82d, 82e, 82f. Rectangle notches or cut-outs 88aa, 88ba, 88ca, 88da, 88ea, 88fa, 88ga are formed in the annular projections 88a through 88g. The rectangle notches 88aa, 88ba, 88ca, 88da, 88ea, 88fa, 88ga and rectangle notches 88aa, 88ba, 88ca, 88da, 88ea, 88fa, 88ga adjacent to the notches 88aa, 88ba, 88ca, 88da, 88ea, 88fa, 88ga are shifted from each other by the angle of 180 degrees in this embodiment. In FIG. 30, the notches 88aa, 88ca, 88ea, 88ga of the annular projections 88a, 88c, 88e, 88g are formed at the upper position of the candle holder 88, while the notches 88ba, 88da, 88fa of the annular projections 88b, 88d, 88f are formed at the lower position of the candle holder 88.

Figure 31:
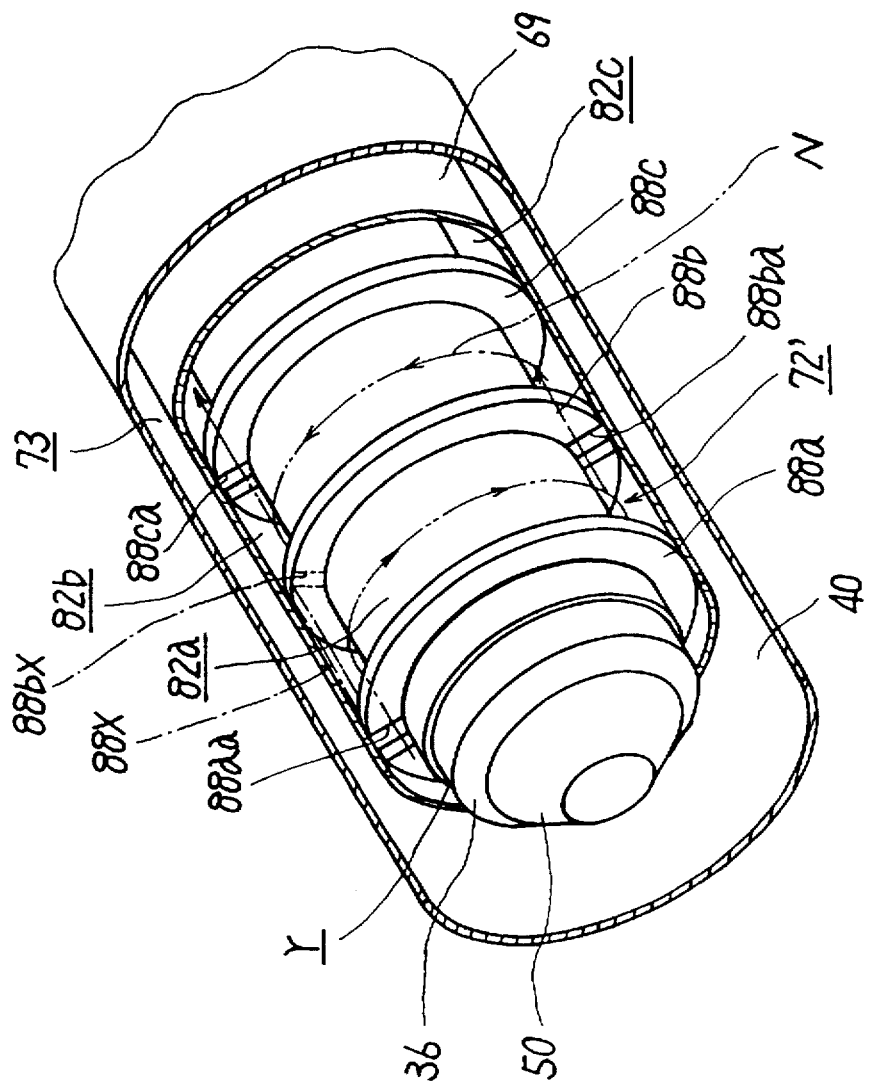
FIG. 31 is a partial perspective view of a main part of the chemical oxygen generator of FIG. 30.

The generated oxygen flows through the passage 72' in the manner as shown by the arrow N in FIG. 31. It passes the annular gap r, and then it flows through the notch 88aa of the annular projection 88a into the annular passage 82a. In the annular passage 82a, it flows clockwise or anticlockwise, and it flows through the notch 88ba of the annular projection 88b to the adjacent annular projection 88a. Then, it reaches the annular passage 82b at the left side of the annular passage 82a. In the same manner, the generated oxygen flows through the annular passages 82b, 82c, 82d, 82e, 82f clockwise or anticlockwise, while it flows through the notches 88ca, 88da, 88ea, 88fa, 88ga. Thus, the generated oxygen flows along the passage 72' rightwards in the axial direction in FIG. 30. After passing through the notch 88ga from the annular passage 82f, it flows through the annular gap q into the passage 73. Then it flows leftwards through the passage 73, the plural circular openings 52a" of the candle support 52" and the filter 53. Then, it is supplied from the oxygen-supply device S" to the outside.

In this embodiment, the axial passage 72' is divided into the plural annular passages 82a, 82b, 82c, 82d, 82e, 82f. The hot generated oxygen flows clockwise or anticlockwise through the annular passages 82a, 82b, 82c, 82d, 82e, 82f. As the result, the oxygen flows generally through the axial passage 72' rightwards. Although the magnitude or size of the chemical oxygen generator 80' is equal to that of the above embodiments, the flow route of the oxygen can be longer than that of the above embodiments. Thus, the oxygen flowing out from the passage 72', can be more cooled than the oxygen in the fourth embodiment to the seventh embodiment. That is, the oxygen flowing through the passage 73 nearest to the housing 40, has has been sufficiently cooled. Accordingly, although the size of the housing 40 is equal to the above embodiment, the temperature of 40 can be lowered. Accordingly, the temperature of the circumferential surface of the chemical oxygen generator 80' can be greatly lowered. Also in this embodiment, it can be easily inferred that the surface temperatures of the housing 40 are greatly equalized much and the temperature of the housing 40 is lower than that of the above embodiment.

Further,in this embodiment, the temperature of the generated oxygen passing through the passage 72' nearer to the candle 32, is high. The heat of the oxygen is effectively transmitted through the candle holder 88 and the thermal insulation 36 into the candle 32. Accordingly, the candle 32 is prevented from ceasing completely to thermally decompose. The candle 32 can be perfectly and completely thermally decomposed. The desired flow pattern of the oxygen can be supplied to the outside.

Further, in this embodiment, since the generated oxygen is flowed in the axial direction through the notches 88aa, 88ba, 88ca, 88da, 88ea, 88fa, 88ga, circling the annular passages 82a, 82b, 82c, 82d, 82e, 82f, the dusts and fine particles collide with the annular projections 88a, 88b, 88c, 88d, 88e, 88f, 88g. Thus, they are left or eliminated in the annular passages 82a, 82b, 82c, 82d, 82e, 82f. Thus, the filter effect can be obtained by the fact that the generated oxygen is flowed through the and cut-outs 88aa, 88ba, 88ca, 88da, 88ea, 88fa, 88ga. Thus, the load to the filter 53 can be reduced. Further, the magnitude or size of the filter 53 can become smaller. Accordingly, the chemical oxygen generator 80' can be smaller.

Further, in this embodiment, the rectangle notches 88aa, 82ba, 88ca, 88da, 88ea, 88fa, 88ga of the annular projections 88a, 88b, 88c, 88d, 88e, 88f, 88g are shifted by 180 degrees from the rectangle notches 88aa, 88ba, 88ca, 88da, 88ea, 88fa, 88ga of the adjacent annular projections 88a, 88b, 88c, 88d, 88e, 88f, 88g so that the passage 72' is divided into the annular passages 82a, 82b, 82c, 82d, 82e, 82f communicating with each other. Since the generated oxygen flows through the annular passages 82a, 82b, 82c, 82d, 82e, 82f clockwise or anticlockwise as above described, the length of the flow route is enlarged. The shift angle is equal to 180 degrees. However, the shift angle is not limited to 180 degrees. For example, as shown by dot-dash lines in FIG. 31, a rectangular plate-like partition wall 88x may be formed so as to extend in the axial direction, in the annular passage 82a between the annular projection 88a and the adjacent annular projection 88b. Thus, the annular passage 82a is divided by the partition wall 88x. Further, the end of partition wall 88x, as shown FIG. 31, is arranged at the right side of the rectangular notch 88aa of the annular projection 88a. The notch 88b x of the annular projection 88b is positioned at the right side of the partition wall 88x. Of course,the notch 88ba shown by the solid line is omitted. After the oxygen passes through the notch 88a, it flows from one side of the partition wall 88x to the other side of the partition wall 88x so that the generated oxygen flows around the annular passage 88a. Although not-shown, the other annular passages 82b, 82c, 82d, 82e, 82f may be formed in the same manner as the annular passage 82a. Thus, the flow route of the generated oxygen can be longer, although the magnitude or size of the chemical oxygen generator is equal to that of the above described embodiments. The hot oxygen can be sufficiently cooled, and the housing 40 does not become very hot.

Figure 32:
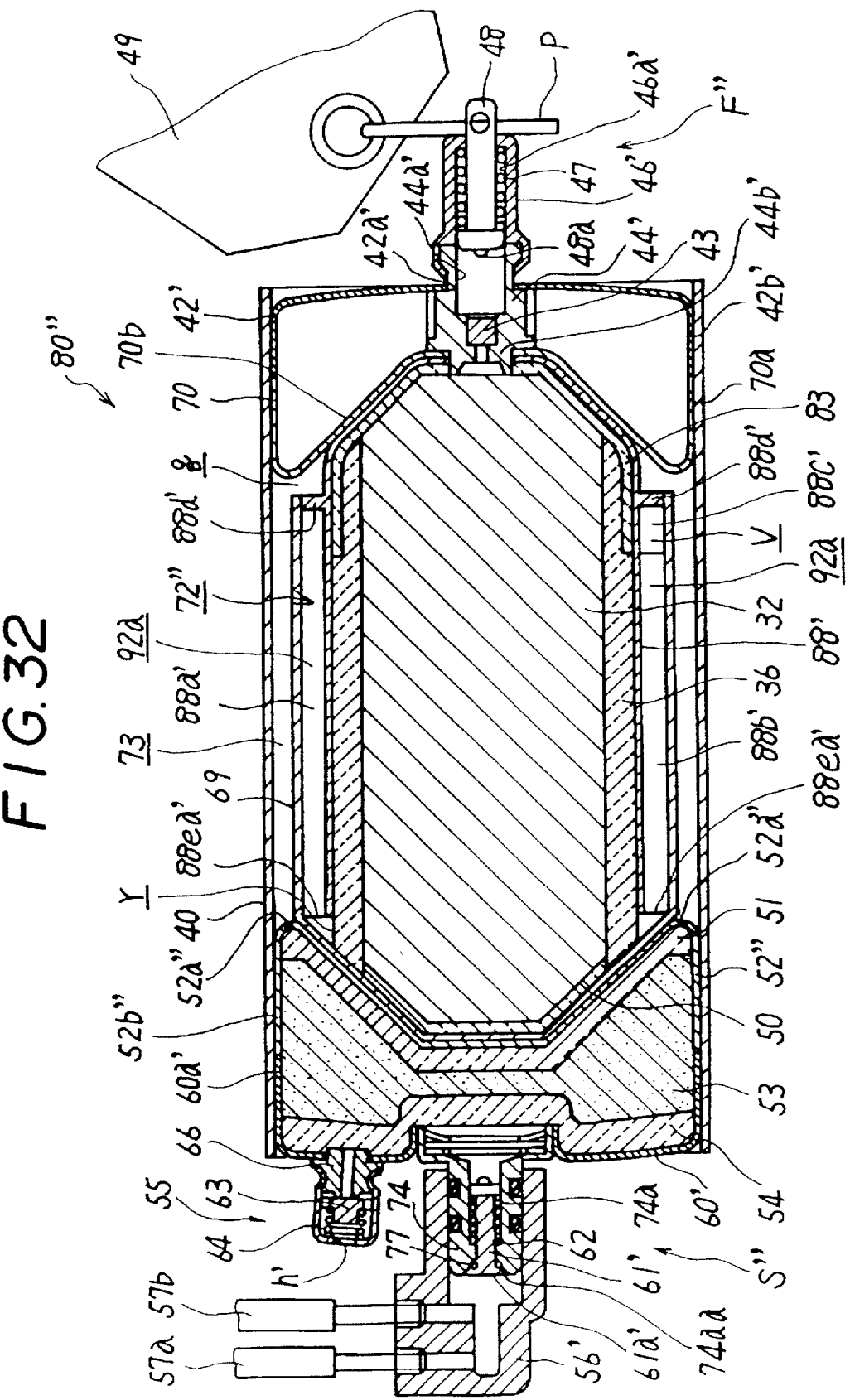
FIG. 32 is a cross-sectional view of a chemical oxygen generator according to a ninth embodiment of this invention.
Figure 33:
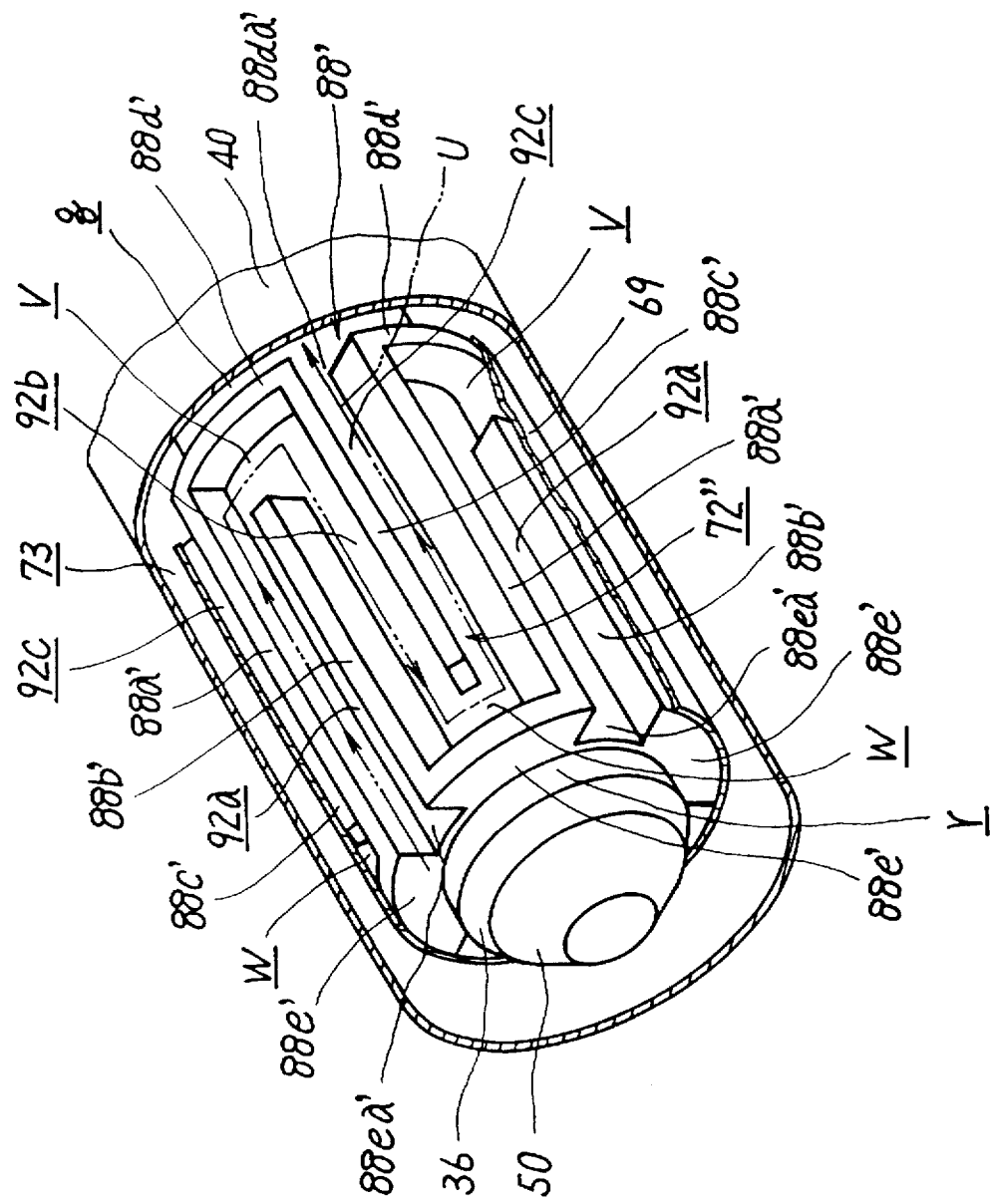
FIG. 33 is a partial perspective view of a main part of the chemical oxygen generator of FIG. 32.

Next, a chemical oxygen generator 80" according to a ninth embodiment of this invention, will be described with reference to FIG. 32 and FIG. 33. Parts which correspond to those in the above embodiments, are denoted by same reference numerals, the detail of which will be omitted.

In this embodiment, a cup shaped candle holder 88' is made of the same material as the above described candle holder 88, which supports the right portion of the candle 32. An annular passage 72" is formed between the path-forming member 69 and the candle holder 88'. Plural radially projecting line projections 88a', 88b', 88c' are formed at regular intervals. In FIG. 33, these shapes are shown in detail. The annular passage 72" is divided into three axial passages 92a, 92b, 92c. In other words, the passage 72" of this embodiment consists for four portions, each of them consisting of a passage 92a formed between the line projections 88a', 88b', a second passage 92b formed between the line projections 88b', 88c', and a third passage 92c formed between the line projections 88c', 88a'. Thus the axial passages 92a, 92b, 92c are concentrical with the candle 32. Further, plural radially projecting lateral end projections 88d', 88e' are formed at both ends of the candle holder 88'. The line projections 88a', 88b', 88c' are combined with each other through the lateral end portions 88d', 88e'.

The line projection 88a' extends between the ends of the candle holder 88', and is combined with the lateral end projections 88d', 88e'. The left end portion of the line projection 88b' is combined with the lateral end projection 88e'. The right end of the line projection 88b' is facing to the central portion of the lateral end projection 88d' and spaced far from each other by a gap v. Also, the line projection 88c' is facing to the central portion of the end projection 88e' at its left end portion, spaced far from each other by a gap w. The right end portion of the line projection 88c' is combined with the lateral end projection 88d'. By the above described line projections 88a, 88b, 88c and the above described lateral end projections 88d', 88e', the axial passage 92a communicates with the axial passage 92b through the gap v at the right end portion of the axial passage 92a, and the axial passage 92b communicates with the axial passage 92c through the gap w at the left end portion of the axial passage 92b. In the right end portion of the axial passage 92a, an opening 88ea' is formed for introducing the generated oxygen from the thermal insulation 36. In the left end portion of the axial passage 92c, an opening 88da' is formed for introducing the generated oxygen into the passage 73.

In this embodiment, the oxygen generated from the candle 32, flows leftwards through the thermal insulation 36, and gap between the thermal insulation and the candle holder 88' and reaches the left end of the thermal insulation 36. Then it flows through the annular gap r into the passage 72". In the passage 72", as shown by the arrow U in FIG. 33, the oxygen passes through the opening 88ea', flows rightwards along the axial passage 92a, flows through the gap v and the axial passage 92b leftwards. Further, it flows through the gap w along the axial passage 92c rightwards, and passes through the opening 88da' formed at the end of the axial passage 92c. In such a manner, the generated oxygen repeats the U-turns and the oxygen after passing the passage 72", flows through the annular gap q into the axial passage 73 nearest to the housing 40. Then, it flows rightwards in the passage 73, and it passes through the plural circular opening 52a" of the candle support 52" and the filter 53 into the oxygen-supply device S". It is supplied to the outside.

Also, in this embodiment, although the magnitude or size of the chemical oxygen generator 80 is equal to that of the above described chemical oxygen generator 71, 71', 71", 75, 75', 80", the flow route of the oxygen can be longer, and so the hot oxygen can be sufficiently cooled by the time it reaches the end of the axial passage 73 nearest to the housing 40. As the result, the housing 40 does not become hot as in the same manner as that of the eighth embodiment. That is, the outer circumference of the chemical oxygen generator 80" does not become hot. Also, in this case, the surface temperature of the housing 40 is lower than that in the fourth embodiment as shown in FIG. 19. It can be easily inferred that the temperatures on the housing 40 is equalized. Further, since the hot oxygen flows near the candle 32, sufficient heat from the oxygen is transmitted into the candle 32, there is the advantage that the candle 32 is thermally and uniformly decomposed. Accordingly, the desired pattern of the flow rate of the oxygen can be obtained. The oxygen can be supplied to the outside in the desired manner.

In this embodiment, the three axial passages 92a, 92b, 92c through which the generated oxygen flows, are formed, but the number of the axial passages formed in the same manner as the axial passages 92a, 92b, 92c is not limited to the three.

Figure 34:
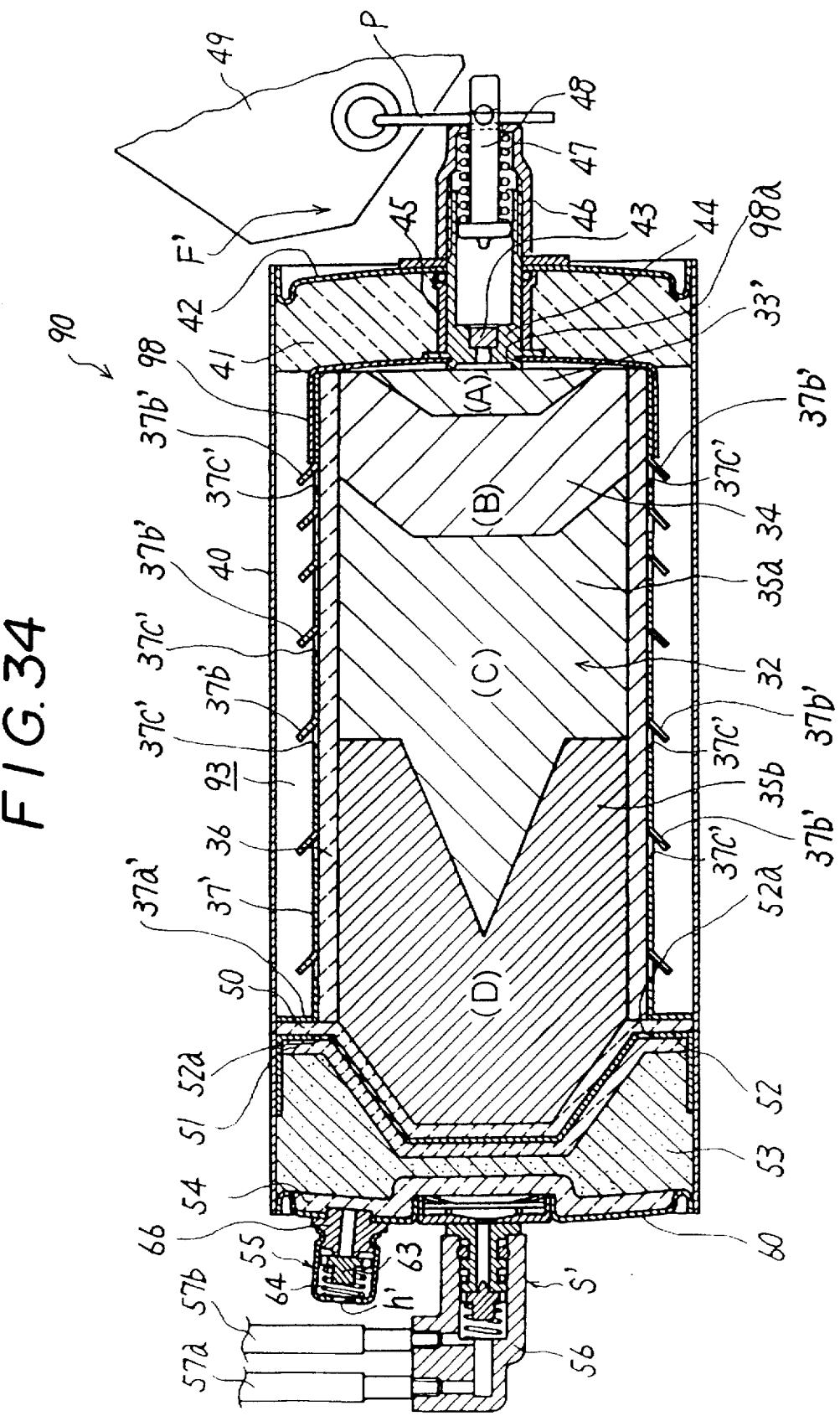
FIG. 34 is a cross-sectional view of a chemical oxygen generator according to a tenth embodiment of this invention.

Next, a chemical oxygen generator according to a tenth embodiment of this invention, will be described with reference to FIG. 34. Parts which correspond to those in the above embodiments, are denoted by the same reference numerals, the detail of which will be omitted.

A chemical oxygen generator of this embodiment, is generally denoted by a reference numeral 90. It has almost the same construction as the first embodiment. A cylindrical member 37' made of material being corrosion resistant, reaction inert and heat resistant to the candle 32, such as copper, covers the thermal insulation 36. The thickness of the cylindrical member 37' is equal to about 0.1 mm as that of the cylindrical member 37 of the first embodiment. The cylindrical member 37' is fitted into the candle holder 98. The candle holder 98 is similar to the candle holder 38, but the candle holder 98 and the candle holder 38 are not equal to each other in length. The left end portion of the cylindrical member 37' forms a flange portion 37a', and it engages with the housing 40. Accordingly, an annular space 93 is formed between the housing 40 and the cylindrical member 37'. Further, plural portions of the cylindrical member 37' are cut out or slit, and they are bent into the space 93. Therefore, plural tabs projecting into the space 93, are formed at regular pitches on the circumferential surface as radiating fins 37b'. Further, in this embodiment, much oxygen is generated in the portion of the cylindrical member 37', where the exothermic or thermal decomposition rapidly starts. Accordingly, the right end portion of the cylindrical member 37' is subjected to higher temperature. Accordingly, in the right end portion of the cylindrical member 37', the radiating fins 37b' are formed at smaller pitches. Further, the cylindrical member 37' in this embodiment is made of copper as in the first embodiment. Accordingly, the openings 37c' are formed for the radiating fins 37b' at the smaller pitches. The thermal insulation 36 communicates through the openings 37c' with the annular space 93. Further, the ignition pellet portion 33' of the candle 32 of this embodiment, includes more component which generates more oxygen, than the ignition pellet portion 33 of the above embodiments.

Next, operation of the chemical oxygen generator 90 of this embodiment will be described.

On using the chemical oxygen generator 90, the firing pin is pulled out from the hammer piston 48, after the pin P is taken away in the same manner as the above embodiments. Thus, the hammer piston 48 is rapidly moved leftwards by the spring action of the spring 47. It collides with the primer 43, and a spark generates. The spark fires the ignition pellet portion 33' at the right end portion of the candle 32. With the thermal decomposition of the ignition pellet portion 33', the oxygen starts to generate. The generated oxygen flows first radially along the bottom of the candle holder 98, and through the thermal insulation 36 and the gap between the thermal insulation 36 and the cylindrical member 37' leftwards. While the generated oxygen flows through the gap between the thermal insulation 36 and the cylindrical member 37', it also flows through the openings 37c' of the cylindrical member 37' into the space 93. However, since the interior of the chemical oxygen generator 90 communicates through the oxygen-supply device S" to the outside, the relief valve 55 is opened by the high pressure inside of the chemical oxygen generator 90. The generated oxygen does not flow into the space 93 and into the thermal insulation 41 after the pressure of the generated oxygen reaches the predetermined pressure, although the generated oxygen flows through the space 93 and thermal insulation 41. The generated oxygen flows through the thermal insulation 36 and the gap between the thermal insulation 36 and the cylindrical member 37', the thermal insulation 50, the plural circular opening 52a" of the candle support 52", the thermal insulation 51 and the filter 53. In the same manner as the above embodiments, the dust and fumes are removed from the oxygen in the filter 53. The generated oxygen becomes odorless and clean and it is supplied through the oxygen-supply device S" to the outside.

In this embodiment, the radiating fins 37b' are formed without increasing the weight of the cylindrical member 37'. The oxygen flowing through the gap between the cylindrical member 37' and the thermal insulation 36, and through the thermal insulation 36, is cooled also by the radiating fins 37b'. The oxygen can be supplied to the outside at a suitable temperature. The generating oxygen is flowed into the space 93 and the thermal insulation 41 at the start of the thermal decomposition of the candle 32. However, after the space 93 and the thermal insulation 41 are filled with the oxygen at a certain pressure, the generated oxygen flows little into the space 93 and the thermal insulation 41. Accordingly the space 93 functions as a thermal insulation in some time after the thermal decomposition start. Heat from the hot oxygen is somewhat transmitted to the housing 40. However, after some time, heat from the hot oxygen is transmitted little to the housing 40. Accordingly, the housing 40 is not heated very much. Of course, heat from the hot oxygen after the space 93 is filled with the oxygen at the certain pressure, is preferentially transmitted into the candle 32. Accordingly, the candle 32 can be perfectly thermal-decomposed. The pitches of the radiating fins 37b' are smaller on the right side of the cylindrical member 37'. The generated oxygen can be effectively cooled, and the surface temperatures on the housing 40 can be equalized.

In this embodiment, the cylindrical member 37' and the candle holder 98 are individually provided. However, they may be integrally formed with each other as one body. In this case, the weight of the chemical oxygen generator can be smaller. The pitches of the radiating fins 37b' may be varied so that the surface temperatures of the housing 40 can be constant in the axial direction or they can be equalized.

Figure 35:
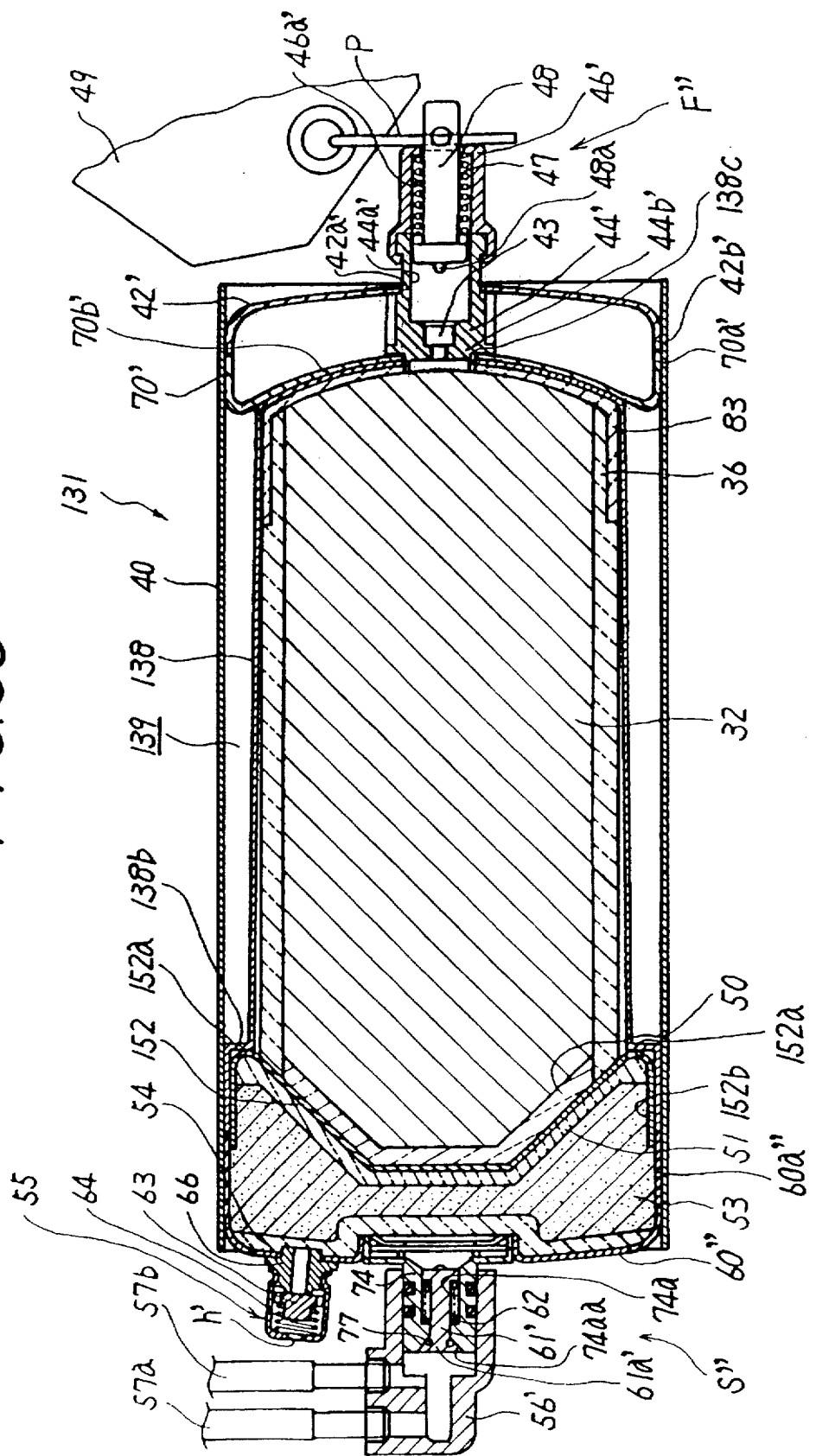
FIG. 35 is a cross-sectional view of a chemical oxygen generator according to an eleventh embodiment of this invention.

Next, a chemical oxygen generator according to an eleventh embodiment of this invention will be described with reference to FIG. 35. The parts which correspond to those in the above described embodiments, are denoted by the same reference numerals, the detail of which will be omitted.

The chemical oxygen generator of this embodiment is generally denoted by the reference numeral 131. A vibration-preventing member 70' is made of metal such as stainless steel. A right end portion of the candle 32 is different from that of the above described embodiments in shape. Thus, a candle holder 138 fitting and supporting the right end portion of the candle 32, is different from that of the above-described embodiments in shape. A bottom portion 70b' of the vibration-preventing member 70' is fitted to the bottom of the candle holder 138. Accordingly, the vibration-preventing member 70' is also different from those of the above-described embodiment in shape. The construction is essentially equal to that of the above described embodiment. The left end portion 44b' of the primer holding member 44' of the ignition device F" is fitted into the central opening 138c of the candle holder 138. A circumferential portion 70a' of the vibration-preventing member 70' is engaged with the housing 40. It is combined with the circumferential portion 42b' of the cap 42' by the butt-welding method. Accordingly, a vessel-like shape is formed by the cap 42' and the vibration-preventing member 70'. The side of the vessel is engaged with the housing 40.

A cylindrical candle holder 138 as the first support member, made of metal (stainless steel), has a bottom in which the central opening 138c is formed, and it supports the right side of the candle 32. The left end portion 44b' of the primer holding member 44' is fitted into the central opening 138c of the bottom of the cylindrical candle holder 138. In this embodiment, the path-forming member 69 for forming the passages 72, 72', 72", 73, 73' is omitted. As shown in FIG. 35, the diameter of the circumferential surface of the candle holder 138 is nearly constant over almost all of its length. A left end portion of the candle holder 138 is bent in steps so as to enlarge the diameter. A step-formed end portion 138b is pinched between the housing 40 and a circumferential portion 152b of the candle support as the second member 152. Thus, an annular air-tight space 139 is formed between the candle support 152 and the housing 40. The candle support 152 made of metal (stainless steel), supporting the left end portion of the candle 32, has plural circular openings 152a. A cap 60"is fitted to the housing 40. The end portion 60a of the cap 60"and the end portion of the circumferential portion 152b of the candle support 152 are lap-welded to each other, and, the circumferential portion 152b of the candle support 152 is engaged with the housing 40 through the end portion 60a of the cap 60" and the end portion 138b the candle holder 138.

What has been described is the construction of the chemical oxygen generator 131 of this embodiment. Operation of this chemical oxygen generator 131 is the same as that of the above described third embodiment. Accordingly, description of the operation will be omitted. In this embodiment, the vibration-preventing member 70' is arranged between the candle holder 138 and the cap 42', and engages with the ignition device F'. The circumferential portion 70a' of the vibration-preventing member 70' is engaged with the housing 40, and it combined with the circumferential portion 42a' of the cap 42'. Accordingly, this embodiment also has the same effect as the above described embodiment which is superior in vibration prevention characteristics. Further, the end portion of the candle holder 138 is pinched between the candle support 152 and the housing 40. Thus, the end portion 138b of the candle holder 138 which supports the right end portion of the candle 32, being apt to move, can be securely held by the housing 40 and the candle support 152. Accordingly, it is more superior in vibration prevention characteristics than that of the first embodiment.

Further, in this embodiment, the candle support 152 and the cap 60"are combined with each other by the lap-welding method. Thus, the candle support 152 and the cap 60" are fixed with each other so that they are hard to be moved in the axial direction. The filter 53 being between the cap 60" and candle support 152, becomes hard to vibrate. Accordingly, it is hard to reduce the grain size in the filter 53. The supplied oxygen can always be sufficiently clean.

Further, in this embodiment, the air-tight annular space 139 is formed between the candle holder 138 and the housing 40. Accordingly, the hot generated oxygen passing through the thermal insulation 36 is insulated by the annular space 139 and the heat is not transmitted to the housing 40. Accordingly, the housing 40 does not become hot. Thus, the surface of the chemical oxygen generator 131 does not become hot.

Figure 36:
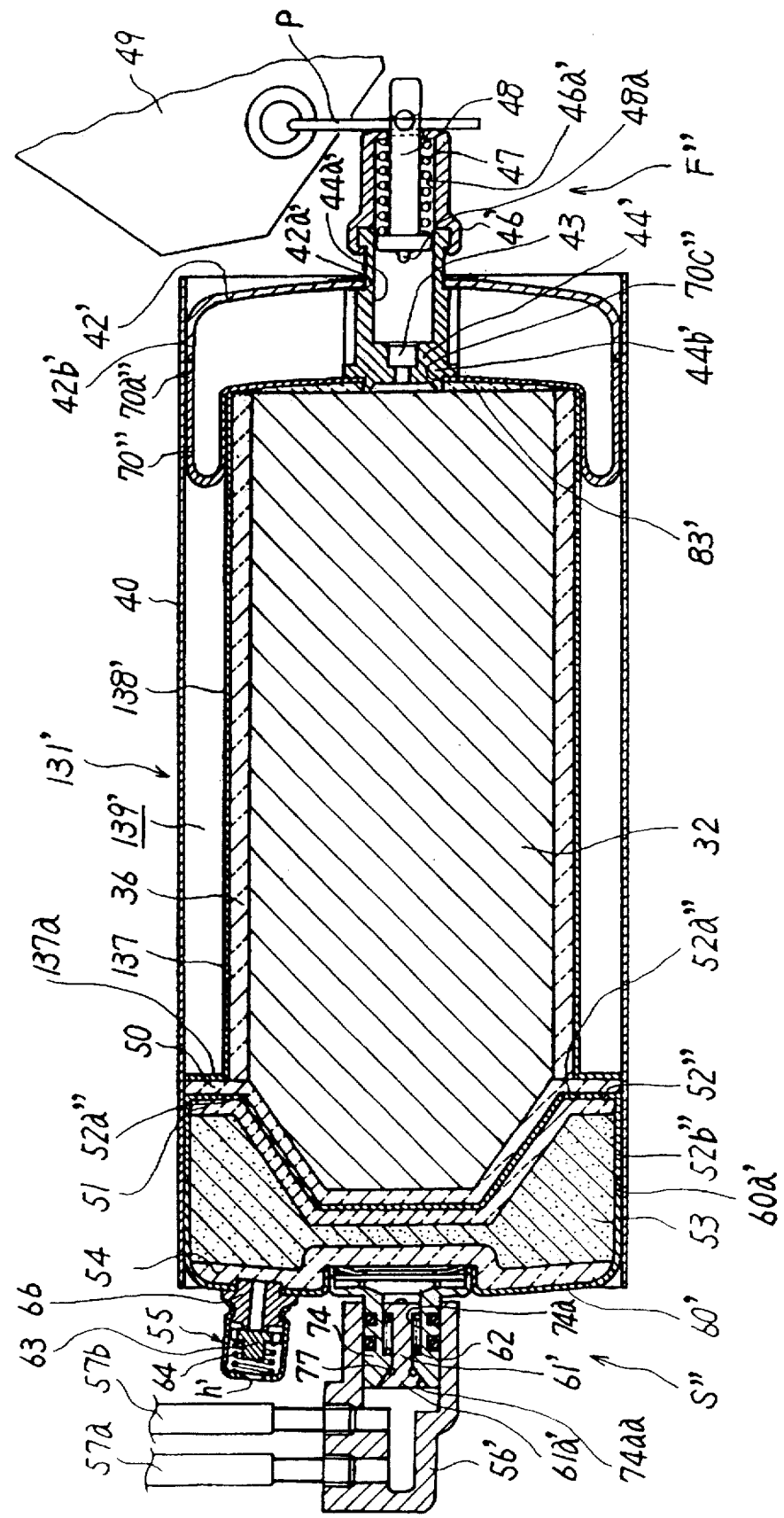
FIG. 36 is a cross-sectional view of a chemical oxygen generator according to a twelfth embodiment of this invention.

Next, a chemical oxygen generator according to a twelfth embodiment of this invention will described with reference to FIG. 36. The parts which correspond to those in the above described embodiments, are denoted by the same reference numerals, the detail of which will be omitted.

In the chemical oxygen generator 131' of this embodiment, a first support means 138' is constituted of a cylindrical member 137 made of metal such as copper, and a candle holder 70" made of metal such as stainless steel. The candle holder 70" supports the right end portion of the candle 32 and the thermal insulation 36. The cylindrical member 137 is pinched between the candle holder 70" and the thermal insulation 36. An opening 70c" is formed at the central portion of the bottom of the candle holder 70". The left end portion of the primer holding member 44' of the ignition device F" is fitted into the opening 70c". The circumferential end portion 70a" of the candle holder 70" is engaged with the housing 40. It is engaged with the circumferential portion 42b' of the cap 42' welded to the candle holder 70" by the butt-welding method. Accordingly, a part of the candle holder 70" functions as the vibration-preventing member. Thus, in this embodiment, the first support member and the vibration-preventing member are formed integrally with each other. Further, the right end portion of the cylindrical member 137 is between the candle holder 70" and the thermal insulation 36. The left end portion of the cylindrical member 137 is bent outwardly in the radial direction. Thus, a flange portion 137a is formed. The end contacts with the thermal insulation 50 engaged with the housing 40. Accordingly, an air-tight annular space 139' is formed between the housing 40 and the cylindrical member 137. A thermal insulation 83' of this embodiment is different from the thermal insulation 83 of the above described embodiment in shape. The end portion is not bent, and engaged with the thermal insulation 36. However, it is made of the same material as the thermal insulation 83. It forms a route through which the generating oxygen flows at the start of the thermal decomposition of the candle 32. Further, it functions as a cushion while the candle 32 and the candle holder 70" come into contact with each other.

What has been described is the construction of the chemical oxygen generator 131' of this embodiment. Operation of this embodiment is the same as that of the above described first embodiment, and so the detail of operation will be omitted. In this embodiment, the left end portion 44b' of the primer holding member 44' of the ignition device F" is inserted into the opening 70c". Thus, it is not required that plural parts or members are assembled to be fitted to each other, for example in comparison with the construction of FIG. 20. Thus, the assembly operation can be easy. Further, the means covering the right end portion of the candle 32 is single. Accordingly, the chemical oxygen generator 131' of this embodiment is comparatively light in contrast to the above described embodiments.

Further, a flange portion 137a formed at the right end of the cylindrical member 137 is engaged with the inner surface of the housing 40. The first support member 138" for supporting the right end portion of the candle 32, is supported not only by the candle holder 70" at the right side, but also by the flange portion 137a of the cylindrical member 137 at the left side. Accordingly, the oxygen generator 131' of this embodiment is superior to the above embodiments in vibration prevention characteristics. The candle 32 is hard to be moved in the housing 40, and the candle 32 can be prevented from falling out and becoming damaged.

Also, in this embodiment, the annular air-tight space 139' is formed between the cylindrical member 137 and the housing 40. This space 139' functions as a thermal insulator, and the heat from the generated hot oxygen is not transmitted to the housing 40. Accordingly, the circumferential surface of the chemical oxygen generator 131' does not become hot.

While the preferred embodiments have been described, variations thereto will occur to those skilled in the art within the scope of the present inventive concepts which are delineated by the following claims.

Figure 5:
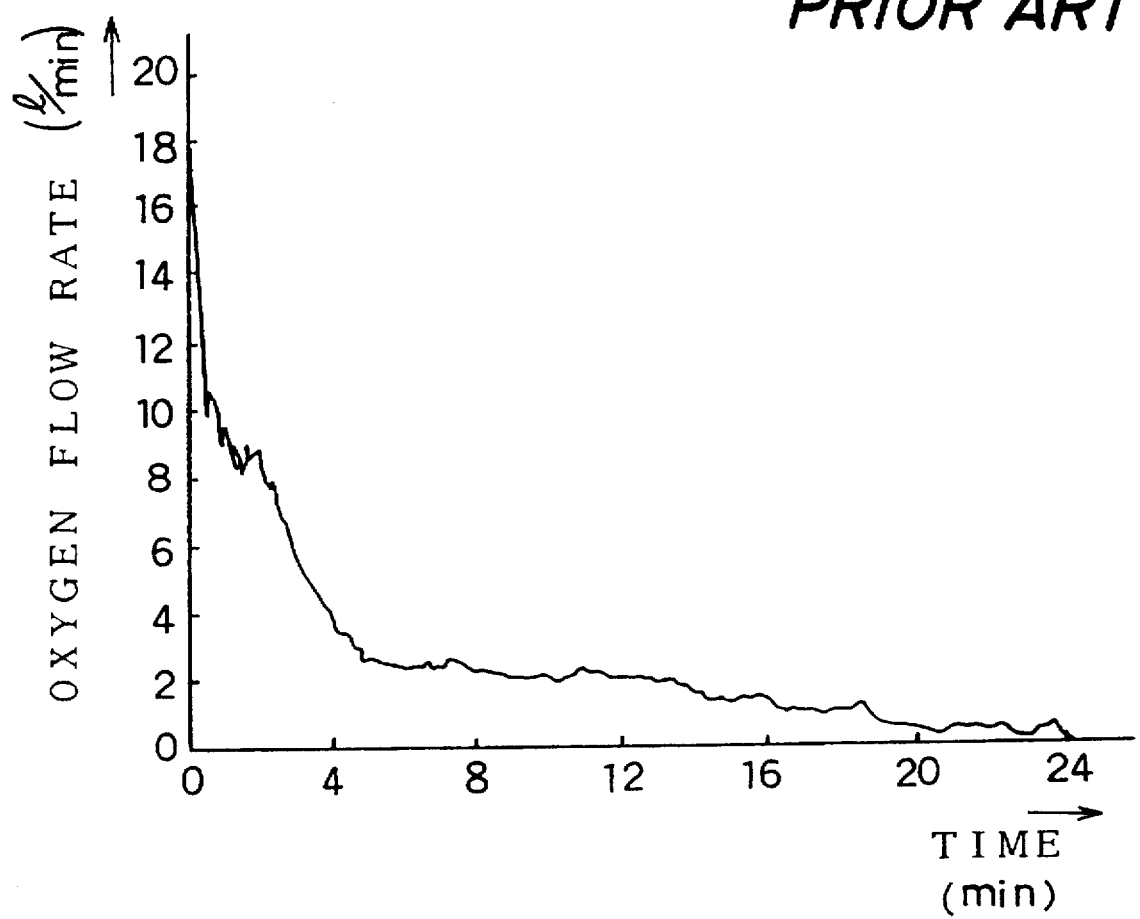
FIG. 5 is a diagram showing one oxygen flow pattern.

For example, the mixing ratios of the main components (NaClO$_3$ and Fe) of the candle 32 are so varied in the direction from the side of the ignition device F, F" towards the side of the oxygen-supply device S', S" so that the time-flow pattern as shown in FIG. 5 can be obtained. Of course, this invention is not limited to this pattern. For example, in the case that the oxygen is required to be supplied substantially at a constant flow rate, after the ignition, for example, when fire occurs in a hospital, a submarine and a subway street, the mixing ratios of the main components (NaClO$_3$ and Fe) of the candle 32 may be constant all over its length, although the candle 32 of the above described embodiments consists of the four layers which are the first layer A (the ignition pellet portion 33), second layer B (the initiation portion 34), the third and the fourth layers C and D (the main portions 35a, 35b). The above-described effect of this invention can be obtained with such a modification. The number of the layers (different from each other in the mixing ratio) is not limited to the four as in the above described embodiments. Further, the mixing ratios of the components of the plural layers may be so varied that the thermal decomposition speeds become lower towards the oxygen-supply device S', S" from the ignition side. Also the candle may consist of plural layers which are different from each other in oxygen generating rate.

Further, NaClO$_3$ and Fe are used as oxygen-generating agents in the above described embodiment. Of course, this invention is not limited to such agents. The well-known agents for generating oxygen can be used for this invention.

Further, the two outlet pipes 57a, 57b re connected to the oxygen-supply device S', S" in the above described embodiments. However, the number of the outlet pipes is not limited to the two, but may be three or more. The size of the candle 32 may be varied in accordance with the oxygen supply time or the number of the outlet pipes.

Further, the cylindrical members 37, 37' are made of copper or stainless steel. However, they may be made of another metal such as aluminum or platinum which is corrosion resistance, reaction inert and heat resistance to the candle.

Chips (small pieces) made of stainless steel are used in the components of the above described candle 32. They may be material which has thermal conductivity with is lower than 30 W/(m·K). For example, they may be carbon steel or mixture of carbon steel and stainless steel.

Further, in the first embodiment, the thickness of the cylindrical member 37, 37' is equal to 0.1 mm. It is considerably thin. Of course, the thickness may be larger than 0.1 mm. However, the smaller the thickness, the better the thermal conduction. The candle 32 can be more uniformly heated and have good warmth retaining property.

Further, the ignition device F is used as the ignition means, and the oxygen-supply device S' is used as the oxygen supply means in the first to third embodiments and the tenth embodiment. However, the ignition device F" may be used instead of the ignition device F, in the first to third embodiments and the tenth embodiment. Further, the oxygen-supply device S" may be used instead of the oxygen-supply device S', in the first to third embodiments and the tenth embodiment. In this case, the effects of the oxygen-supply device S" and the ignition device F", in the above-described embodiments, can be obtained.

Further, in the first to third embodiments and the tenth embodiment, the cap 60 for closing the opening of the oxygen-supply device S' side is not combined with the candle support 52, 52'. However, the cap 60 may be directly combined through the housing 40 with the candle holder 52, 52' as in the fourth to ninth embodiments so as to contain the filter 53 between the cap 60 and the candle holder 52, 52'.

Further, the vibration-preventing member 70 is arranged in the fourth embodiment and the sixth to ninth embodiments. It may be omitted for reducing the total weight. Also in this case, since the cap 42' as the first cap member closes the left side opening of the housing 40, the passage 72, 72', 72", 73, 73', formed between the candle holder 68, 68', 68", 78, 78", 88, 88" and the housing 40 does not communicate with the outside. Although the vibration-preventing member 70 is omitted, the generated oxygen is not discharged outwards from the passages.

Further, in the fourth to ninth embodiments, the single path-forming member 69, 69', 69" is pinched at the end portion between the candle support 52a" for supporting the left end portions of the candle 32, and the thermal insulation 50. Instead, plural path-forming members may be arranged concentrically to the candle 32. They are alternately fixed at the sides of the ignition device and the oxygen-supply device. The hotter oxygen flows through the inner passages formed by the path-forming members, while the colder oxygen flows through the outer passages formed by the outer path-forming members. Thus, the temperatures of the housing 40 are lowered. Since much heat from the oxygen can be transmitted into the candle 32, the thermal decomposition does not cease half-way.

When the plural path-forming members are arranged as above described, the projecting portions formed on the outer circumferential surface of the candle holder are pressed to the inner circumferential surface of the path-forming member nearest to the candle, and the projecting portions formed on the path-forming member nearest to the housing 40, are pressed to the inner circumferential surface of the housing 40, as in the sixth embodiment. When the enclosure member is used, the projecting rib portions are pressed to the inner circumferential surface of the enclosure member. Further, a projection which projects radially, may be formed at one end of the inner path-forming member, and may be pressed to the inner circumferential surface of the directly-outer path-forming member. Thus, the vibration proof characteristic can be further improved.

Further, in the seventh embodiment, the space 89 formed between the enclosure member 79 and the housing 40, is made as an air-tight space by the cap 42'. The vibration-preventing member 70 may be arranged between the cap 42' and the enclosure member 79 so as to form an air-tight space. Further, radiating fins may be formed on the enclosure member 79, which are projected into the air-tight space 89 formed between the enclosure member 79 and the housing 40. In this case, it is preferable that the radiating fins are formed at smaller pitches on the portion of the enclosure member 79 which becomes more heated, since the generated oxygen can be effectively cooled, on metal or steel wool may be packed at more density.

Further, in the eighth and ninth embodiments, the outer-most passage 73 is formed between the housing 40 and the path-forming member 69. Further, the air-tight space may be formed outside of the outer-most passage portion, as in the seventh embodiment. The above described effect can be obtained, when the oxygen is passing through the outer-most passage portion.

Further, in the eighth and ninth embodiment, the passages 72', 72" is divided into the annular passages 82a, 82b, 82c, 82d, 82e, 82f, or into the axial passages 92a, 92b, 92c. They are formed by the annular projections 88a, 88b, 88c, 88d, 88e, 88f, 88g on the candle holder 88, or the plural line projections 88a', 88b', 88c' and the plural lateral end projections 88d', 88e' on the candle holder 88' respectively. Instead, plural annular projections or plural rib portions may be formed radially on the path-forming member 69. Alternatively the passages 72', 72" may be divided by them. When they are formed by the path-forming member and the candle holder, the passage 72', 72" may be divided by combining them.

Further, in the fourth to ninth embodiment and, the eleventh and twelfth embodiment, the thermal insulation 83, 83' 50 is arranged between the candle holder 68, 68', 70", 78, 88, 88', 138 and the candle 32, or between the candle support 52, 52', 52" and the candle 32 so as to prevent vibration or friction between them. In other words, it functions as a cushion. They may be omitted. The thermal insulation 83, 83' is also arranged as the route for introducing the oxygen generated at the thermal decomposition start of the candle 32 into the thermal insulation 36. For the route for introducing the oxygen, for example, plural grooves may be made in the candle 32 at the side of the ignition device F".

Further, in the fourth to sixth, the eighth, the ninth, the eleventh and the twelfth embodiments, the air-tight space is formed between the vibration-preventing member 70, 70' and the cap 42', or the candle holder 70" and cap 42'. Thermal insulation may be packed in the air-tight space. Further,the vibration-preventing member 70, 70' contact directly with the candle holder 68, 68', 78, 88, 88', 138. In this case, the heat from the generated oxygen can be prevented from transmitting through the vibration-preventing member 70, 70' to the housing 40.

Further, in the fourth to sixth, the eighth, the ninth, the eleventh and the twelfth embodiments, the cap 42', and the vibration-preventing member 70, 70' or the candle holder 70" are combined by the butt-welding method. The combined method is not limited to this method. For example, it is may be combined by a lap-welding method or assembling. Further, in this invention, the cap 60', 60" and the candle support 52", 152 may be combined by any method other than the above combined method, such as assembling.

Further, in the fourth to sixth, the eighth, the ninth, the eleventh and the twelfth embodiments, the cap 42', and the vibration-preventing member 70, 70' or the candle holder 70" are individually arranged. Instead, the first cap member and the vibration-preventing member may be formed integrally with each other, as one body. Thus formed, the body may be inserted to the housing 40. In this case, the cap 42', and the vibration-preventing member 70, 70" or the candle holder 70" are previously combined with each other, and then, they are engaged with the housing 40.

Further, in all of the above described embodiments, the candle holder 38, 38', 38", 68, 68', 78, 78', 78", 88, 88' 98, 138, 70" as the first support means, the candle support 52, 52', 52", 152 as the second support means and the housing 40 are made of metal. Also, the vibration-preventing member 70, 70', the cap 42, 42' as the first cap means and the cap 60, 60', 60" as the second cap are made of plate metal. However, their material is not limited to "metal", but may be heat resistant synthetic resin or thermosetting plastics such as urea resin, melamine resin and phenol resin. Of course, when the material is plate-like in order to decrease the weight, a certain strength should be considered for the vibration proof characteristic.

What is claimed is:

1. In a chemical oxygen generator includes:
   (A) an oxygen generating candle having an oxygen source;
   (B) a cylindrical thermal insulation filled with said oxygen generating candle;
   (C) first support means for supporting one side portion of said cylindrical thermal insulation and said oxygen generating candle;
   (D) second support means for supporting another side portion of said cylindrical thermal insulation and said oxygen generating candle;
   (E) ignition means arranged at a side of said first support means for igniting said oxygen generating candle;
   (F) oxygen supply means arranged at a side of said second support means; and
   (G) a tubular housing containing said cylindrical thermal insulation, said first support means and said second support means;
   the improvements including a cylindrical member made of material being corrosion resistant, reaction inert and heat resistant to said oxygen generating candle, and covering an outer surface of said cylindrical thermal insulation, and an annular space provided between said cylindrical member and said tubular housing,
   an annular gap between said cylindrical thermal insulation and said cylindrical member whereby oxygen generated as the result of thermally decomposing said oxygen generating candle by triggering of said ignition means, passes through said cylindrical thermal insulation and an said annular gap and is supplied to the outside through said oxygen supply means.

2. A chemical oxygen generator according to claim 1, in which said annular space is packed with metal wool at high densities adjacent said cylindrical member, said first support means and said enclosure member and at lower densities adjacent said tubular housing.

3. A chemical oxygen generator according to claim 1, including said oxygen generating candle having an oxygen source containing a main component selected from a group consisting of alkali metal chlorates and alkali metal perchlorates and further containing plural small pieces of material having a thermal conductivity of more than 30 W/(m·K).

4. A chemical oxygen generator accordingly to claim 3, in which said oxygen source contains iron-group transition metal powders as an auxiliary component and consists of plural layers different from each other in mixing ratios of components, and said small pieces are included in at least one of said layers at 1 to 10 percentages by weight.

5. A chemical oxygen generator according to claim 3, in which said oxygen source contains iron-group transition metal powders as an auxiliary component and consists of plural layers different from each other in mixing ratios of components, and said small pieces are included in the nearest one of said layers to said oxygen supply means at 1 to 10 percentages by weight.

6. A chemical oxygen generator according to claim 3, in which said small pieces are made of at least one steel selected from the group consisting of stainless steel and carbon steel.

7. A chemical oxygen generator according to claim 3, in which the size of said small pieces is 10 to 30 μm thick, 80 to 120 μm wide and 1 to 5 mm long.

8. A chemical oxygen generator according to claim 3, in which said material is copper or stainless steel.

9. In a chemical oxygen generator including:
(A) an oxygen generating candle having an oxygen source;
(B) a cylindrical thermal insulation filled with said oxygen generating candle;
(C) first support means for supporting one side portion of said cylindrical thermal insulation and said oxygen generating candle;
(D) second support means for supporting another side portion of said cylindrical thermal insulation and said oxygen generating candle;
(E) ignition means arranged at a side of said first support means for igniting said oxygen generating candle;
(F) oxygen supply means arranged at a side of said second support means; and
(G) a tubular housing containing said cylindrical thermal insulation, said first support means and said second support means;
the improvements including said first support means made of material being corrosion resistant, reaction inert and heat resistant to said oxygen generating candle, and being cup-shaped, said first support means having a bottom a side of said ignition means and covering all of said oxygen generating candle through said cylindrical thermal insulation, and an annular air-tight space for said oxygen generating candle formed between said first support means and said tubular housing,
and an annular gap between said cylindrical thermal insulation and said cylindrical member whereby oxygen generated as the result of thermally decomposing said oxygen generating candle by triggering of said ignition means, passes through said cylindrical thermal insulation and said annular gap and is supplied to the outside through said oxygen supply means.

10. A chemical oxygen generator according to claim 9, in which the diameter of one end portion of said first support means is enlarged, and pinched between the circumferential surface of said second support means and said tubular housing.

11. In a chemical oxygen generator including:
(A) an oxygen generating candle having an oxygen source;
(B) a cylindrical thermal insulation filled with said oxygen generating candle;
(C) first support means for supporting one side portion of said cylindrical thermal insulation and said oxygen generating candle;
(D) second support means for supporting another side portion of said cylindrical thermal insulation and said oxygen generating candle;
(E) ignition means arranged at a side of said first support means for igniting said oxygen generating candle;
(F) oxygen supply means arranged at a side of said second support means; and
(G) a tubular housing containing said cylindrical thermal insulation, said first support means and said second support means;
the improvements including a cylindrical member made of material being corrosion resistant, reaction inert and heat resistant to said oxygen generating candle and covering an outer surface of said cylindrical thermal insulation, and having plural radiating fins jutting out toward an annular space provided between said cylindrical member and said tubular housing, said fins comprised of multiple bent slit portions of said cylindrical member which are bent on a slant, and an annular gap between said cylindrical thermal insulation and said cylindrical member whereby oxygen generated as the result of thermally decomposing said oxygen generating candle by triggering of said ignition means, passes through said cylindrical thermal insulation and said annular gap and is supplied to the outside through said oxygen supply means.

12. In a chemical oxygen generator including:
(A) an oxygen generating candle having an oxygen source;
(B) a cylindrical thermal insulation filled with said oxygen generating candle;
(C) first support means for supporting one side portion of said cylindrical thermal insulation and said oxygen generating candle;
(D) second support means for supporting another side portion of said cylindrical thermal insulation and said oxygen generating candle;
(E) ignition means arranged at a side of said first support means for igniting said oxygen generating candle;
(F) oxygen supply means arranged at a side of said second support means; and
(G) a tubular housing containing said cylindrical thermal insulation, said first support means and said second support means;
the improvements including a cap member closing an end opening of said tubular housing at the side of said first support means, said first support means consisting of material which is corrosion resistant, reaction inert and heat resistant to said oxygen generating candle and is cup-shaped with a bottom positioned on the side of said ignition means and covering said cylindrical thermal insulation filled with said oxygen generating candle, and path-forming means providing axially extending annular passages between said first support means and said tubular housing for guiding the generated oxygen flow in the axial direction,
and an annular gap between said cylindrical thermal insulation and said cylindrical member whereby oxygen generated as the result of thermally decomposing said oxygen generating candle by triggering of said ignition means, lastly passes through the outer-most passage portion which is the nearest to said tubular housing among said passages after passing through said cylindrical thermal insulation and said annular gap and is supplied to the outside through said oxygen supply means.

13. A chemical oxygen generator according to claim 12, including an enclosure member providing an outer circumferential surface of the axial path nearest to said tubular housing and an air-tight space against said candle between said tubular housing and said enclosure member.

14. A chemical oxygen generator according to claim 12, including plural cut-outs provided in libel one end portion of said first support means, and said one end portion contacting with said path-forming means.

15. A chemical oxygen generator according to claim 12, including plural radial annular projections arranged on at least one of said path-forming means and said first support means, and cut-outs in said annular projections, said cut-outs shifted from each other in adjacent ones of said annular projections by a predetermined angle.

16. A chemical oxygen generator according to claim 12, including a plate shaped vibration-preventing member arranged adjacent to said first support means and engaged with said ignition means at a central portion thereof, an edge of said vibration-preventing member and an edge of said first cap member engaged with said tubular housing and also with each other either directly or through said tubular housing.

17. A chemical oxygen generator according to claim 16, in which said vibration-preventing member is fitted to the shape of said bottom of said first support means.

18. In a chemical oxygen generator includes:

(A) an oxygen generating candle having an oxygen source;

(B) a cylindrical thermal insulation filled with said oxygen generating candle;

(C) first support means for supporting one side portion of said cylindrical thermal insulation and said oxygen generating candle;

(D) second support means for supporting another side portion of said cylindrical thermal insulation and said oxygen generating candle;

(E) ignition means arranged at a side of said first support means for igniting said oxygen generating candle;

(F) oxygen supply means arranged at a side of said second support means; and (G) a tubular housing containing said cylindrical thermal insulation, said first support means and said second support means;

the improvements wherein plural small pieces of material of thermal conductivity which is more than 30 W/(m·K) are included as an ingredient of said oxygen source of said oxygen generating candle.

19. In a chemical oxygen generator including:

(A) an oxygen generating candle having an oxygen source;

(B) a cylindrical thermal insulation filled with said oxygen generating candle;

(C) first support means for supporting one side portion of said cylindrical thermal insulation and said oxygen generating candle;

(D) second support means for supporting another side portion of said cylindrical thermal insulation and said oxygen generating candle;

(E) a tubular housing containing said cylindrical thermal insulation, said first support means and said second support means;

(F) a first cap member in the form of a plate closing an opening of said tubular housing on a side portion of said first support means;

(G) ignition means for igniting said candle and arranged on the center of a bottom of said first support means through the center of said first cap member;

(H) a second cap member in the form of a plate closing an opening of said tubular housing on a side portion of said second support means; and (I) oxygen supply means arranged at the side portion of said second support means;

the improvements including a vibration-preventing member arranged at the center on said ignition means between said first support means and said first cap member, an edge of said vibration-preventing member and an edge of said first cap member engaged with said housing, and with each other either directly or through said tubular housing, whereby oxygen generated as the result of thermally decomposing said oxygen generating candle by triggering of said ignition means, passes through said cylindrical thermal insulation, and is supplied to the outside through said oxygen supply means.

20. A chemical oxygen generator according to claim 19, in which said vibration-preventing member is fitted to the shape of the bottom of said first support means.

21. A chemical oxygen generator according to claim 19, in which said first support means extends towards the side portion of said oxygen supply means and thereby covers said thermal insulation, and an end portion of said first support means at a side portion of said oxygen supply means engages with said tubular housing to form an annular air-tight space between said support means and said tubular housing.

22. A chemical oxygen generator according to claim 19, in which said vibration-preventing member is integrally formed with said first support means.

23. A chemical oxygen generator according to claim 19, in which a circumferential surface of said cylindrical thermal insulation is covered with a cylindrical member made of material being corrosion resistant, reaction inert and heat resistant to said oxygen generating candle, and a plurality of fins radiating from said cylindrical member, said fins comprised of bent slit portions which are bent towards said annular space formed between said cylindrical member and said tubular housing, whereby generated oxygen from exothermic decomposition of said candle with triggering of said ignition means is flowed through said thermal insulation and a gap between said cylindrical member and said thermal insulation, and is supplied through said oxygen supply means to the outside.

24. A chemical oxygen generator according to claim 19, in which said oxygen source includes a main component selected from the group consisting of alkali metal chlorates and alkali metal perchlorates, and further includes small pieces made of material having a thermal conductivity of more than 30 W/ (m·K).

* * * * *

UNITED STATES PATENT AND TRADEMARK OFFICE
CERTIFICATE OF CORRECTION

PATENT NO. : 5,725,834
DATED : March 10, 1998
INVENTOR(S) : Shigeki Nishii, et al It is certified that error appears in the above-indentified patent and that said Letters Patent is hereby corrected as shown below:

Col. 1, line 14, delete " . ", after "chlorate".

Col. 5, line 32, change "38", 8) to -- 138 --.

Col. 5, line 48, change " , " to -- . --.

Col. 6, line 17, change "," to -- . --.

Col. 6, line 18, delete "oxygen" after "thereby".

Col. 10, line 40, change "5" to -- 55 --.

Col. 12, line 15, change "when" to -- which --.

Col. 13, line 62, insert -- . --, between "39" and "Therefore".

Col. 16, line 43, insert -- is -- before "formed".

Col. 19, line 27, change "damaged" to -- partially damage --.

Col. 20, line 57, delete "cylindrical".

UNITED STATES PATENT AND TRADEMARK OFFICE
CERTIFICATE OF CORRECTION

PATENT NO. : 5,725,834
DATED : March 10, 1998
INVENTOR(S) : Shigeki Nishii, et al It is certified that error appears in the above-indentified patent and that said Letters Patent is hereby corrected as shown below:

Col. 29, line 62, insert - - is - - after "it".

Col. 31, line 12, change "138"" to "138'"

Col. 31, line 62, change "re" to - - are - -.

Col. 32, line 8, change "with" to - - which - -.

Col. 33, line 19, change "on" to - - or - -.

Col. 34, line 29, change "includes" to - - including - -.

Col. 34, line 54, add - - and - - before "an".

Col. 34, line 58, delete "an".

UNITED STATES PATENT AND TRADEMARK OFFICE
CERTIFICATE OF CORRECTION

PATENT NO. : 5,725,834
DATED : March 10, 1998
INVENTOR(S) : Shigeki Nishii, et al It is certified that error appears in the above-indentified patent and that said Letters Patent is hereby corrected as shown below:

Col. 20, line 64, change "8a" to - - 78a - -..

Col. 20, line 64, change "69" to - - 69' - -.

Col. 21, line 21, change "69b" to - - 69b' - -.

Col. 22, line 48, insert - - plural - - before "openings".

Col. 24, line 17, insert - - can - - after "it".

Col. 25, line 14, insert - - housing - - before "40".

Col. 25, line 18, delete "much".

Col. 25, line 38, insert - - notches - - after "the".

Col. 26, line 62, insert - - and - - before "flows".

Col. 26, line 62, insert - - along - - before "the axial".

Col. 29, line 41, insert - - 152 - - before "as".

Col. 29, line 42, delete "152".

Col. 29, line 51, change "60a" to - - 60a" - -.

Col. 29, line 52, insert - - of - - after "138b".

UNITED STATES PATENT AND TRADEMARK OFFICE
CERTIFICATE OF CORRECTION

PATENT NO. : 5,725,834
DATED : March 10, 1998
INVENTOR(S) : Shigeki Nishii, et al It is certified that error appears in the above-indentified patent and that said Letters Patent is hereby corrected as shown below:

Col. 35, line 50, insert - - on - - after "bottom".

Col. 37, line 13, delete "libel".

Col. 37, line 33, delete "includes" and substitute - - including - -.

Signed and Sealed this

Fourth Day of August, 1998

Attest:

BRUCE LEHMAN

Attesting Officer

Commissioner of Patents and Trademarks